US011956352B2

(12) United States Patent
Taylor

(10) Patent No.: US 11,956,352 B2
(45) Date of Patent: Apr. 9, 2024

(54) TIME RANDOMIZING INTERFACE PROTOCOL LANGUAGE ENCRYPTION

(71) Applicant: Mark Taylor, Falls Church, VA (US)

(72) Inventor: Mark Taylor, Falls Church, VA (US)

(*) Notice: Subject to any disclaimer, the term of this patent is extended or adjusted under 35 U.S.C. 154(b) by 462 days.

(21) Appl. No.: 17/151,086

(22) Filed: Jan. 15, 2021

(65) Prior Publication Data

US 2022/0345303 A1 Oct. 27, 2022

Related U.S. Application Data

(60) Provisional application No. 62/961,228, filed on Jan. 15, 2020.

(51) Int. Cl.
| | |
|---|---|
| *H04L 9/08* | (2006.01) |
| *G06F 16/22* | (2019.01) |
| *G06F 16/2455* | (2019.01) |
| *G06F 40/00* | (2020.01) |
| *G10L 15/26* | (2006.01) |
| *H04L 9/12* | (2006.01) |

(52) U.S. Cl.
CPC ............ *H04L 9/0869* (2013.01); *G06F 16/22* (2019.01); *G06F 16/24562* (2019.01); *G06F 40/00* (2020.01); *G10L 15/26* (2013.01); *H04L 9/12* (2013.01)

(58) Field of Classification Search
CPC ....... H04L 9/0869; H04L 9/12; H04L 9/0618; H04L 9/0894; G06F 16/22; G06F 16/24562; G06F 40/00; G06F 40/30; G10L 15/26; G06N 3/082; G06N 3/088; G06N 10/60
See application file for complete search history.

(56) References Cited

U.S. PATENT DOCUMENTS

| 6,381,629 B1* | 4/2002 | Lee ......................... G06F 16/20 709/201 |
| 2004/0148356 A1* | 7/2004 | Bishop, Jr. .............. H04L 51/58 709/206 |
| 2020/0134218 A1* | 4/2020 | Liu ....................... G06F 21/602 |

* cited by examiner

*Primary Examiner* — Fatoumata Traore
*Assistant Examiner* — Carlton Johnson
(74) *Attorney, Agent, or Firm* — L/O OF ALEXIS J SAENZ

(57) ABSTRACT

Time randomizing information protocol language encryption, provides systems, methods, computer programs and algorithms for encrypting communications. Provided by software in devices or firmware in networking hardware cooperates between at least two systems. Ciphers are randomly timed and replaced after a random period rendering eavesdropper decryption efforts ineffective and/or uneconomic. Ciphers may be based on common seed data sets, or on pointers to an array containing seed data. These seed data values, or pointers to them may be used in communications in shared transient languages. Languages may include number bases from binary on upwards, and characters used in human or machine languages. One implementation may convert human speech to text, then encrypt and transmit it, for decryption and conversion to synthetic speech in secure battlefield communications, or secure identity protected communications as may suit intelligence agencies. Applications, including non-human machine communications may run beneath conventional encryption to enhance security.

20 Claims, 38 Drawing Sheets

Run-Time Example of Possible TRIPL Creation Process

Device A initiates TRIPL creation via request to Device B

Device B agrees

Device A generates a pointer to its seed data array which points to "3" the pointer / value is sent to device B Both devices record the pointer to "3" at their 1st TRIPL array index location, or with pointer index value 1

Device B generates a pointer to its seed data array which points to "j" the pointer / value is sent to device A Both devices record the pointer to "j" at their 2nd TRIPL array index location, or with pointer index value 2

Device A generates a pointer to its seed data array which points to "u" the pointer / value is sent to device B Both devices record the pointer to "u" at their 3rd TRIPL array index location, or with pointer index value 3

Device B generates a pointer to its seed data array which points to "<" the pointer / value is sent to device A Both devices record the pointer to "<" at their 4th TRIPL array index location, or with pointer index value 4

Device A generates a pointer to its seed data array which points to "y" the pointer / value is sent to device B Both devices record the pointer to "y" at their 5th TRIPL array index location, or with pointer index value 5

Device B generates a pointer to its seed data array which points to "g" the pointer / value is sent to device A Both devices record the pointer to "g" at their 6th TRIPL array index location, or with pointer index value 6

--------------- BREAK ---------------

Process continues until complete TRIPL is negotiated... An array of characters, character strings, or records with an index capability may be used to store the new TRIPL or an array of pointers to the TRIPL may be used in TRIPL encrypted communications.

Run-Time Example of Possible TRIPL Creation Process

Continuation string data objects...

Device A generates a pointer to its seed data array which points to "and" the pointer / value is sent to device B Both devices record the pointer to "and" at their 100th TRIPL array index location, or with pointer index value 100

Device B generates a pointer to its seed data array which points to "car" the pointer / value is sent to device A Both devices record the pointer to "car" at their 101st TRIPL array index location, or with pointer index value 101

Device A generates a pointer to its seed data array which points to "computer" the pointer / value is sent to device B Both devices record the pointer to "computer" at their 102nd TRIPL array index location, or with pointer index value 102

-------------- BREAK --------------

Continuation complex data-objects...

Device B generates a pointer to its seed data array which points to "Initiate emergency procedure. Remove Hard Disc Drives and take them to dead-drop Apache." the pointer / value is sent to device A Both devices record the pointer to "Initiate emergency procedure. Remove Hard Disc Drives and take them to dead-drop Apache." at their 200th TRIPL array index location, or with pointer index value 200

Device A generates a pointer to its seed data array which points to "Link non-text data" the pointer / value is sent to device B Both devices record the pointer to "Link non-text data" at their 201st TRIPL array index location, or with pointer index value 201

Device B generates a pointer to its seed data array which points to "USMC Field manual" the pointer / value is sent to device A Both devices record the pointer to "USMC / Army Field manual for RPG" at their 202nd TRIPL array index location, or with pointer index value 202

Process continues until complete TRIPL is negotiated... An array of characters, character strings, or records with an index capability may be used to store the new TRIPL or an array of pointers to the TRIPL may be used in TRIPL encrypted communications.

TIME RANDOMIZING INTERFACE PROTOCOL LANGUAGE ENCRYPTION

CROSS-REFERENCE TO RELATED APPLICATIONS

This application claims benefit under 35 U.S.C. § 119(e) of U.S. of U.S. Provisional Application having Ser. No. 62/961,228 filed Jan. 15, 2020, which is hereby incorporated by reference in its entirety.

FIELD

The subject disclosure relates to encryption, decryption, data security, data protection in storage, data protection in transit, and secure communications. It furthermore relates to artificial intelligence, machine learning, quantum computing, and information processing systems architecture. Civilian, military and intelligence examples and applications of these subject technologies are included.

BACKGROUND

Unfortunately, at the time of filing this patent application there is a tsunami of intellectual property theft. In which the Inventor has suffered more than most at the hands of intelligence agencies and cyber-criminals. There is an adverse economic impact, and a reputational cost which is that many of the Inventor's original works will probably never be credited to him. Because the intellectual property thieves managed in some cases to exploit them, or file for patent protection upon them before the Inventor. Which bitter experience illustrates amply the need for better more secure IT for high value information. Such as early drafts of inventions and patent specifications.

As the world's premier producer of high value intellectual property, and advanced defense technologies the United States has also suffered, and is still suffering from industrial scale intellectual property theft. Mainly but by no means exclusively by China. Plus the rising menace of Russian hacking which is also occurring on an industrial scale. Indeed hacking and some of the colorful characters involved in Russian hacking activities, are backed by their FSB. The achievements of which appear to be a matter of national pride for modern Russia.

Industrial and economic espionage is a high-value, low risk crime that many nation-states and corporations indulge in. Yet the chances of being prosecuted for intellectual property theft are very small indeed. Even though the value of some intellectual property can be exceptionally high. Consequently, for a smart high tech criminal, it's a safer and better paying crime than most others. For which very few people are ever caught and even fewer are prosecuted.

The US military also needs more secure information systems, networks, and communications, right down to the level of reducing signal noise/leakage from systems such as missiles, tanks and aircraft. Because this noise may be captured by signals intelligence (Sig-Int) eavesdropping. Signal noise and leakage can allow eavesdroppers to reconstruct the information on a display screen from nothing more than signal leakage. This is why the U.S. prohibits its employees who may possess sensitive information from using a personal computer in hotels within the Peoples Republic of China.

The main protective technology in the prior art is the cryptographic encryption of data. For which many algorithms have been created. Ciphers and codes have a long history which began with spying and the passing of secret messages. British man Garry McKinnon hacked sensitive US systems and claimed to be looking for evidence of UFOs. The McKinnon case illustrates also the practical inability to prosecute hackers across borders. Which in that case is not even a matter of law per se. In that U.S. agencies wish to, and tried to extradite Garry McKinnon. Which efforts were rebuffed. Ostensibly because they were so unpopular with the British public—that their government has declined his extradition to the U.S.

It may also be the case that Garry McKinnon was under the influence of an intelligence agency. Who may have been manipulating him to do for them something they could not risk doing themselves. For which they had needed the cover of plausible deniability. The subject of UFOs and the reverse engineering of allegedly extra-terrestrial technologies being of keen interest and importance to many militaries. In relation to which most of them believe that the U.S. may have a head start.

Intelligence services seek to steal military secrets and intellectual property. Organized criminals steal intellectual property and other commercially valuable information for economic gain. There is considerable crossover between state and criminal intellectual property theft.

So called "Zero-Day" vulnerabilities and exploits have generated an industry and market in which hackers and crackers break apart software to find them. Which is probably not technically illegal, and for which probably even U.S. intelligence agencies will pay.

Criminal hackers, also steal then sell secrets to state actors. State actors may hide behind non state "Hacktors". Much economic crime is comprised of the theft of financial information. There is also a thriving black-market for stolen credit and debit cards on the Dark Web.

Furthermore there is also an increasing risk from perverts who may wish to steal images and illegally access the rising number of devices with cameras to spy on and photograph children or people they are unlawfully stalking. This storm has not yet broken in the media.

Mobile devices are perhaps one of the greatest security threats posed to most organizations, and to individuals and their privacy. This is because they are carried with us and can yield large amounts of personal data. Particularly offensive dangers are posed by pedophiles accessing the phones of children, to track and stalk them, and to take pictures of them and to groom, train and control them. Yet many parents find it comforting to be able to track their children using mobile phones.

A very large part of our modern lives is now documented, organized and stored online in live systems. Banks, retailers, governments, and the military have huge amounts of data housed online. The U.S. Military has its own version of the Internet, with its own data centers and cloud infrastructure.

This technological progress is a modern marvel and has enabled a great deal of human progress and productivity gains. Such as the exemplary behemoth that is Amazon with its awesome supply line and user base. Indeed, in Amazon's favor, online shopping is an under-sung "green" success story and solution which is much less polluting than would be an equivalent number of consumers driving to and from shopping malls to buy all the goods they buy on Amazon. Unfortunately, ecommerce systems, and their data are very attractive targets. Which can and do suffer large-scale data theft.

The most vulnerable time for data is generally not while it is traveling over networks, but whenever and wherever it is stored. Worse still, humans tend to prefer to store large amounts of data in the same place, and in standardized formats. This is not to say that real-time data-theft from interception is not a risk. But that it is probably not the biggest problem for consumers. It is however of vital importance for the military.

Data which is just sat on a server long-term such as the entirety of user data possessed by Facebook, Wells Fargo, or Google is like a "Data-Buffalo", a big stationary target. Hackers try extremely hard to break into these big stationary targets. Whether it is perverts trying to get at children's data on Instagram, or financial crime, or espionage—the systems that are often most in need of protection are the back-end systems. Those which hold the databases, including the databases held locally on user devices such as cell-phones and personal computers.

Securing streaming media is important for the protection of the intellectual property rights; and so that they can be metered and paid for. The motion-picture industry is a valuable jewel. Of great importance to the state of California, the U.S. and Canada in particular. From which piracy injures that industry and the North American economy. The problems of streaming media and public WiFi use are in some ways similar to some of the problems faced by the military. Military data in transit needs robust, fault tolerant systems, that are also secure.

Military applications are more demanding, because they have to protect the data created and needed by war fighters, in real time, and in life or death situations. So both Hollywood and the U.S. military can benefit from improved protection of data streaming technology; and users of public WiFi may benefit from improvements to device to device security.

Clearly, as information technology evolves and new risks emerge with each new addition to the technology, so too the defenses against abuse need to evolve. Unfortunately, most encryption can be hacked by hostile intelligence services. Furthermore, just as humans have now lost the battle for superiority in Chess to computers, if humans have not already lost the battle over cryptography to computers. Then they probably soon will lose it to Artificial Intelligence, and Quantum computing systems.

For all these diverse reasons these subject technologies are much needed in an equally diverse range of applications.

SUMMARY

In one aspect of the disclosure, a time randomizing interface protocol language encryption method is disclosed. The method comprises: sending an invitation to communicate from a first device to a second device; in response to accepting the invitation, generating from a data set array of a language protocol based on random object values and alphanumeric characters; assigning the random object values to the alphanumeric characters; generating an array of pointers in the data set array pointing from the assigned random object values to the alphanumeric characters; agreeing between the first device and the second device on the array of pointers pointing from the assigned random object values to the alphanumeric characters; receiving, from an input, a communication message at the first device; transforming the communication message into an encrypted message comprising the assigned random object values; transmitting the encrypted message to the second device; at the second device, looking up the data set array in response to a receipt of the transmitted encrypted message; translating, using the language protocol, the encrypted message into a decrypted version of the communication message; resetting at random time intervals, the assignment of the random object values to the alphanumeric characters and generating a different version of the language protocol in future communications between the first device and the second device.

In another aspect of the disclosure, a computer program product for generating time randomizing interface protocol language encryption is disclosed. The computer program product comprises one or more computer readable storage media, and program instructions collectively stored on the one or more computer readable storage media. The program instructions comprise: sending an invitation to communicate from a first device to a second device; in response to accepting the invitation, generating from a data set array of a language protocol based on random object values and alphanumeric characters; assigning the random object values to the alphanumeric characters; generating an array of pointers in the data set array pointing from the assigned random object values to the alphanumeric characters; agreeing between the first device and the second device on the array of pointers pointing from the assigned random object values to the alphanumeric characters; receiving, from an input, a communication message at the first device; transforming the communication message into an encrypted message comprising the assigned random object values; transmitting the encrypted message to the second device; at the second device, looking up the data set array in response to a receipt of the transmitted encrypted message; translating, using the language protocol, the encrypted message into a decrypted version of the communication message; resetting at random time intervals, the assignment of the random object values to the alphanumeric characters and generating a different version of the language protocol in future communications between the first device and the second device.

Consequently, it should be understood that many other possible configurations and combinations of the subject technology will become readily apparent to those skilled in the art from this specification generally and the following detailed description, wherein various configurations of the subject technology are shown and described by way of illustration. As will be realized, the subject technology is capable of other and different configurations or combinations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 2C is a block and flow diagram defined process of a run-time series of process steps according to an aspect of the subject technologies.

Figure 2D is a continuation of the block and flow diagram of FIG. 2C defining a process of a run-time series of process steps according to an aspect of the subject technologies.

DETAILED DESCRIPTION

Figure 1:
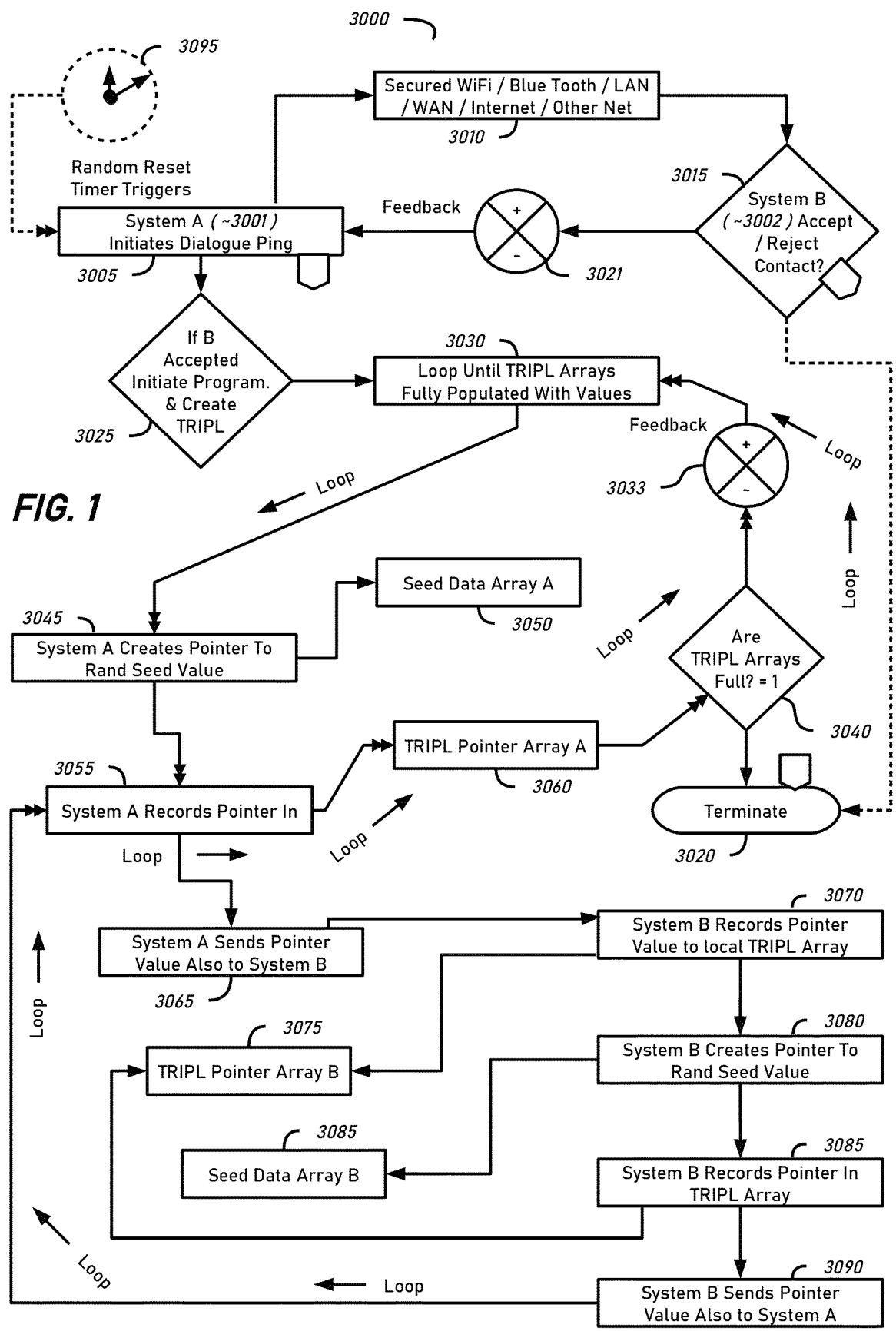
FIG. 1 is a mixed schematic and systems block, flow diagram of two systems establishing contact and creating a transient random interface protocol language, according to decision making algorithms and logic according to the subject technologies.

The detailed description set forth below is intended as a description of various configurations and/or combinations of the subject technology and is not intended to represent the only possible configurations and/or combinations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, embodiments of the subject technology improve upon the state of the art, and/or their applications. Alternative variant embodiments can also improve upon the state of the art in the systems into which they are incorporated, and or their applications.

There are many systems that may be modified to incorporate aspects of the subject technologies to provide new and improved or upgraded systems—that are in fact too numerous to define all possible permutations. Such implementations and variants are intended to be included herein. This specification and the exemplary embodiments provided herein are intended to be illustrative and not restrictive.

There are many threats to the security of data as it travels over the Internet, and when it is stored on devices with an Internet connection. Users keep ever more of their data online in their personal "Cloud". Cloud data is increasingly the new paradigm and this trend looks set to continue for the foreseeable future. Users can seamlessly access their data from various devices over the Internet twenty four hours a day seven days a week. Cloud data backups also offer reliable ways to keep user data, and backups safe for emergencies in which the bulk of the data stored on a PC, Tablet or Smart Phone might otherwise be lost. Encryption algorithms are used for all aspects of personal and commercial IT security. Secure transactions and financial data are known to be of only limited utility against the world's various intelligence agencies. Who have extensive code breaking expertise, that began with the code breaking at Bletchley Park in England in World War II, and the work of inter alia Dr. Alan Turing a gifted mathematician, and Tommy Flowers a brilliant telecommunications engineer. Their task was to decipher the German Enigma and other mathematical ciphers that had been used to conceal the meaning of German communications.

With the advent of highly powered computers modern code breakers seem to have gained the upper hand. So that, it is probably the case at the time of filing this patent application that whatever mathematical puzzles can be created by one human, or artificial intelligence almost certainly can be deciphered by another human, or artificial intelligence. So that data owners and especially the US military could really use a paradigm shift back in their favor.

Furthermore, computers that play Chess have now convincingly proven themselves to be capable of consistently beating the best human players. The strategy game Go has gone the same way. And with Artificial Intelligence, and/or Machine Learning and/or Quantum computing, things might look set to get even worse for data owners. It appears we are headed for times when computers create encryption algorithms and other computers crack them. So, it seems the arms race between more sophisticated encryption and decryption is all set to leave humans behind in an endless mathematical arms race.

These subject technologies however, are intended to provide a different approach, from the purely abstract mathematical arms race. The problem with all encryption-based security measures is that they all rely on abstract mathematics. Which is embodied in algorithms that transmute the original data into data which can only be decrypted by reversing the abstract mathematical steps made in the creation of the encrypted data. This is the "Achilles heel" of the technology in the state of the art. Because what one mathematician can encrypt, an equally talented mathematician can decrypt. Powerful modern computers increase the speed and complexity of the calculations. But as both sides have access to powerful modern computers, progress tends to cancel out.

The subject technologies seek to take some of the abstract math out the equation, save that some math can be used to disguise the fact that this technology does not rely purely on mathematics per se. Though it is logical, and thus amenable to computer processing and control.

These subject technologies are intended to create logical IT systems and methods for leveraging unique data, data structures and protocols into a form which is incapable of being predicted, deciphered, faked or altered without detection using any known mathematical decryption technique. So there is math in there, but it is subtle.

Randomization may be introduced and combined with logic and algorithms in these subject technologies where it is helpful to create new systems and methods for data protection. As well as attributing meaning to structure according to logical protocols.

The military have to work in contested environments, and contested electromagnetic spectrum. They have to communicate secret time sensitive orders, strategic and targeting data reliably and securely. Even when adversaries are intercepting and decrypting or jamming those communications the military has to be able to communicate securely and reliably.

There are commonalities between these military needs and the needs of civilians. The Inventor's approach is to design robust solutions for military applications, and where helpful to adapt his solutions to civilian applications.

The encryption used on the Internet is not very secure. It may fend off some criminals but not all, and it will certainly not stop professional spies. So, the Inventor has created a new transient type of cipher-logic and algorithms, for use between two nodes which may be two battlefield computers or radios, or two civilian devices such as phones, or computing tablets. The Inventor calls the subject technology "Time Randomizing Interface Protocol Language Encryption" (TRIPLE).

In which two devices may use a randomizing interface protocol to create a one-time use unique language known as a transient random interface protocol language (TRIPL). That is known only to themselves, and which may be used for a random time period. After which it is replaced by another TRIPL.

One of the problems with ciphers that the military may use globally against global adversaries is that sophisticated adversaries have the research capabilities to crack the ciphers and encryption of the prior art if they are used sufficiently often to merit the effort. The Inventor analyzed this problem in the context of these subject technologies. The result was creation of his "Time Randomizing Interface Protocol Language Encryption" (TRIPLE), these use a succession of TRIPL that are transient (existing only from one time period to another). The time period of which transience may also be randomized. In order to minimize the benefit to be gained from cracking and deciphering any one iteration of them. To provide an interface language that is governed by randomized protocols according to these subject technologies.

TRIPLE may provide a solution to battlefield and local encryption, and also for encryption for use across wider networks. TRIPLE creates a unique randomized cipher that exists only between the two communicating points or nodes on a network that is used only between those communicating nodes, and used by them only fleetingly. Before being re-set to a newly created TRIPL. The earlier TRIPL may be used during the creation of the next TRIPL and so onward. So that once two nodes are operating securely using TRIPLE, it is very difficult to break into those communications in an efficient and timely manner. Data traveling over networks may travel through many TRIPLE ciphers that are then destroyed, and never recorded or used again.

So that eavesdroppers may intercept communications over time that include use of many unique TRIPL none of which are ever the same again, and which may last only minutes, or even seconds before being replaced. Each TRIPLE interface being programmed to randomly negotiate a new TRIPL at randomly timed intervals, and to operate like a "black-box" so that devices can be communicating over networks that are using different unique TRIPLE all of which are like black-boxes. Which allows devices on the inside of the TRIPLE interfaces to work just like regular devices plugged into black-box communications like a bespoke router only they can communicate with.

TRIPLE may thus create a constantly moving target, that it is intended not to be worthwhile for hacking attempts. Because the TRIPL will be replaced regularly and hacking one TRIPL will not help to decipher data once that TRIPL is replaced. There's probably no way from the outside to know when a TRIPL is replaced. So that they may provide a new way to secure battlefield communications.

TRIPLE can also be used between any two devices with the appropriate software according to these subject technologies. This software may also be provided in firmware for use within networking cards and routers and similarly embedded into systems and hardware. So that TRIPLE may be used for all device to device, or peer to peer communications. Furthermore, as between two devices one unique TRIPL may be used, and a different TRIPLE cipher may be created at every interface between nodes as it routes through a network. The same data may thus pass through one unique TRIPLE for every pair of nodes passed through, and within each such interface the language/cipher may be unique, and time restricted. The creation of some TRIPL for use in TRIPLE communications are addressed in the descriptive materials pertaining to FIG. 1, FIG. 1A, FIG. 1B, FIG. 2, FIG. 2A, FIG. 2B and FIG. 2C, and in those figures themselves. Data streaming aspects are more particularly addressed after the main body of randomizing subject technologies in FIG. 26, FIG. 27, FIG. 28, and FIG. 29.

Again in the context of military communications, some messages are important and urgent, some are important but not urgent, some are less important but more urgent, others may be very unimportant and not urgent either. So it makes sense for the US Navy to prioritize in a sensible manner some messages. Especially where bandwidth is limited such as in submarine communications. Otherwise, personal information from social media might crowd-out vital orders and targeting data traveling from ship to shore and vice versa.

The Inventor has also created additional and related subject technologies for the more efficient use of constrained bandwidth for submarine communications. Which may be made more secure by breaking apart messages and separating them in time, in a such a way that they travel over the network according to their relative priority and "do by" times. So that all orders arrive on time. But where security may be enhanced not only by breaking messages apart but also by saying as little as possible—until the orders are actually needed to be acted upon.

Thus making it harder for an adversary to find and reassemble all the parts of the message, and even if they can find all the parts. The most important and secret parts are only sent in sufficient time to be executed successfully. So as to deprive an eavesdropper any unnecessary advanced warning in which to attempt to frustrate the purpose of the orders.

Using temporal separation and randomization of timing, along with prioritization and secrecy maximizing timing, limited bandwidth may also be better more efficiently used. By spreading the traffic out more evenly over a period so as to flatten the peak, or the peaks of a load curve. Thereby improving the effective use of bandwidth, and avoiding peaks that may crash into a bandwidth ceiling. These aspects of the subject technologies are addressed in the descriptive materials pertaining to FIG. 3 and FIG. 4, and within those figures.

This bandwidth issue arises in the context of submarine operations because very long wavelength radio signals are best for transmission through seawater. Unfortunately, the longer the wavelength the less information may be modulated into the signal.

As regards data file protection, the Inventor has created further related and complimentary logical systems and method randomization technologies mainly addressed in FIGS. 5 through 29. User data may first be divided into data blocks, the smallest possible example of which would be data bits having the value either zero or one for a binary system; or quantum bits also known as "Qbits" zero or one or "?"/"maybe" in a simple quantum system.

More complex quantum systems capable of representing probabilities and/or of characteristics of particles and their wave-form functions are addressed towards the end of this detailed description. Even logic and architectures for data structures that are based on an eleven-dimensional quantum string theory system are included. These subject technologies are not confined to use on binary systems, nor are they constrained by computing logic systems. But are intended to be of universal applicability across all manner of IT systems including systems that have not yet been created.

But this explanation continues with simple examples for aid of clarity. Within these systems a character such as "H" may be represented by a binary code or other base code which need not concern us for the purposes of this exposition.

The size of the data blocks used may be a variable choice for users to make and may also be randomized between minima and maxima. Minima could be a "1" or "0" or a character or a string of characters or other base units of data, and maxima could be any desired plurality of minima or at least a minima plus at least a fraction of a minima.

With no encryption this "H" or its binary code can be sent over a network, and hackers and snoopers can hack this data feed to intercept it by various means. However, in normal circumstances the hacker would also intercept the character that preceded and followed the "H" if there were any such preceding or following letters.

But what is different about information stored or transmitted according to the subject technology, is that where the individual data blocks go to be stored within the cloud is not necessarily the same from one data block to the next. So that, for example the Cloud computers may have been reconfigured each with its own number or network address. For example there could be one thousand individual servers within the cloud data center (simplified down for reason of space in the drawings to five possible storage locations). Each with its own number or network address.

The data may be sent to this cloud by dividing it into data blocks (the size of which may or may not be randomized). Then sending each data block to a randomized location within one of the one thousand servers, and the locations to which the data was sent is recorded as a series of pointers; within an array to make a sequential key comprising the location in order of storage of every data block. Which key may further be comprised of sequentially stored pointers.

Storage of which key may be located within another separate specialist location by an organization such as Verisign, or AWS for example. This key may also be stored on the local hard drive, or backed up to USB sticks or other media perhaps in a hidden drive, or hidden file capable to act like an access dongle. The possibilities are endless, and some of these options are more secure than others. These examples illustrate some but not all possibilities and are not intended to limit or confine the scope of the subject technology.

This key and the storage allocation is not to be confused with "hashing functions" those are mainly about efficiency not security per se. Furthermore, while it's true that a hashing function could be based on randomization, and the algorithms of the subject technology might conceivably be used as part of a hashing function. Due to a modest overlap of suitability, hashing functions are about mathematical efficiency employed for optimization of storage times and access times for data retrieval. Randomization of data storage may provide one efficient method, but these subject technologies are designed to prevent data collisions, and to prevent damage to preexisting data. Whereas hashing functions achieve efficient storage by mathematically avoiding rather than preventing data storage collisions. Consequently, they may sometimes accidentally overwrite data due to collisions and have to then reinstate it, or hold two sets of values mapped to the same location. Hashing is mainly about writing and reading data quickly, not about data protection and security.

Figure 15:
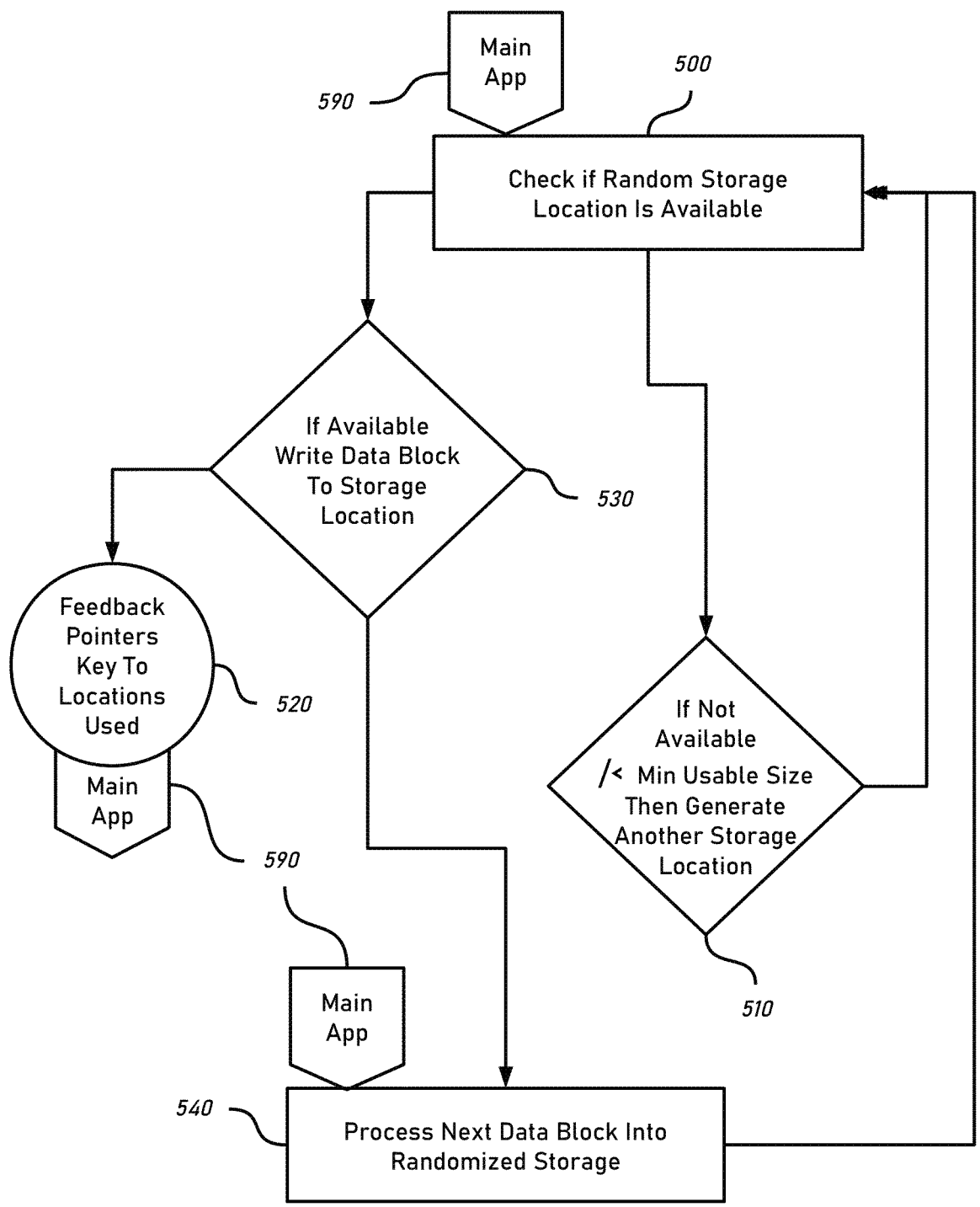
FIG. 15 is a block and flow diagram describing an algorithm based logic module, for writing data blocs to random storage locations according to an aspect of the subject technologies.
Figure 16:
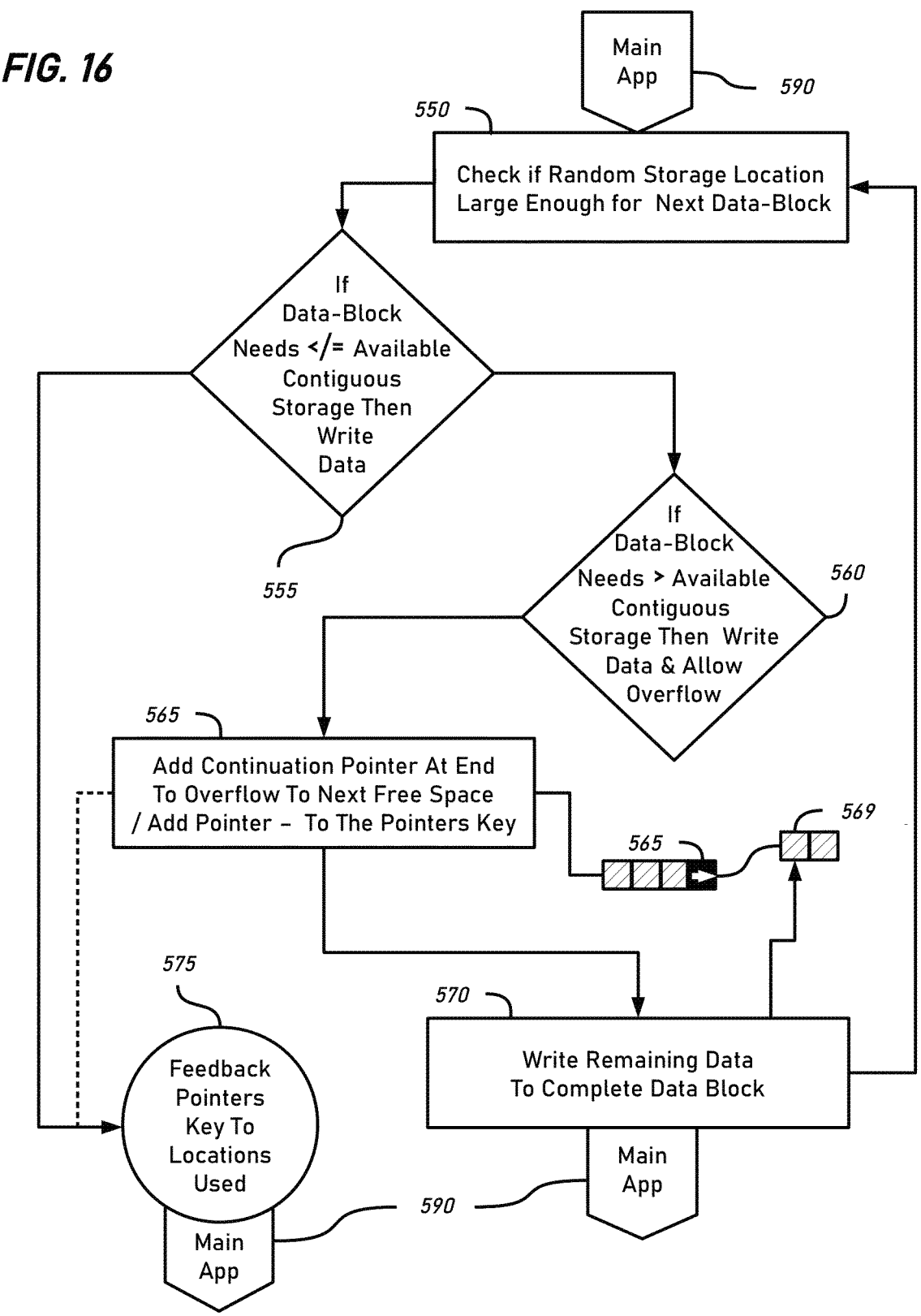
FIG. 16 is a block and flow diagram describing an algorithm based logic module, for writing data blocs to random storage locations according to an aspect of the subject technologies.

Careful study of these subject technologies and the two decision tree algorithms of FIG. 15 and FIG. 16 contain the Inventor's solution to avoid potential data write collisions and also to prevent data overwrites. Potential data write overwrites are detected before any data is written. In these subject technologies, precisely because the objectives and guiding rationale are about data protection and security.

So that in these subject technologies any data in a location selected randomly for writing new data is logically tested before writing, and if a potential for collision with existing data is indicated—then another data write location is generated to write the data-block; or where a storage location is available but too small to accommodate the data block, a data-block partial write—plus an overflow operation may be produced. So that the surplus data overflows, and is written to another storage location. In which case the first location includes a pointer to the overflow location; or the pointers-key includes the overflow location.

The basis of selection of data-block storage locations is based on randomization, and data protection. Rather than the potential for efficiency of data write or access and read times per se.

This fact however, does not need to preclude the use of the most efficient possible algorithm to achieve the subject technologies. Which may or may not be compatible with any given hashing (efficiency, per se) function. Furthermore, once data is randomized while it might seem illogical, there is no particular problem with subsequently moving it around and storing it according to any particular hashing function, or other management system. Provided that the original pointers key can be updated or augmented to record any changes made.

So these subject technologies need not get in the way of efficiency at the macro-level, or micro-level. The subject technologies just should not be confused with such optimization methods and/or "hashing" functions, or similar procedures, nor confused with fragmentation or defragmentation. They are specific things, and not part of these subject technologies. These subject technologies can be made compatible with such other things, but care must be taken. Because disk management programs can damage data processed according to these subject technologies. This need not be a problem, because a terminate and stay resident (TSR) program may be left running in the background on a computer system to modify its behavior to one compatible with these subject technologies.

Further discussion of the topics of "fragmentation", "hashing functions" and "disk management" algorithms in the art is available on websites such as Wikipedia.org, but is not included here due to considerations of drafting cost, and filing cost. It may be helpful to think of hashing functions being primarily aimed at speeding-up data access times for read and write operations. They usually map to two dimensional constructs called tables.

Fragmentation is also usually expressed to represent disc storage spaces as a two dimensional constructs or tables. This is a natural side effect of the way some disk management systems operate, and the way they are typically processed. There are disk management systems that can defragment fragmented data to enable the disk space to be used more efficiently.

These subject technologies of this Inventor are not aimed at either speed of access per se; nor are they aimed at disk optimization fragmentation or defragmentation per se. Indeed these subject technologies can be set to write very dense unfragmented, even compressed randomized data where slack space may be utilized for storing randomized data. This has an additional benefit in that the more files are randomly intermingled, the more they may each protect the other. There being strength in numbers being a recurring themes of these subject technologies.

The two algorithms of FIGS. 15, and 16 may be used to achieve dense data-block storage, at or close to the theoretical contiguous maximum of a storage capacity of a storage space, partition or drive. Though this is not a specific goal pursued in these subject technologies, developers may nevertheless find it useful to be aware of this aspect. The amount of available space may be used to determine the most appropriate data writing algorithm.

Programmers have designed hashing functions, fragmentation and defragmentation around the notion of tables and a two dimensional maps, and similar constructs. The Inventor realized that computers don't need to visualize data in ways that are human compatible. So that in these subject technologies, the key may be comprised of only a one dimensional array for ease of use and simplicity. Computers, and especially artificial intelligence having no problem conceiving one very long one dimensional structure. Like a theoretically infinitely extendable street, with specific data at every address, with all being accessible.

For example, data is stored randomly into storage, the locations of which are then recorded in a very long one dimensional array. Coordinates in two dimensions are often not necessary. Additional computation and cross referencing of variables in more complex human friendly structures such as tables using some sort of coordinate system for read/write data referencing may thus be avoided. By allowing the computer to work as a computer, rather than super-imposing human comprehension needs onto its data structures.

The ethos of these subject technologies is that they are intended to be minimalist, practical, clean and as simple and hence as efficient as possible. With the focus on data protection from corruption and security threats. This aspect of the Inventor's methodology follows the maxim "keep it simple stupid" (KISS) which is something learned during his apprenticeship with Rolls Royce. Making jet engines, research prototypes and test rigs.

Figure 27:
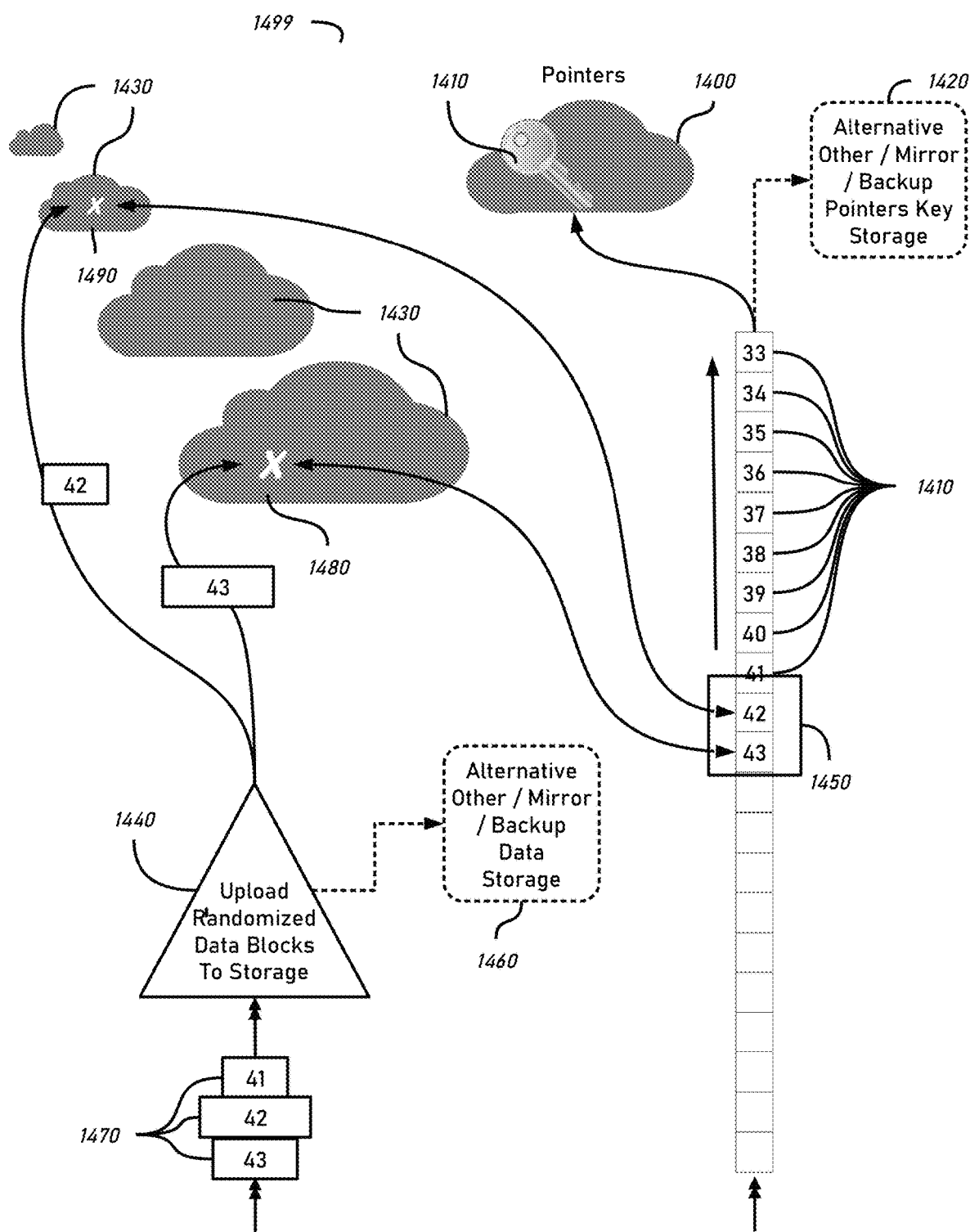
FIG. 27 is a mixed schematic and block flow system diagram of aspects of the technology used to secure cloud storage and data streaming uploads in accord with the subject technologies.
Figure 28:
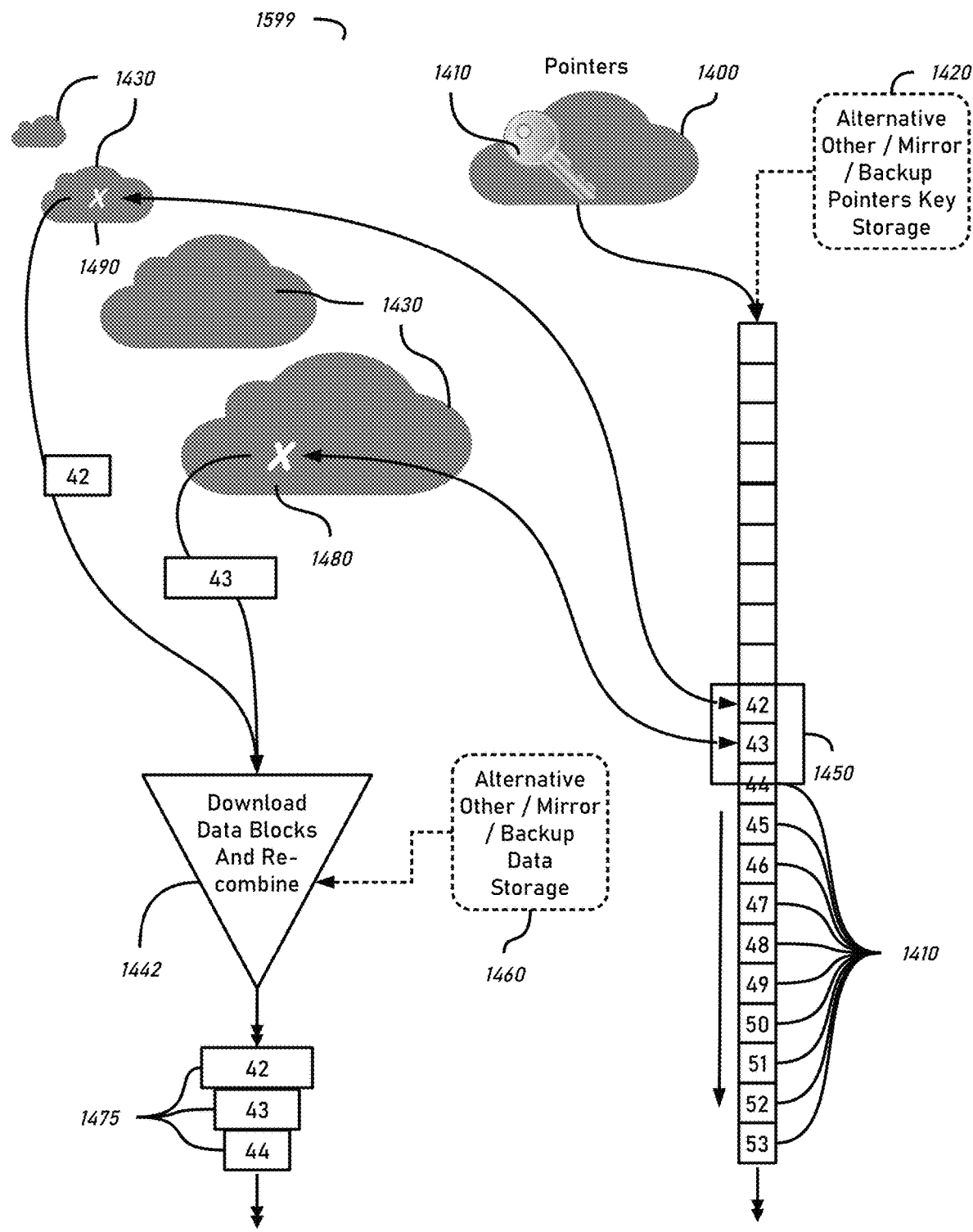
FIG. 28 is a mixed schematic and block flow system diagram of aspects of the technology used to secure cloud storage and data streaming downloads in accord with the subject technologies.
Figure 29:
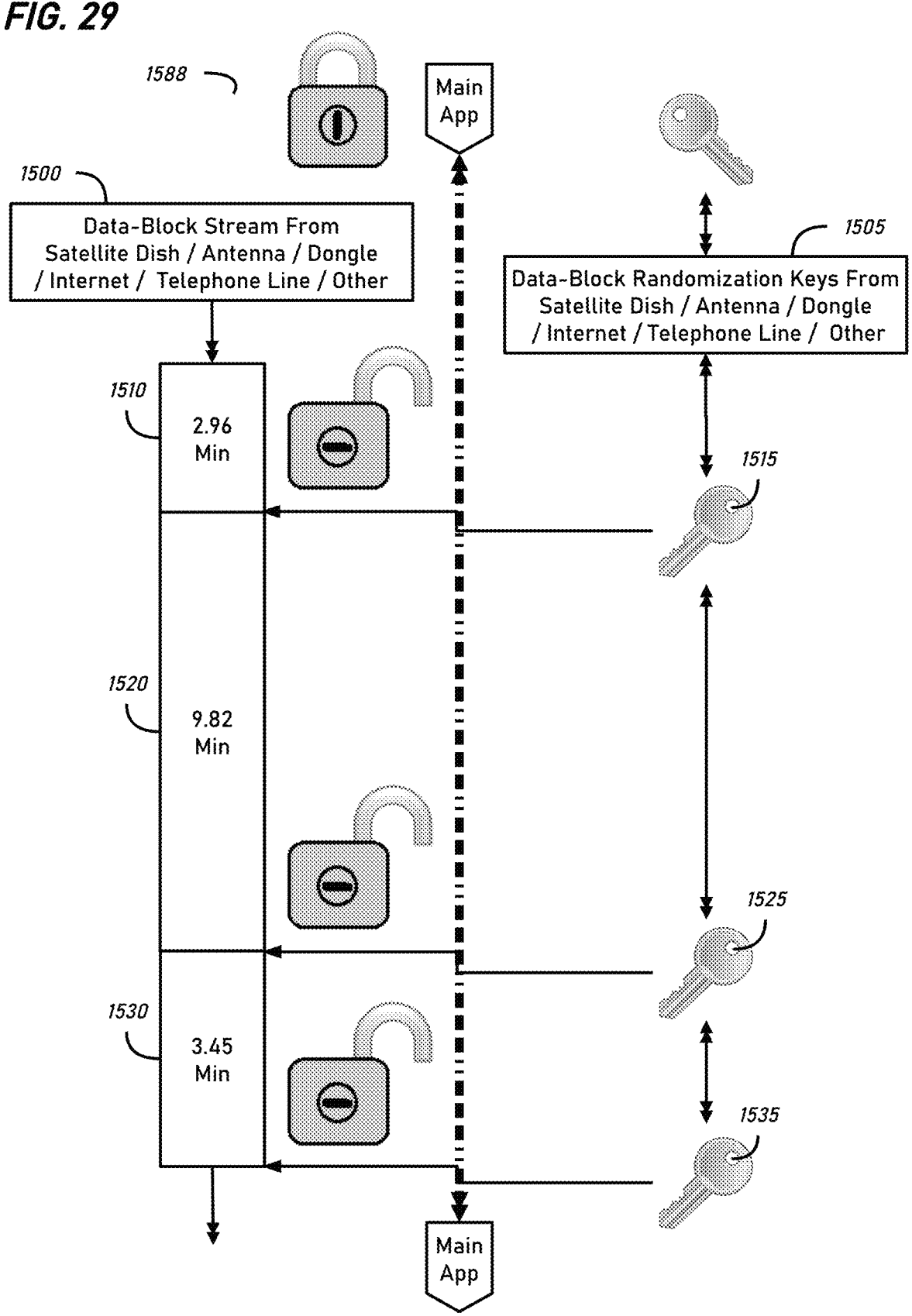
FIG. 29 is a mixed schematic and block flow system diagram of aspects of the technology used to reassemble secured streaming downloads in accord with the subject technologies.

The pointers key may be comprised of a simple array containing the locations recorded in the sequential order over time, of where each block of data was sent for example. To retrieve the data from the cloud, the cloud computers are requested to return whatever was stored at each specific location identified by the pointers key for reassembly back into their original order. A good way to visualize this as shown in FIGS. 27 through 29 is rather like a zipper, which clicks data blocks apart for storage, and zips the same data blocks back together to resemble it, back into their original order.

It may be appreciated that this process could be virtualized and/or scaled down to run on just one device such as the internal storage of an iPhone, Android smart-phone, or PC hard drive, and it could still provide a serviceable data protection and security capability. Which in the absence of the key would be close to impossible to reconstruct. Similarly, the subject technology may run on just a suitably programmed CPU working with only RAM or flash memory. Those choices and applications will vary as this technology proliferates into devices and networks.

Major targets for hackers are servers holding financial and user data. Presently this is relatively easy for them. Because the files are in one place and will even have helpful end markers between files. How nice of the systems designers to make our files so easy to find and to add bookends to parse each file.

Whereas if hackers were to steal the entire contents of the one thousand cloud servers of a data center configured according to these subject technologies—there is no presently known decryption algorithm which could reassemble any user or account data that has been stored according to these subject technologies. It would just be a mountain of useless gibberish without the key comprised of the sequential location pointers, and comprehension of what it is, relative to the data blocks to which the pointers correlate.

Possession of one user's key of pointers may only identify that user's data within the system. If stolen it cannot be used to identify the data of any other user. So that for a hack to succeed in getting mass user data, it could only work if all the keys relating to all of it were also stolen. Thus making the technical challenge for hackers potentially insurmountable. Even more so where users are free to store their keys in a variety of locations, non of which may be co-located with their data.

Furthermore, a behemoth like AWS might have a thousand data centers. Each with a thousand servers and be able to randomize storage over a truly awesome amount of cloud locations. There is strength in numbers in IT, as there is in nature, for herding animals such as Wilder-Beast and other herding animals, flocks and swarms that are confronted by a predatory species. The Inventor coins this the "Wilder-Beast" principle which is another natural logical effect, that is based on leveraging the mathematics of scale.

Suffice to say that the bigger the number of available storage locations—the harder to crack they all become. And if the pointers key is also kept online similarly according to these subject technologies, but at a different location. Then the user experience may be similar in terms of performance to that possible in the less secure current state of the art. Where for example the user device pulls both key and data down from the cloud only as needed as shown in FIG. 27 and FIG. 28. Then together they can provide a seamless and fast access to user data that is similar to the present level of user experience. But with improved data protection and security.

Because the only way to reassemble one user's data is to access the correct locations and to reassemble the data in the correct order regardless of where they are stored in the Cloud. The Cloud data itself may thus be rendered useless to hackers who are looking to steal user data in bulk. Because it is probably going to be impossible for any hacker, however gifted, even armed with quantum super computers and PhD qualified mathematicians to ever know or discover the randomized order in which any specific user's data was stored in the Cloud.

Perhaps Artificial Intelligence and Quantum Computing might eventually erode data security further. However, as readers will see in progressing through this specification these subject technologies have been defined so that they may also be implemented in whole or in part by AI programs and/or using Quantum computing architectures and algorithms. That are also part of these subject technologies. Those aspects and advanced concepts of these subject technologies are explained further below—with reference to FIGS. 30 through 39.

The storage record on the user's device, USB stick, or cloud storage provider such as Verisign is the only key capable to recover the data like a virtual dongle. Furthermore, even if hackers managed to get the key of one user, it would be of no help to them whatsoever with the rest of the data in the Cloud or data center! So that, it is hoped that all the big data handling corporations such as Facebook, AWS, Google, Apple and Microsoft will want to use these subject technologies to keep their user data safe. Certainly, the Inventor hopes to license it to all of them.

Vitally though, there are also benefits to be gained at the macro level for data holding organizations including Banks and retailers. Who can also reap benefits from these subject technologies. Because even if one user is careless with his or her data key or dongle, it will give no clue nor any way to access anything else. With the miniaturization of flash memory and chips onto bank cards, these may also be made capable of holding enough data to be used to store randomization keys and/or tally data.

It is hoped by the inventor that the subject technologies will herald the end of large-scale data thefts from commercial, military and government systems. That's a potentially huge breakthrough in the fight against cyber-criminals and hostile bad state actors.

Whenever users are operating a device which is accessing the Internet it must do so via various protocols and standard data interface standards etc., one of which is that the device must have an Internet Protocol (IP) address. Mostly IP addresses are provided to end users by Internet Service Providers (ISP) and mostly while the ISP may in its Terms and Conditions promise to deliver a floating changeable IP address; in reality most of the time end users get the same IP address. Furthermore, end users can request that they be given a fixed unchanging IP address. Anyone who hosts their own website for example will probably need a fixed IP address so that surfers can find it reliably. Whereas most surfers don't need a fixed IP address. Users can also apply directly to ICANN for a fixed IP address.

IP addresses map to geographic locations. When users visit websites the website operator can look up their IP address to discern their approximate location. This seems to have escaped the attention of many banks and financial institutions who are concerned primarily with establishing the identity of their users. However, this approach is creeping into use for intellectual property licensing. Probably because they are carved up according to geographic and jurisdictional rules.

However, these measures can sometimes be circumvented by using proxies, and/or Virtual Private Networks (VPN) that have geographically distant proxies in another country for example. IP addressing can thus be used in addition to the randomization subject technology, to add another layer of verification-security.

In a transaction according to this aspect of the subject technologies tally data such as the IP address plus date and time stamps of the last time the banking website was accessed can be recorded on the device such as a PC Smart Phone or Tablet or bank card. Furthermore an entire history of previous access data, comprising IP addresses and dates can be recorded on devices and bank records. Historical data can be saved and used as a virtual "tally-stick" or comparator which should be identical at both ends.

However, where a user accesses their bank account from a new device the bank may compare the data of the new device. A failure to tally can thus flag either that the legitimate client is using a new device, or that a fraudster is attempting to access the account. So that where the tally data does not match, further checks may be triggered to ensure that the current user is the true account owner and not a fraudster.

In another case a new device may replace an old device, so the IP addresses may be similar or identical, but no tally data exists on the new device. Again, extra challenge questions may be used. After which a new tally file can be written to the new device. Tally data may be ported to a new device from an old device.

Challenge questions may include one such as: "Is this the first time you have used this device to access your account?" Further challenge questions may be added to ensure the user's ID is verified and tied to the new device. Of more concern to financial and business institutions may be when the IP address does not tally with previous IP and geographic data. Again when the IP address and/or the system time zone running on a device tracks to hacking hot spots in Russia, China or South America as opposed to the user's home country. Then this sort of discrepancy may be used to raise a red flag; and trigger extra security checks.

Thus by use of the IP addresses and the tallying of historical interactions recorded as between a user's device and the networked service; service providers can screen out hackers using stolen log-in data; but who cannot provide tally data of IP address usage, and event logging histories from previous logins—nor answer challenge questions. Thus, suspicious transactions may be declined and the incidence of thefts may be reduced.

Artificial Intelligence algorithms may also be used to identify variations in user behavior patterns, and may raise red-flags accordingly. This may be accomplished by recognizing activity as being outside expected parameters.

In the case of streaming media one or more data blocks can take the form of a "stripe" of data written to, or read from a specific cloud storage location. The locations of which stripes can switch among a population of servers. On which the streaming data is being or has been randomized.

A sequential reading of a stripe of pointers can be used to access and buffer the streaming of media such as cinematographic works, or live events to consumer viewing devices. An appropriate timing window can be used to buffer the streaming data and streaming pointer keys needed to call it from the host locations may provide, like a time sensitive key. Timing windows need only be accurate at the time they are needed to point to the data blocks to be streamed. Timing windows may also have their period of transience time randomized.

So that data streaming can be monetized and paid for down to very precise time limits, and any time that is not paid for the key stream of pointers to call the data blocks to build the stripes that make up the stream can end as soon as the supply of pointers is used-up. So that one hours' worth of pointer stream will allow the viewer or maybe an online gamer one hour of media stream, or online gaming access. That may be randomly downloaded or accessed in random length data stripes or blocks from a plurality of servers.

Users need not be aware of this complexity as pointers keys may be downloaded in parallel threads with stripes or data blocks. Data threads may stream through different ports as systems designers may prefer. Indeed port usage offers a further possibility for randomization.

These aspects of the subject technologies may prove very useful and well suited to secure pay per view entertainment, and online gaming for keeping communications secure, metering and monetizing them. Because for security applications the randomized stripes of randomized data blocks can be switched not only between server locations but also between channels in the case of secure voice and video communications, or any communications.

In the case of secure networks such channel switching may be introduced along with the server switching. So that even live communications data may be caused to randomly channel switch, randomly route-switch, and randomly server or location within server switch according to the steam of pointers. A stream of pointers may also similarly be provided through channel switching, route-switching, and server or location within server switching. Reading data ahead of its due-time into a buffer may be used to smooth the process out for users.

In secure communications as the military may need, channel-hopping radio communications might be also be used to provide the stream of pointers for other streaming or live communications. Channel-hopping requires both nodes to "hop" or switch channels according to a shared algorithm. Which is sufficiently unpredictable for eavesdroppers to correctly guess the next hop or switch. For the users of channel hopping communications they may be relatively unawares of and hence unimpeded by the fact their devices are continuously switching channels.

The possibilities are endless for routing the streams of pointers differently than the streams of data blocks. So that interception of either one will not easily yield useful time sensitive information to an adversary. So that switching data channels according to a preset but secret algorithm, as well as randomizing the data itself, can be leveraged. Thereby to make it very difficult for an adversary to get enough data blocks to be able to resemble them, even where some channels are intercepted some of the time. So that the subject technologies can be used in the modern battle space for networked communications.

Time shifting stripes of data may also be used to move data blocks such as a frame of audio-visual data relative to other frames within a sequence. The frame may be randomly shifted out of sequence; and the pointers needed to shift a data stream back into the correct order to play correctly used as a means to scramble and unscramble data providing a modest time delay of a second or so. Which can be tolerated in two way communications.

Say for example audiovisual communications are two way but are time randomized by up to one second in each direction. So that communications can be made more secure with an acceptable delay. To render communications incapable of being unscrambled quickly. This may be used to add an extra layer of security on to all the other layers of randomization disclosed for high security situations and applications.

Less time sensitive data may be randomized over much longer periods of hours for even more security. So that time shifted randomization may provide a powerful tool for safeguarding and prioritizing those military communications that are of vital importance; but are not ultra-urgent. Because not everything that is important is urgent, and not everything that is urgent is important.

Military email of a non-urgent nature may be temporally randomized, so long as it arrives in time to be used without any adverse consequences. For an example scenario, the joint Chiefs have been notified that Internet connectivity is fluctuating in locations suggesting possible undersea data incursions.

In message level one the most urgent, the nearest US Navy submarine is tasked to sail to the affected fiber optical infrastructure location. At some point en-route the reasons for going (a level two urgency) may need to arrive, and as the submarine is getting into the zone where special operations are to be conducted; the most vital and most secret information can stroll in last. Even though it may be premier in importance and the secrecy of which details are the highest. So that such randomized and/or prioritized timing of information stripes or blocks is another layer of randomization that can be useful. Especially where secrecy needs are high, and bandwidth may be low. As can be the case for submariners and within parts of the US Navy. To smooth out the demand for bandwidth and maximize the randomization and security of the data. Getting the right orders at the right time, or at least in-time in every possible sense, may be used to increase the overall security of communications. Which may improve mission success rates, and save the lives of our war fighters.

Another benefit of which methodology is that the space in between this highly secret message can be filled with less important chatter which an eaves dropper will find it very difficult or impossible to disentangle from the more important information. We may think of this as adding security by temporal randomization and the entanglement of important information with unrelated information. That may also be randomly time shifted. A pointers/key may be used to reassemble the messages.

Furthermore, the bandwidth optimization of available communications channels may become of vital importance in modern warfare with a near peer, or rival super power as China may become during the life of this patent specification. This is because an advanced adversary would likely try to deprive the U.S. military of its advanced sensing and communications capabilities.

Space assets may be massively reduced, and suddenly the effective use of the remaining bandwidth could be of truly vital strategic importance. So these subject technologies should be of keen interest for U.S. military planners and strategists alike. They may be leveraged in adverse situations so that the most important communications, sensor and targeting data can still reach the people and systems who need them to arrive intact and on time. The issues of battle degradation in the course of a major war and mitigation of systems damage is a huge topic in conflicts where technological superiority should no longer be taken as a given.

Communications may also benefit from randomization in real-time. Here is a simple example. The interfaces of two systems may begin to communicate with each other for the first time. Their programming tells them to agree on the meaning of a set of characters to create a simple transient randomizing interface protocol language (TRIPL) for use in encryption. They both generate a random number between maxima and minima. They exchange their initial numbers add them together and divide them by two to agree the common number rounded to the nearest integer represents an "A"; then they repeat the process until they have completed the alphabet and all the numbers needed for a number base system and any other symbols desired. Thereafter they have a common set of characters in a language that only they know. It is random and exists nowhere else in the Universe.

They may use this language for a random time period. Then once one or other randomly timed between maxima and minima triggers a reset, they may create a new randomized language for use over another random time period. Users at either end of the randomization bridge do not know or need to know how their secure time randomizing interface protocol language encryption (TRIPLE) connection works only that it does.

Voices can be converted to text, and text can be converted by to speech. So that synthetic speech can be communicated as text using such a simple TRIPLE protected communication channel. This may be of considerable utility for battlefield communications and for sensitive telephone calls to be made by CIA operatives who are in hostile locations. Via an application that converts the speech to text, applies TRIPLE and disguises their voices in calls back to Langley for example. So that agents can't be identified by their voices, and their conversations can be secure.

More complex implementations can be made to communicate more complex data such as images and video as well. Even without complex implementations binary data which is very simple can be converted to bigger bases agreed similarly randomly. Then the numbers represented by randomly chosen numbers that correlate to the base in which the numbers are being expressed.

It not being possible to list all the possibilities for these randomized TRIPL interfaces. These are just a few examples at the simple end of what is possible using these subject technologies. Having introduced various aspects, in the context of a few examples of the subject technologies and an outline of which drawings are most applicable to them—more specific aspects are now explained in more depth in relation to the drawings.

Similar terminologies: transient random interface protocol language (TRIPL) and time randomizing interface protocol language encryption (TRIPLE) may have similar and overlapping meanings. TRIPLE is achieved, using a TRIPL. So all TRIPLE includes use of a TRIPL, the time randomizing aspect of TRIPLE is where one TRIPL is replaced by another, in the broader TRIPLE process. TRIPLE systems and methods may be used by information processing machines, and humans may in some cases operate under a TRIPLE method, and create TRIPL by operation of a method.

FIG. 1 is a system flow diagram. It shows how two systems or devices may operate together to create and operate according to a randomized interface creation protocol that is provided by a process implemented as a program running on both a first system "A" 3001 and a second system "B" 3002. Provided both systems have the necessary attributes they may be considered to be compatible. But the systems do not have to be identical. The system 3000 may be run on any two or more compatible coupled and cooperating systems. Furthermore, the program may reside in firmware and run on a computer processor unit and operate upon flash memory within a networking card in either system, and/or it may reside in a hard drive and run on a computer processor and operate upon a random access memory within a device such as a personal computer, or mobile phone or tablet. It might also similarly run in the apparatus of a router, and even with its processing, memory and storage in different physical locations such as over a network. So that it should be understood that these subject technologies are not tied to any particular configuration of hardware, so long as the available hardware is capable of cooperating to perform the task of creating the transient randomized interface protocol language; then implementing and using it to allow the two systems A 3001 and B 3002 to communicate—using the transient randomized interface protocol language they have created for encryption and decryption. Then after a random period of time (its period of transience), one or other system may generate a random reset signal or "ping" which uses the current transient randomized interface protocol language, in communications while a new transient randomized interface protocol language is created the same way as the first. This random resetting and creation of new transient randomized interface protocol languages continues until the communication link is terminated.

It should be understood that once two systems have created a common transient randomized interface protocol language, they may resume using it at their next connection, or they may start-over and generate a new transient randomized interface protocol language. Furthermore, it should also be appreciated that using a transient randomized interface protocol language according to these subject technologies does not preclude the use of conventional encryption. So that there is no need for any loss of security when moving to or adding a transient randomized interface protocol language (TRIPL) interface. In fact the TRIPL interface can run underneath conventionally encrypted communications if so desired; so that communications may be conventionally and TRIPL encrypted simultaneously. Which should confuse hackers who may crack, for example, a HTTPS data stream overlayed onto a TRIPL encrypted data stream. A TRIPL encrypted data-stream may also be used as-is without any conventional encryption.

The system 3000 may or may not be operating underneath conventional encryption, and/or behind a firewall. Such additional detail is not shown. What is shown is that system A 3001 initiates creation of the TRIPL with a signal that may be called a ping 3005. The initiation signal or ping travels over any of the following WiFi, Blue Tooth, Local Area Network, Wide Area Network, Internet or other channel 3010. Which channel may or may not already be secured by conventional encryption. For example the two systems could be in a shared home environment, or a battle space, or even between earth and a satellite. The system 3000 can be implemented across domains, so long as the basic hardware apparatus and software are correctly installed and operating normally.

When system B3002 receives the initiation signal or ping from system A 3001, then the system decides to accept or reject the initiation of the TRIPL creation process to create system 3000. System 3000 shows an off-page connector. The detail is not shown, maybe an artificial intelligence or human intelligence decides whether or not to accept the request to initiate creation of the TRIPL based communication. Maybe this option is in a preset menu the choices of which may be automatically set to accept or reject TRIPL creation requests. If the decision is to reject the request, then the communication is terminated 3020. Again there's no need to see the details of the termination. If however the initiation request is accepted, then this is notified by way of a feedback signal from system B3002 that goes back to system A 3005. System A 3005 then decides to initiate the program 3025 to create a TRIPL for use in the system 3000 comprised of system A 3001 and system B3002 working together to create, agree, and share the TRIPL. So that the system can create and run time randomizing information processing language encryption (TRIPLE). The program is set to run a repeating loop 3030 until the arrays (in the memory of system A 3001 and system B3002) are fully populated with the values comprising the TRIPL.

The actions within the loop 3033 are as follows. System A 3001 creates a pointer 3045 to a random location in the seed data array 3050, then system A 3001 records that pointer 3045 in the TRIPL pointer array 3060. System A 3001 then also sends the same pointer value to system B3002, and system B3002 records the pointer value 3070 into its own TRIPL pointer array 3075. So now the first pointer value is stored in the first locations of both the TRIPL pointer arrays of systems A 3001 and B3002.

System B3002 now responds by randomly creating a pointer 3080 to a location in its seed data array 3085, system B3002 records this pointer 3085 into its TRIPL array 3075, and system B3002 sends the same pointer value also to system A 3001, 3090. System A 3001 records the pointer from system B3002, 3055 into its local TRIPL pointer array 3060. Then system 3000 tests to see if the pointer arrays are full 3040. It only needs to test the local pointer array of system A 3001, 3060 to see if there are any spaces left in the array, or if a counter has reached a preset target value with each write operation. If the pointers array test returns the answer of full (or equals one), then the loop will terminate 3020 because the TRIPL pointers key will be complete for both systems A and B. In this example, this is the first time through the loop, so the test will return a logical "no" or zero value, and this will feedback to cause the loop to run again and to generate a second pointer value that is again duplicated in the pointers arrays of systems A and B. The loop will continue to allocate pointers to seed data values or data objects until the logical test returns a "true" for the logical test of whether the pointers array is full. This can be a test on the array, or may be determined by using a counter of a variable value returning a test value as being equal to the desired amount of pointers required.

Persons of skill in the art may appreciate that in the creation of the TRIPL pointer array that it is filled in the sequence in which the process occurs over time. This characteristic enables TRIPL arrays to be indexed from their first value and first index location to their last. A counter may be used to cycle through the values of an array, and the counter may correlate to the index location with or without there being a parallel index array per se.

Furthermore, where a seed data value or data object is pointed to at random for inclusion, a logical test may be performed to check to ensure this seed data element has not already been used; and if used another seed data element or data object may be chosen. The size of the seed data set will affect the probabilities of two identical pointers to any individual data element of the seed data. Similarly, the complexity of the TRIPL generated will affect the size of the TRIPL. Where for example a seed data element has a value capable to convey a meaning such as a whole word, or perhaps even a paragraph rather than a mere character, then a huge amount of information may be conveyed with meaning, using no more than a few pointers.

Once the TRIPL is created it may be used for a period of time 3095, which time periodicity may be randomized. The periodicity of these timer triggered re-set 3095 events may be varied randomly, and the minimum and maximum periods for the range of such periods may be varied according to the preferences of a user and/or system designer or manufacturer.

Imagine for an example application that a CIA agent has mobile phone with a TRIPL application to allow secure communication by TRIPL encrypted speech. He calls his colleagues in Langley. Speech in both directions on the call is first turned into text, then the text is run through a basic TRIPL to produce a stream of pointers. The pointers address text characters capable to reconstruct their speech in each direction. The information is received in near real time, at both ends via synthetic speech. This also has the benefit of disguising the voices of agents on the call in both directions. Anyone trying to intercept this message in transit will get nothing other than a stream of pointer values, which without the seed data set and the TRIPL used will be useless to them. This is a fully time randomizing information protocol language encryption (TRIPLE) implementation.

In such specialist applications seed data sets and TRIPL may be created and installed before the two devices are used. For example if the CIA wished to include a whole series of fixed protocols into a TRIPL as a hard-wired preinstalled set of meaningful data objects?

This may be done before the devices are deployed in a live operation. There may for example be emergency protocols that can be called by the TRIPL which contain comprehensive instructions, or even instruction manuals. Which may be called-up as part of TRIPLE communications. Thus avoiding the need for the protocols and their detailed instructions to ever pass over potentially hostile networks. So for example a meaningful data object may be called-up by a pointer to its location. A meaningful data object within the protocol may be: "Abandon mission, destroy the equipment and await extraction." Such sensitive protocols may be stored in memory modules that are capable to self destruct. Details of which need not concern readers.

Similarly US Army and Marines may use these technologies to communicate in close to real time, via speech over radio transceivers. Computational communications may also be treated similarly. But they are not covered in detail here because they may be less readily comprehensible to humans in binary or assembler codes or other machine languages. As for the languages that artificial intelligence may eventually produce using these TRIPL technologies and variants. These might be even more difficult to explain to humans. Which is why the Inventor has tried to use examples of the subject technologies set in human scenarios. It should be understood that these examples should not be interpreted as restrictive of these subject technologies and methods of operation to any one class of communications, or apparatus.

Figure 1A:
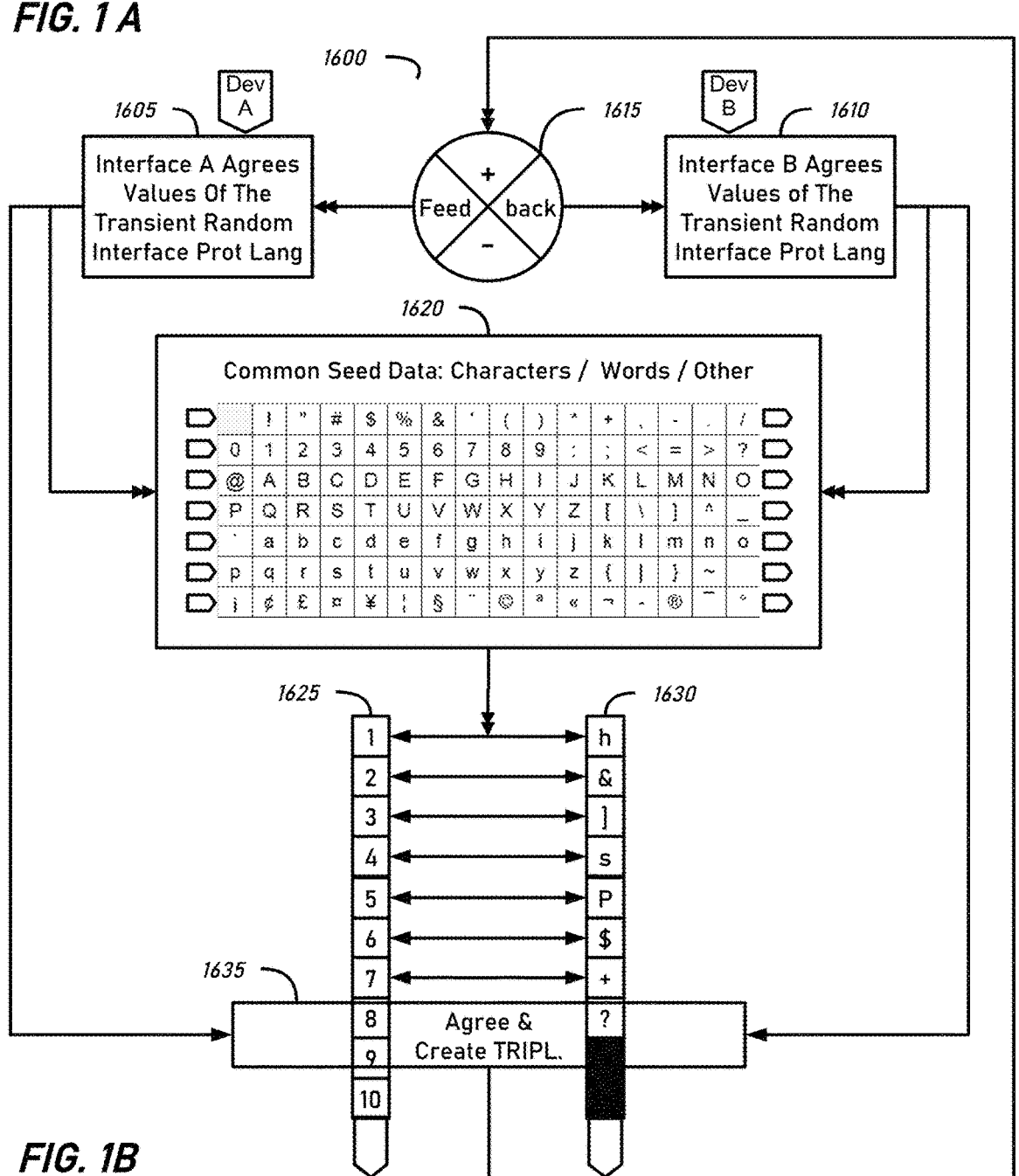
FIG. 1A is a mixed schematic and block flow system diagram of aspects of the technology used to create a transient random interface language in accord with the subject technologies.

In order to try to keep the TRIPL creation process simple enough to explain one possible embodiment to illustrate its principles, we may assume a base language of our system 3000 is English, or other European languages that use the same basic character set and the numbers zero through nine in base ten and some math symbols. This approach is shown in FIG. 1A. But in reality it should be clear to persons skilled in the art that, any language, or combination of languages, number, or symbol base system may be used. Indeed the complexity of the TRIPL can be vastly increased to suit a specific task.

As explained above battlefield communications via voice, a simple speech to text conversion may be used to put the speech into a form that can be simply TRIPL encrypted, and a synthetic voice may be used to convert text back to speech in both directions. So that this simple TRIPL might suit well a battlefield radio communications system, for close to real time secure voice communications. More complex versions may be created for handling image data, and targeting data. Furthermore, in the case of artificial intelligence embodiments, the artificial intelligence at either end may be permitted more freedom to decide how they will agree their own TRIPL. Data may in all cases be reduced to binary for digital communications, and binary representations of more complex bases and data objects.

Where two systems don't begin with a shared seed data set, they may create one similarly, or use a data set from a source they can both access. For example an English language dictionary could be read into an array of seed data, and used. Using more complex data objects such as words and even whole protocols that need only a pointer value to convey their entire contents and meaning, may be extremely efficient, and extremely difficult to crack without access to the seed data.

Figure 30:
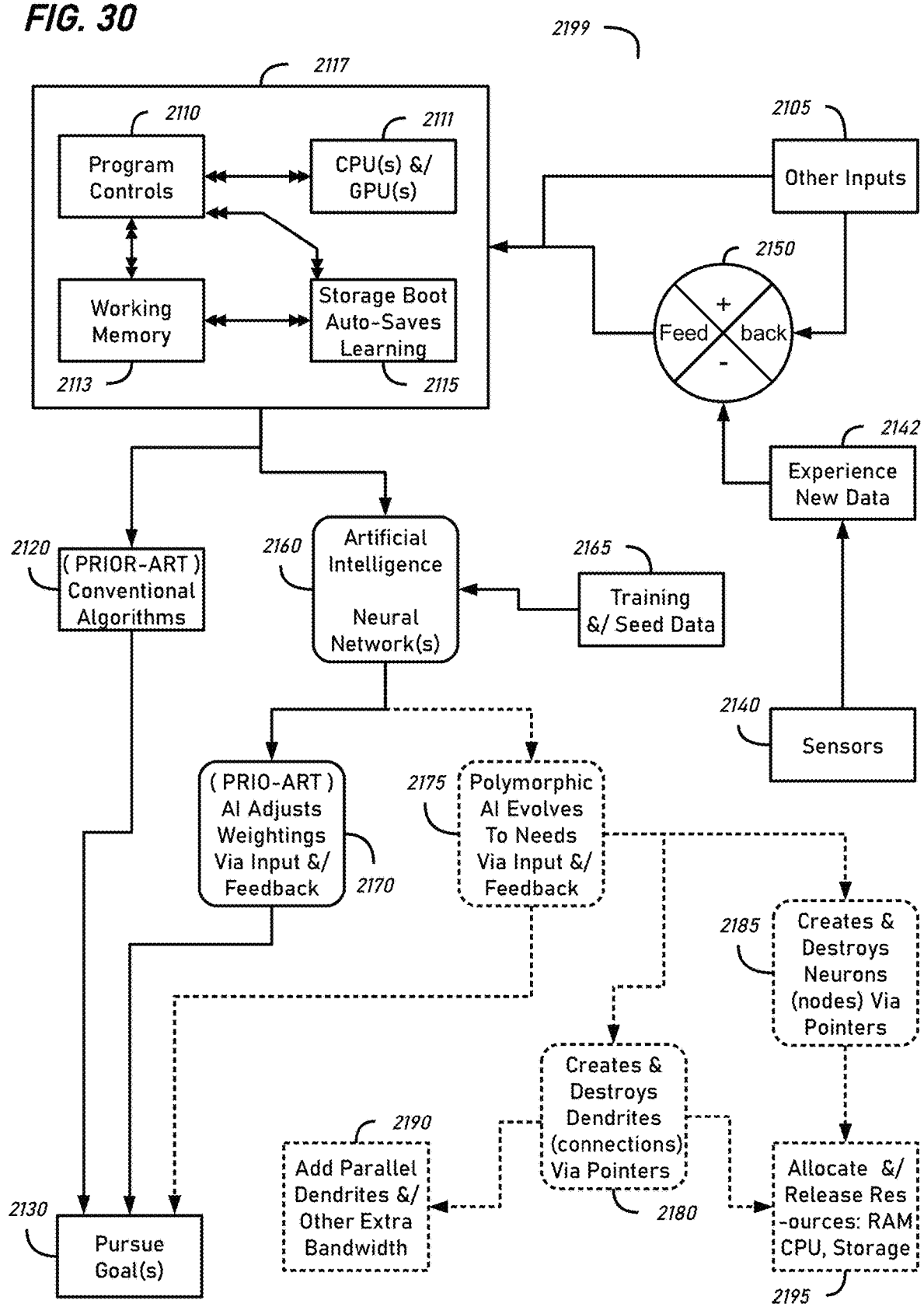
FIG. 30 is a block flow system diagram including the augmentation of the system by artificial intelligence that is in accord with aspects of the subject technologies.

These subject technologies include the use of a pointers key to pull down data that has been randomized into cloud storage. It should be appreciated that some very sophisticated TRIPL may be created where they use seed data that is stored according to those aspects of these subject technologies as shown in FIGS. 28, 29 and 30. Even though those figures are primarily addressed to secure cloud storage. They are intended to be compatible with TRIPLE. Indeed when all the subject technologies of this specification are taken together-they may be capable to provide a paradigm shift for the better in data security.

There is nothing to stop the two systems A 3001 and B3002 of system 3000 of FIG. 1 or a similar more complex variant of system 3000 using an online source such as Wikipedia, a CIA operations manual or the collected works of William Shakespeare as their seed data set. Where for example a pointer points to an entire protocol or complex meaningful data object. Consequently, intelligence agencies might find TRIPLE useful in their communications and in their data storage and access facilities. Say for example a pointer value points to a protocol of what to do in a particular situation, and all that is needed to convey all this information is a pointer to that one single location.

However, in the ubiquitous context of WiFi to web to WiFi communications, or smart phone to smart phone type scenarios as between two TRIPLE capable devices with TRIPL creation applications installed, or embedded into their networking apparatus, these systems will be swapping around mostly binary data. These examples have been made human intelligible by using English and base ten for their seed data sets.

However, seed data sets may be based on binary, or any number base system such as hexadecimal, and known image and data handling formats. The complexities of which may be proprietary in some cases. Certainly some seed data sets may be copyright protected works. Even with potentially incomprehensible artificial intelligence created TRIPL. The essential features of a TRIPL being negotiated and agreed between two systems, and expiring 3095 after a random time period. Then the next TRIPL being created using the current iteration can still be applied across all potential applications and devices. Means that eavesdroppers will not know when the TRIPL is replaced according to the randomized timer 3095 periodicity, and consequently eavesdroppers will always be chasing a moving target. This may make it not worth the time and effort needed to crack any one iteration of a TRIPLE interface. Because by the time they might be able to crack one TRIPL, it may have been replaced. Probably never to be used again. So that real-time communications in particular may thus be protected using these subject technologies.

FIG. 1A uses a very basic character set or database of meaningful data objects. The TRIPL system and method 1600 could be equally configured to leverage bigger common seed data character sets or including words or other data objects or patterns capable of carrying more complex meanings and presenting smaller targets within a larger whole. Furthermore, as well as binary systems TRIPL may be created using Quantum computers, operating on Qbits, and this may eventually also be under the control of artificial intelligence (A) algorithms; including the Inventor's own polymorphic artificial intelligence (PAI) (explained below).

Turning now to the detail of the TRIPL 1600 of FIG. 1A, interface A which is the interface of one machine or system or black-box module such as a network card or router that has been programmed to agree the values of the TRIPL, with interface B which is the interface of another machine or system that has been programmed to agree these values of the TRIPL that is essentially similar. It should be noted that TRIPL interfaces can have their own bespoke CPU and enough randomly accessible memory (RAM), and firmware to store and run the TRIPLE program independently of the machines that they may serve. For example, TRIPLE capable network cards may find favor with PC and Apple Mac users, or be connected through or a TRIPLE router, hub or cluster. Eventually, every mobile device, and Wi-Fi connection that uses radio-frequency (RF) communications or wired connections may interface through a TRIPLE interface.

TRIPLE may be particularly useful for peer to peer, and local device to device connections and any combination thereof. For military battlefield operations because TRIPL operate between two or more nodes, they can vary for a data block passing over a wide area network, so that a different TRIPL may be used between pairs of nodes. A key benefit being that in war fighting operations the time and effort required to crack any one TRIPL is not worth the effort, because no sooner has one TRIPL been used for a random period of transience—then another replaces it. So that hackers and eavesdroppers are always chasing a moving target where TRIPLE is in use. On top of which channel hopping over wide bandwidths can be used.

Furthermore, there is no incompatibility with adding conventional encryption before or after data blocks are passed through a TRIPL. TRIPLE may be implemented in software, or in hardware such as network cards. It is hoped that network cards will be modified to include the TRIPLE program and enough processing power and memory to use them effectively. But these processes could run on a PC or other system and still be output by conventional networking cards and apparatus. This is because the technology is capable of being implemented on a simple slot in card, like a network card for PCs that requires only a modest local CPU, an amount of on-board RAM and firmware to store the program code to run it.

TRIPLE firmware can be capable of receiving updates and using common external seed data. Reader's might see this as like making all network cards and interfaces come up to a basic level of TRIPLE security. Which is entirely achievable with very little change to the hardware, and in a market where small CPU/GPU, RAM, SSD, Flash-Memory and EPROM etc., are being miniaturized and falling in price.

TRIPLE may run on existing hardware with existing interfaces and network cards etc., by utilizing just a small amount of the local device CPU's processing capabilities, RAM and storage. So that TRIPLE interfaces can be run on many of the smart devices as they already are by deploying them as Apps.

The new level of security that can be added by the constantly changing and evolving TRIPLE is also likely to be very useful for military applications for secure networks. That an adversary will not know how to crack because monitoring the traffic does not help when the TRIPL is constantly changing.

When data moves over longer distances it may pass through multiple TRIPL so that trying to study it along the path should cause confusion as the adversary eavesdropper will be looking at different looking data intercepts when the same data passes through multiple TRIPL. So that even if they can see the same data at multiple locations, they not realize they are looking at the same data.

Even if one TRIPL within TRIPLE communications is cracked it will probably get replaced before any damage is done. This constantly changing TRIPL at the heart of TRIPLE should be capable to allow war fighters enough real time protection for relatively secure battlefield communications. That cannot be cracked quickly enough by an adversary to compromise time sensitive battlefield information.

Interface A 1605 agrees the values of the TRIPL with a compatible Interface B 1610, within a feedback process. The creation of the TRIPL is triggered at random time intervals, by a time module present in both interfaces 1642. The interfaces by a feedback process 1615 agree the meaning of the characters, words or other meaningful data objects that comprise common seed data. For example, after the reset "ping" 1640, Interface A and B may take turns to randomly assign characters to numbers, or they could use other ways of selecting agreed values. In this example an array is created in both Interface A and Interface B, where number values or pointers 1625 correlate to one of the characters in the array of meaningful data objects from the common seed data 1620. To create the agreed values 1630 for the TRIPL. In the example it can be seen that the value or pointer 1 correlates to the character "h", and the value or pointer 2 correlates to the symbol "&", and value or pointer 3 correlates to the symbol "]", value or pointer 4 correlates to the character "s,", value or pointer 5 correlates to the character "P", value or pointer 6 correlates to the symbol "$", value or pointer 7 correlates to the symbol "+", and value or pointer 8 correlates to the symbol "?", with the remaining symbols and characters yet to be assigned as the two interfaces create their agreed character set by assigning numbers to them and vice versa as interfaces A and B cooperate to match number values or pointers to characters.

Once they have finished assigning values to meaningful data objects, then they have a common agreed interface protocol in which they may communicate in any language that can use that character set. So that all characters, symbols and bigger more meaningful data objects are represented by their agreed values and communications are achieved by exchanging streams of these values or pointers. Until the randomly timed 1642 reset ping is triggered again 1640.

Whereupon the values of meaningful data objects are randomized and agreed again to the next iteration of the TRIPL. The meaningful data, comprising seed data may be any data object. For example, the entire contents of a dictionary can be given agreed values, multiple language dictionaries can be used, and words of the same meaning can be randomized between languages. So that agreed word-1 may be French, agreed word-2 may be German, agreed word-3 may be Navajo, agreed word-4 may be Spanish, and the TRIPL will create this hybrid transient language for use over a limited time period after which another language is created and so on. So that it is too difficult and/or not worth the effort to try to crack any one TRIPL. Because no sooner has it been cracked then it has been replaced never to be used again.

The maximum seed data that is potentially usable may be as large as the sum of all knowledge that is in electronic form. So that the TRIPL might agree to use a novel as seed data, wherein agreed words are taken by page number, line number and from left to right for example. So that both TRIPL agree to use one or more eBooks as seed data. Furthermore, number bases may be randomized for math functions. So that random number bases may be used for calculations in a similar way. The possibilities are infinite. Star charts could even be used as seed data. This example has been kept relatively simple. Once all the TRIPL agreed values are all set, then the agreed values or pointers to the agreed values can be read into an array, or array of records so that meanings can be attributed to all the agreed values while the language is used. More complex data such as images and sounds, such as spoken text can be used similarly. So that two computers with internet access may even select their seed data randomly from the Internet so long as they can agree the meanings of the agreed values they use, the possibilities are infinite for the TRIPL that can be created used and then deleted without anyone ever even knowing what the TRIPL was.

Figure 1B:
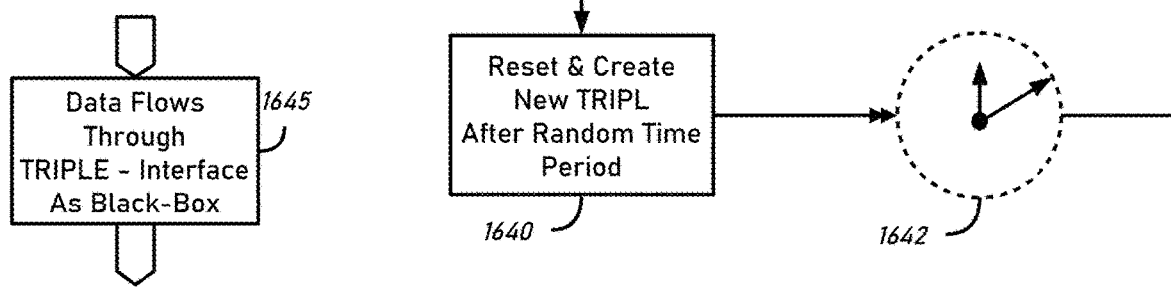
FIG. 1B is a top-level block flow diagram of an aspect of the subject technology used as a black box module according to the subject technologies.

FIG. 1B is the TRIPLE interface between two nodes, where the process internally is not knowable on the outside and there is no need to know the details of the TRIPLE on the inside. So that from the user perspective the TRIPLE interface is a secure black box that may operate over local area networks such as a battle space or office network, or a wide area network across an organization such as the CIA or DoD. The complexity of the TRIPL used internally can be scaled to match security needs in specific applications.

Figure 2:
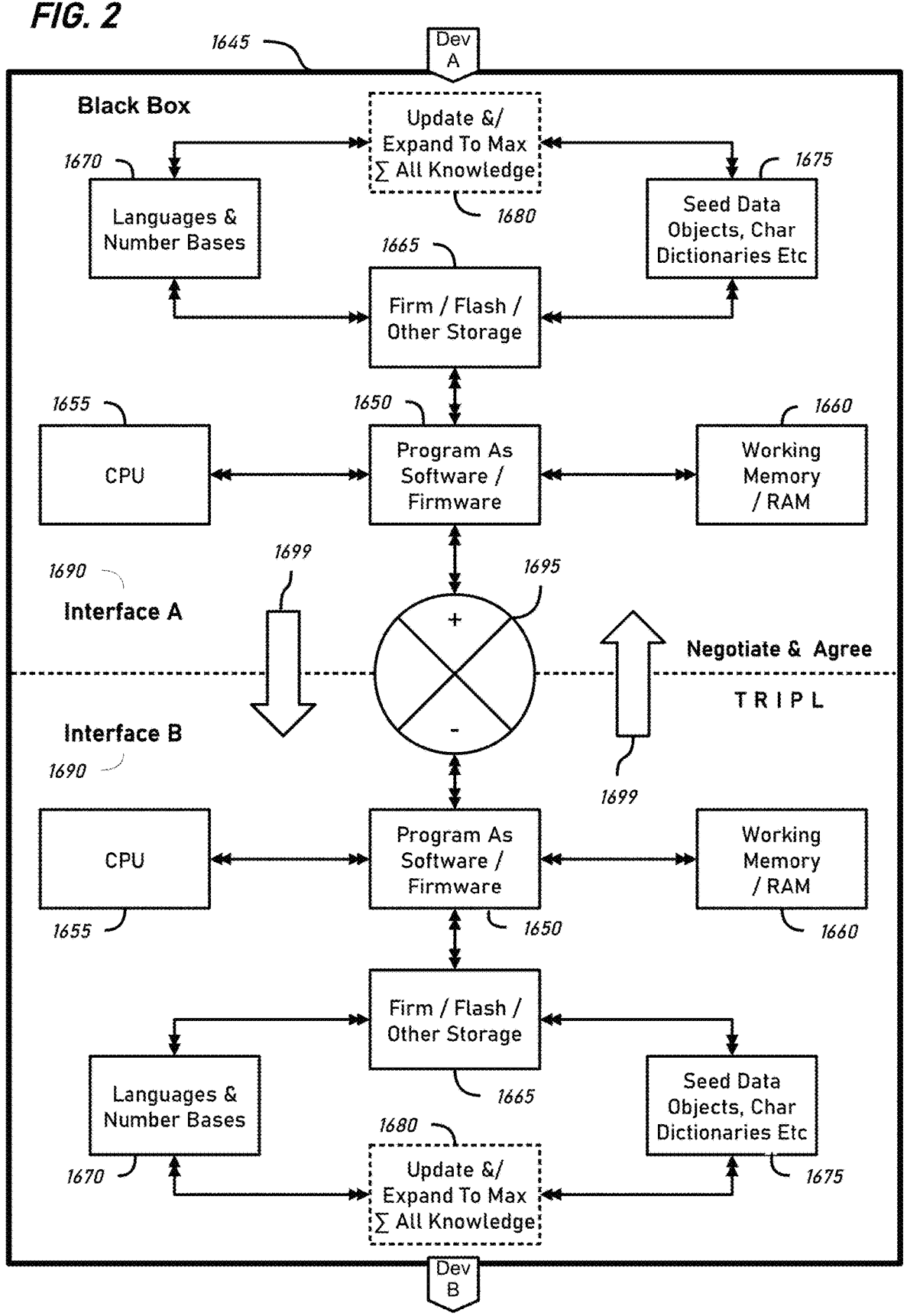
FIG. 2 is block flow system diagram of an aspect of the subject technology used as a black box module according to the subject technologies.

FIG. 2 is an expanded view inside the black box TRIPLE system 1645 of FIG. 1B. It shows Interface A and B1690 as being identical. But they need not be identical in their details so long as they are compatible. The program or application can be provided in software and/or embedded and/or installed into firmware 1650. The program runs on the local CPU 1655 and uses the local working memory or RAM 1660, it may be stored and bootable from local firmware or flash memory 1665, and capable to operate on the various forms of seed data characters, and or dictionaries 1675, and/or known languages in text and/or speech 1670. Which seed data sets may be capable of updates and/or expandable in some systems to a maximum equating to the available on-line sum of human knowledge 1680; so long as the data is in a networked electronic form connected to the TRIPL interface.

The newly created TRIPL data may be stored during its use into either the flash memory 1665 or held in working memory during operation. So that once activated the programs 1650, in both Interface A and B using those resources, use a protocol and feedback process 1695 to create a succession of new TRIPL for use during random length periods of time in TRIPLE communications. That facilitate secure TRIPLE protected two-way communications between Interface A and Interface B1699. They use a language only they know that will exist only fleetingly during use, after which each will be automatically replaced by a new TRIPL.

Users however do not need to know any of that, they just need TRIPLE capable network cards, or devices running a TRIPLE App, or other compatible variants to gain end to end encryption with no keys per se, just a succession of secure disposable languages that are transient in nature and mostly not worth the effort to hack.

The principles of a basic TRIPL may be augmented by using A and Quantum computing. These may be in binary, or any number base system, and they may ascribe meanings to data objects that may or may not make sense to humans. But the TRIPL they may create as between themselves may stay between themselves. It may never need to be or be communicated outside their closed loop, no record of TRIPL needs to be kept. The larger the data sets and seed data they are able to use, the more combinations of possible values and languages they will be able to create.

However, it may not be desired to let them make unduly complicated languages. Which is where a protocol for the agreement of values can be used to constrain the level of complexity, and processing power needed. So that an acceptable rate of data throughput is made possible.

Some TRIPL may be better suited to certain data types. An optimization option for the types of data the TRIPL will mainly be used for may be included in TRIPLE applications and network cards. Next the capabilities to randomize and distribute the transmittal of data blocks or stripes across maximum and minimum time periods, and data blocks, or stripes of randomized sizes, as well as randomization of the routing of these data blocks or stripes passing through networks is added to these subject technologies. So as to further compliment the overall security of data and communications.

Figure 2A:
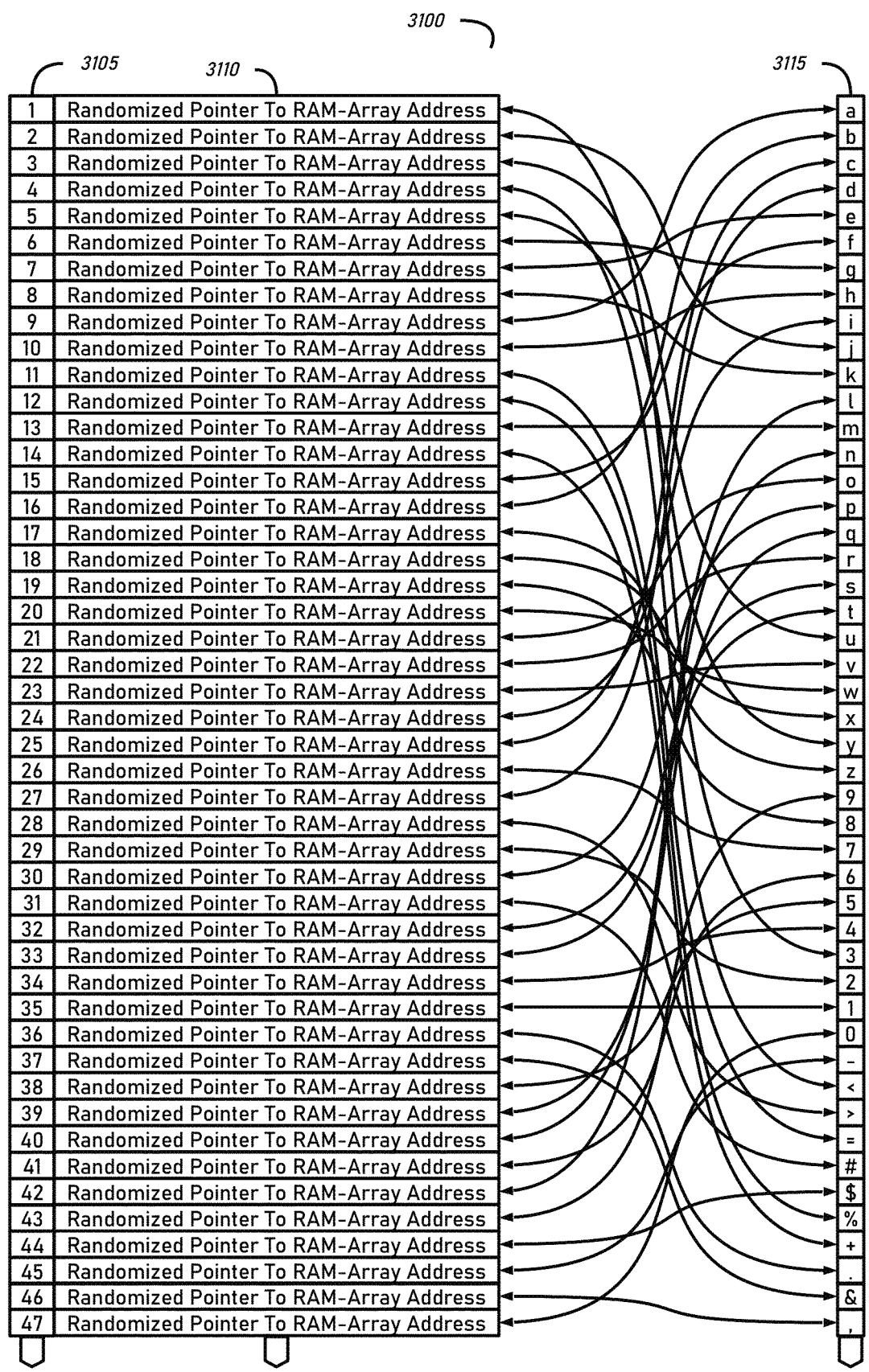
FIG. 2A is a schematic diagram of an array of character values and their index configured according to an aspect of the subject technologies.

FIG. 2A shows the creation of a TRIPL 3100, based on randomized pointers 3110 to an array populated with seed data in the form of alphanumeric characters 3115, and the index location values in the array of pointers 3105.

This randomization of pointers 3110 and the values of the array 3115 may have been preset, or it may have been created in a TRIPL negotiation as explained in previous figures, such as FIG. 1. It may also be left over from a previous communications session between two devices or nodes; for use as and when they reconnect. Devices may store multiple previously negotiated or installed TRIPL from previous interactions with other devices. Their historic tally data records may be used to inform both systems if they recognize each other. To see if they still have a TRIPL in common. If there is no TRIPL in common existing between two devices, they may create this TRIPL as a new TRIPL.

Use of the addressing mechanism of pointers means that these relatively meaningless values of the pointers themselves may be used as the basis of information exchange communications using TRIPLE. This is good because they will most likely be totally alien to and unrecognized per se, by many cryptographers, hackers and crackers who may intercept them.

Furthermore, as previously explained TRIPLE may be used in addition to existing encryption in the art, without conflict. This may permit an additional layer of deception, because regular cryptographers may crack the conventional encryption only to be left with a stream of meaningless pointer values. Which it is hoped will leave them baffled, and may cause them to believe that their decryption efforts must have failed. So that while TRIPLE should not be confused with the encryption available in the art. It may be boosted in efficacy by use in combination with those known encryption technologies. Furthermore, such double encryption with TRIPL plus SSL etc., is a new combination that may have more value than the sum of its parts. For these reasons.

Using an array of pointers 3110 with an index or indexable capability 3105 has other advantages in that it may be more secure than using a TRIPL based on using the randomized characters represented in this example. In the following FIGS. 2B and 2C the distinction as between using the pointers to the values or using the values is not shown for the sake of clarity. It should be understood that though these details as provided in the system of arrays and pointers 3100 of FIG. 2A, are not shown they may be present or the values may be being used directly.

Figure 2B:
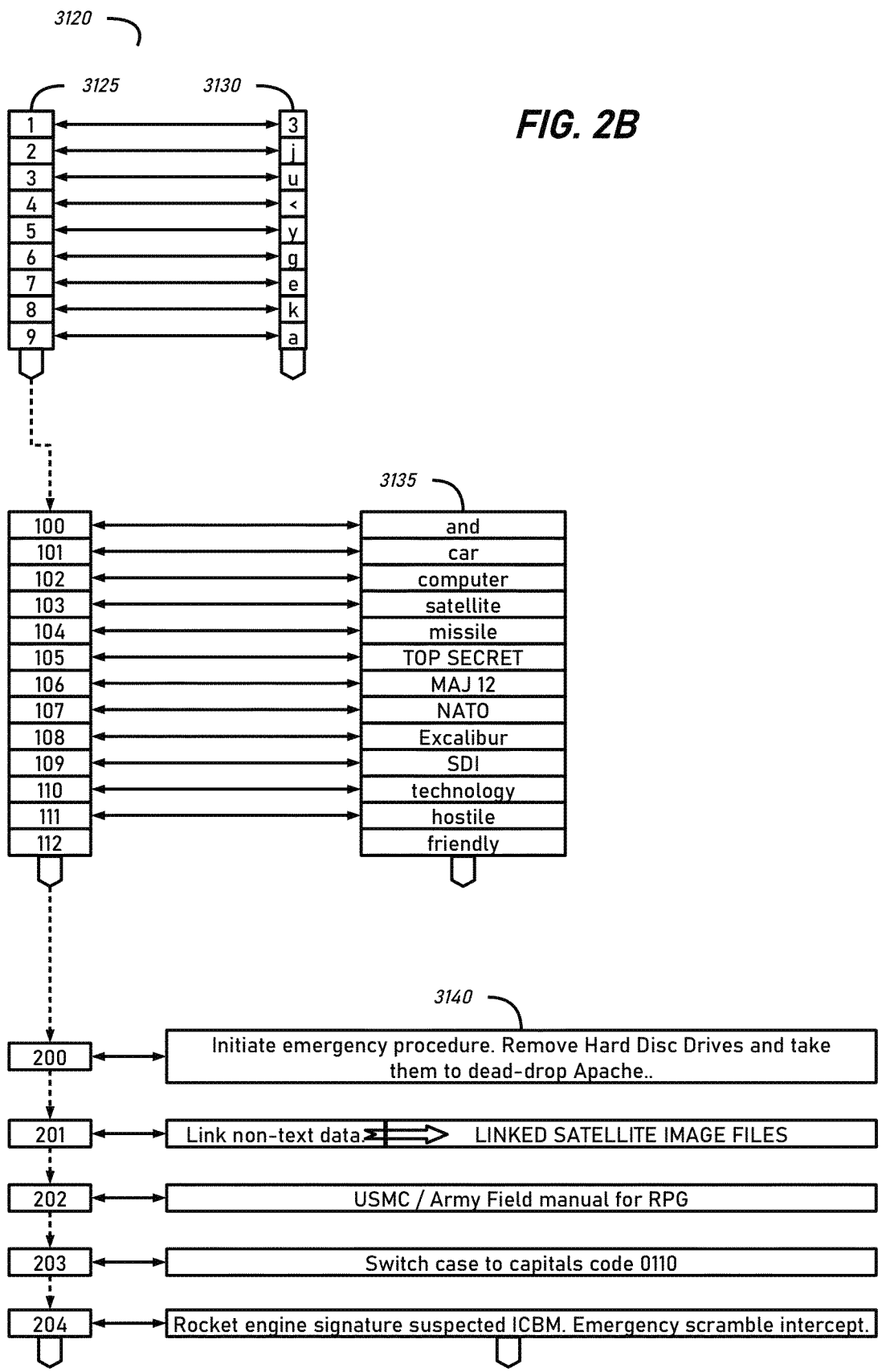
FIG. 2B is a schematic diagram of an array of character values, string values and more complex data object values and their index configured according to an aspect of the subject technologies.

FIG. 2B shows some extracts 3120 from the same values for the array index 3125 locations 1 through 9 as reproduced in simple form from those of 3100 of FIG. 2A. Here again the $1^{st}$ index location translates or points to the alphanumeric character or value "3", the $2^{nd}$ index location translates or points to the alphanumeric character or value "j", the $3^{rd}$ index location translates or points to the alphanumeric character or value "u", the $4^{th}$ index location translates or points to the alphanumeric character or value "<", the $5^{th}$ index location translates or points to the alphanumeric character or value "y", the $6^{th}$ index location translates or points to the alphanumeric character or value "g", the $7^{th}$ index location translates or points to the alphanumeric character or value "e", the $8^{th}$ index location translates or points to the alphanumeric character or value "k", the $9^{th}$ index location translates or points to the alphanumeric character or value "a".

The figure breaks off the sample of alphanumeric characters or values after the $9^{th}$ index point, and resumes at the $100^{th}$ index location. Where the values contained in the array have begun to include more than single alphanumeric characters, and the array contains strings of alphanumeric characters or values 3135. The $100^{th}$ index location translates or points to the alphanumeric character string or value "and", the $101^{st}$ index location translates or points to the alphanumeric character string or value "car", the $102^{nd}$ index location translates or points to the alphanumeric character string or value "computer" and so onward.

Again after more of the TRIPL strings or values the figure breaks off the sample strings or values; and resumes at the $200^{th}$ index location. Where the values contained in the array have begun to include more than one word strings of alphanumeric characters or values—and are comprised of longer strings of characters or values that represent multiple words, and or database records comprised of complex data that may even be comprised of data of disparate types 3140.

The $200^{th}$ index location translates or points to the alphanumeric character string or value "Initiate emergency procedure. Remove Hard Disc Drives and take them to dead drop Apache." The $201^{st}$ index location translates or points to the alphanumeric character string or value that comprises a link to another data object which is SATELLITE IMAGE FILES. This may be a composite data object that may include strings of descriptive alphanumeric text, hyperlinks and image data files, perhaps within a database record type of structure. The $202^{nd}$ index location translates or points to a composite literary work, or booklet, or database called "USMC/Army Field Manual for RPG". The $203^{rd}$ index location translates or points to an instruction to switch the case of an alphanumeric character "Switch case to capitals code 0110". The $2004^{th}$ index location translates or points to the alphanumeric character string or value "Rocket engine signature suspected ICBM. Emergency scramble intercept." and so the sample goes on, but further details are not shown in this illustrative sample.

FIG. 2C shows in detail like a sample of program or algorithm code, the defined process comprised of a run-time example of one possible TRIPL creation processes 3150. Which details the run-time decisions and actions of a pair of devices cooperating to create the TRIPL 3100 of FIG. 2A, and which may also be equivalent to or if implemented as an array of pointers for the TRIPLE application the same as 3120, or its value based variant 3120 of FIG. 2B, and the further data object examples shown 3135, and 3140 of the examples 3120. Please see the defined process 3150 for its specific run-time actions in detail, as these are very illustrative of the processes of FIGS. 1, 1A, 1, and 1C. It should be appreciated that there are many possible variants that may be used here that are intended to be within the scope of these subject technologies. Probably the most weird and difficult to understand are the ones that may be created by artificial intelligences operating these systems and methods. Some of which while within the Inventor's contemplation are impractical for use as illustrative tools. Not least because the inventor is not an artificial intelligence and because artificial intelligence may come up with surprising variants, without deviating from these subject technologies. The inclusion of which here would probably not aid this exposition of these subject technologies for a human reader.

The US Navy in particular uses some very long radio wavelengths to communicate with submarines. This is because longer wavelengths are better at penetrating into and through the sea. Unfortunately for the US Navy this bandwidth is limited; and these messages sent using it may be ultra-important and ultra-secret. They may for example one day include orders to find and sink adversary nuclear armed submarines, to save Americans from a nuclear strike.

Figure 3:
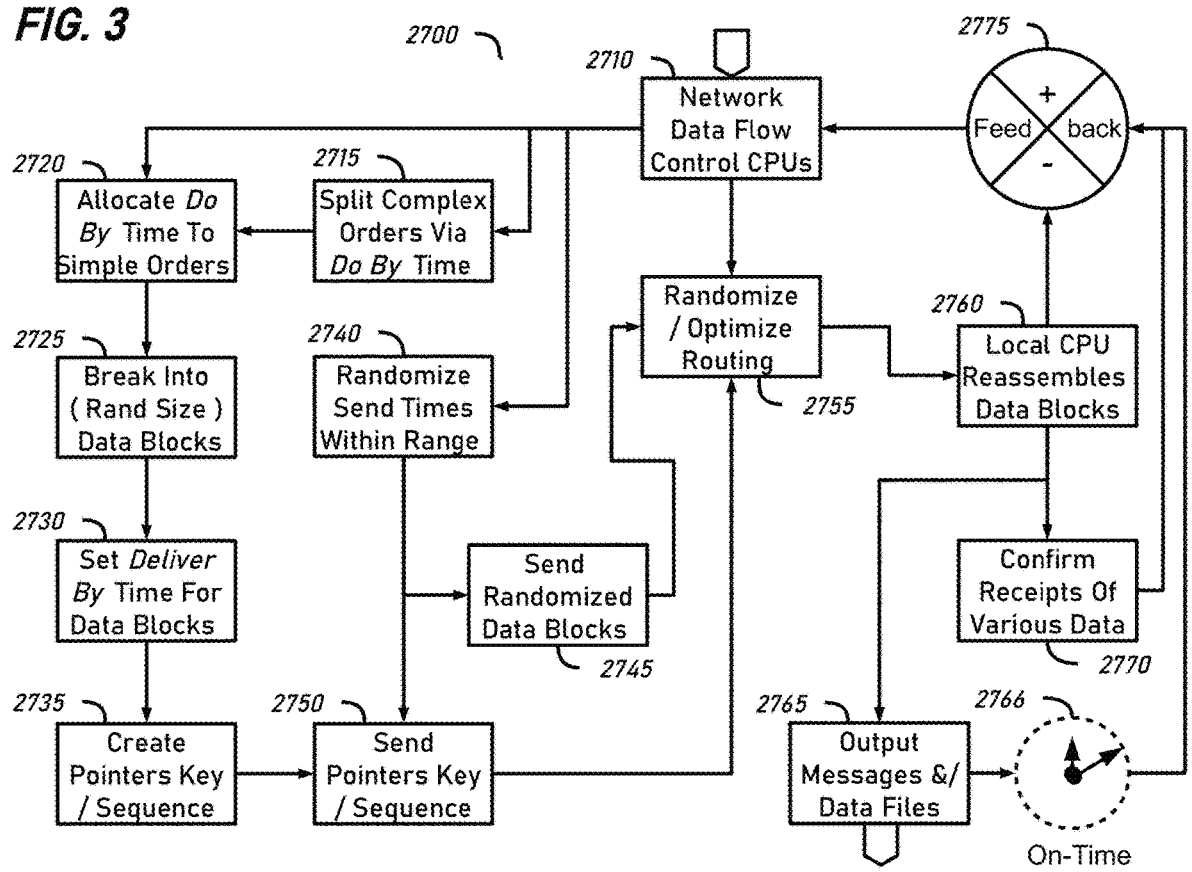
FIG. 3 is a block flow system diagram for wide area network data flow management system according to aspects of the subject technologies.

FIG. 3 shows a system 2700 capable to make inter alia US Navy communications more secure, by applying these subject technologies. Imagine in the present system one message is sent to the best located US Navy submarine: "Proceed to intercept hostile submarine, off southern coast of Taiwan. Precise co-ordinates of the hostile's location will be provided in real time. Proceed to within torpedo range and engage the hostile. Then liaise directly with Navy Seal dive team presently stationed at covert location "Z", in Taiwan to confirm result by recognizance."

This order goes out 36 hours before the US Navy submarine can get to the location. It gets intercepted and though the adversary state is not particularly quick at working through their signals intelligence, they manage to deduce that their submarine is in danger, which allows them time to try to hide, by heading away from the US Navy submarine. The chase drives the adversary submarine South, and another US Navy submarine is now closer. So, the first US Navy Submarine is ordered to break off the pursuit and return to its patrolling mission.

The second US Navy submarine being closer is able to close with the adversary submarine to engage and sink it. The adversaries' signals intelligence was trying to crack those communications but could not crack them quickly enough to save the adversary submarine. Unfortunately, the Navy Seal dive team was out of range to be able to conduct their intelligence gathering operation at the location where the hostile was sunk.

This scenario would have been much easier and required less than half the resources it took—if only Naval communications were more secure. It is often forgotten that signals intelligence can turn the tide of a major war. It was of massive benefit to the Allies in World War II. The corollary of which is that the security of our data and communications is equally important. Had these subject technologies been used, then the time at which each detail of the orders needed to be understood and carried out could have been used to break apart the orders, and to optimize and/or randomize the times, at which the various parts of the orders were sent.

The only thing the first US Navy submarine needs to know for the first 34 hours is the heading and speed they must travel on. This dull and short alternative message either does not get intercepted or does not alarm the adversary submarine's commanders. They do not know that the US Navy is even aware of their presence.

Only as the first US Navy submarine is nearing its torpedo range does the crew need to make ready for battle. Ergo, they don't need to know any more until two hours before they will fire their torpedoes at the adversary submarine. The orders to find and engage the adversary submarine, are sent just two hours out from the planned engagement. This preserves the valuable element of surprise, and the first strike catches the adversary submarine cold and is successful. The adversary submarine is sunk just south of Taiwan, and in the right waters in range of where the expert Navy Seal team of divers can reach the wreck more quickly than the adversary. The US Navy Seal Team divers who have been incognito off grid at base "Z" in Taiwan are able to rush to the location of the sunken adversary submarine. Where they succeed in retrieving some key circuits from the nuclear weapons stowed in the magazine of the hostile submarine. After which successful retrieval operation they cover their tracks with explosive detonations.

This simple issue of giving orders that are timely, and timed for maximum security, is a simple method for helping to protect the lives of US military and intelligence personnel. To increase chances of a clean successful mission. By doing something military strategists will recognize as a timeless classic, or gold standard tool to provide our war fighters with the benefit of "the element of surprise"! It's difficult to overstate how important this can be and has been throughput military history.

That very simple example is just to illustrate the principle, that timing matters and impacts the security potential of orders. Effective use of good timing is a very inexpensive but potentially invaluable piece of know-how, know-when, know-why only, but only at the right time. This method may be implemented on human and IT systems.

Figure 4:
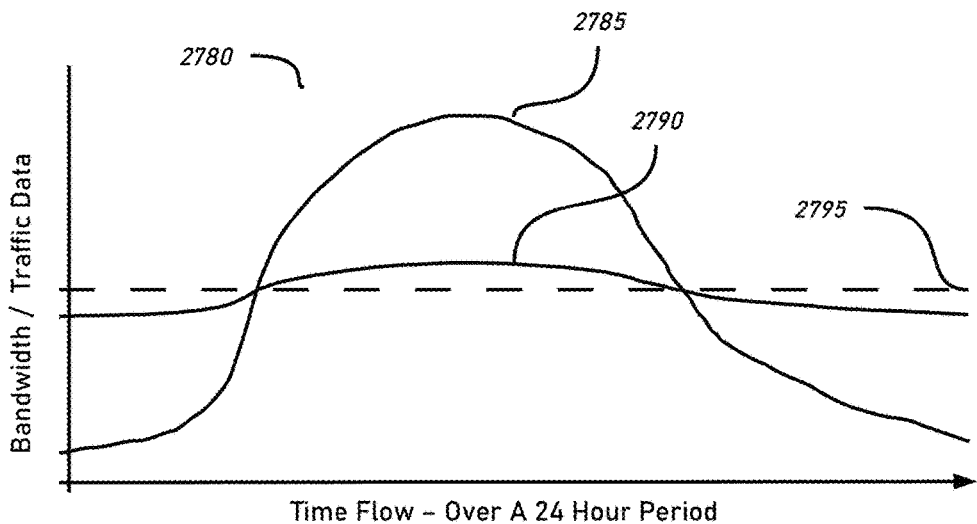
FIG. 4 is a graphical representation of the amount of data flowing over a wide area network plotted against time before and after the addition of aspects of the subject technologies.

The system 2700 has much more detail applicable to live military and intelligence information and communications systems. This is not the only benefit to be gained by adopting a system like 2700. FIG. 4 shows how the demand for bandwidth on US Navy systems 2785, may be smoothed out and flattened to the demand curve 2790, which is closer to the average demand for bandwidth 2795. So that not only can the system 2700 improve security, it can make the system more efficient and allow it to carry greater overall demand by spreading non-urgent or best-delayed data into the periods of lower demand. This also has the effect of mincing up and entangling the total of all messages with each other. Thus, placing a much bigger obstacle in the way of code breakers and eavesdropping adversaries.

For the sake of completeness, the detail of the system and methods 2700, of FIG. 3 are traversed as follows. This is a module within a bigger system as indicated by the off-page connections. The diagram uses a block and flow system nomenclature. Wherein, network data flow is controlled by CPUs 2710. (Note that users are required to enter "do by" times with each aspect of their orders through this system.) Process step 2720 is to allocate do by times to simple orders; and process step 2715 is to split complex orders via do by times, before passing these as simple form orders to process step 2720. Once all actionable orders have been split by their timing needs, then orders and data such as intelligence pertaining to them is broken into data blocks which may be of a randomized size.

The next process step 2730 is to set deliver by time for the data blocks, then create a pointers key or sequence 2135. Noting that process step 2740 allows the system to randomize send times within a range that is designed to ensure that all the necessary data blocks will arrive on time 2766. This temporal randomization minces and entangles them into the general communications chatter on the systems and for an eavesdropper makes them like needles in a haystack to find and correlate. This is the heart of the concept in this example for boosting the security of US Navy communications.

The next step is to send these randomized data blocks with random sizes, at random times, and process step 2755 adds the further security booster which is to randomize routing of data blocks over networks. Upon receipt of all the data blocks, and the pointers key, at just before the recipient needs to know their orders, and its associated data—the local CPU reassembles data blocks 2760; then confirms receipt 2770 by way of feedback to the sender system. To confirm that orders have been received on time 2766.

The messages containing orders and associated data files are then output locally 2765 on time 2766 to the affected personnel. A feedback signal confirming the delivery and/or timing 2775 is provided back through the network to the control CPU 2770.

Figure 5:
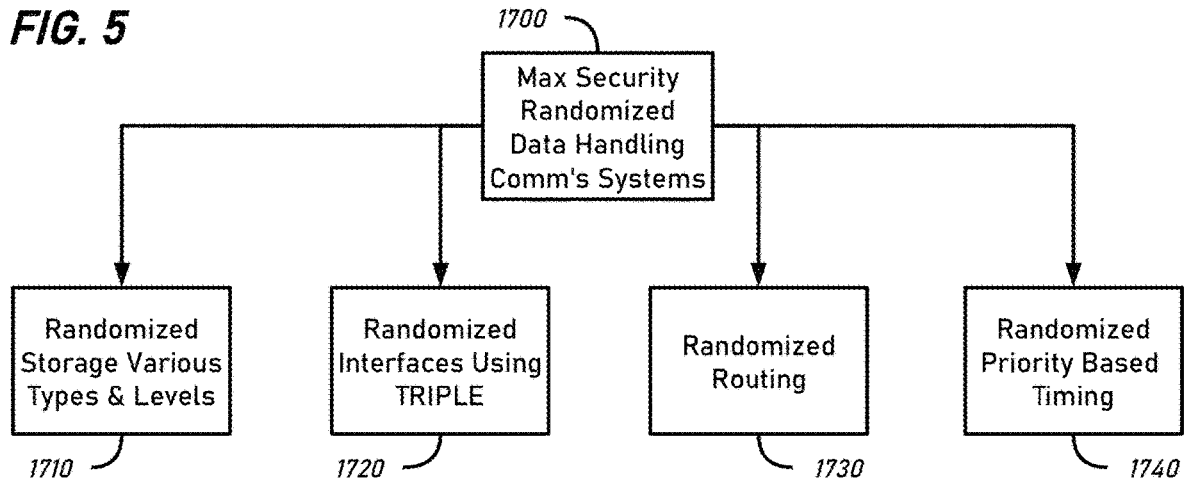
FIG. 5 is a hierarchical block diagram of aspects of the subject technologies.

FIG. 5 is a block diagram showing the main blocks that may form the core of a maximum-security randomized data handling communications system 1700. Utilizing randomized storage of various possible types and levels of storage 1710; randomized interfaces using TRIPLE; randomized routing 1730; and randomized priority-based timing 1740.

Figure 6:
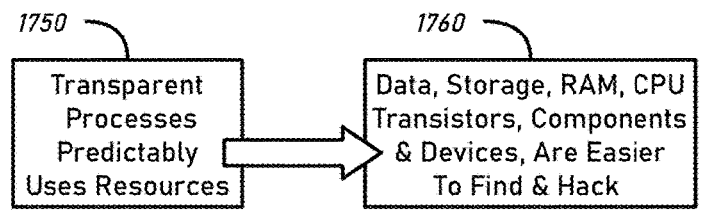
FIG. 6 is a block diagram relating to the prior art.

FIG. 6 is prior-art. Showing transparent processes predictably use resources 1750; and this is so, and less secure because data, storage, RAM, CPU, Transistors, Components and Devices; are easier or more predictable to find and therefore to easier to hack 1760. This may not be a great surprise to those skilled in the art, but it should concern us all due to the massive proliferation of networked smart devices joining the Internet of things. Where no doubt criminals and intelligence agencies worldwide will be looking to exploit new depths of data and surveillance opportunities for breaching the security of this rising population of Internet connected devices. The majority of which is likely to be operating somewhat autonomously for an increasing amount of the time. AI's will be taking decisions, that impact networks, and that travel over networks. So that the Internet of the future is going to need autonomous and increasingly smart security to defend all the bots, as well as the human users. The Internet is probably destined to become, and arguably already is an ecosystem in which artificial intelligence increasingly exists.

Virus makers will probably soon begin to create something akin to AI bacteria and Viruses. The former of which may be considered alive by some definitions. Smart hackers already can guess the configurations of hardware and predict the challenges they face when hacking known systems. As their tools get smarter this problem may get worse. Which is why there is a need to increase the difficulty levels of predicting the challenges hackers face. Rather like the concept of stealthy aircraft, being impossible to target. So too stealthy data, even stealthy big data may be made into a much harder target to find and/or to attack.

Figure 7:
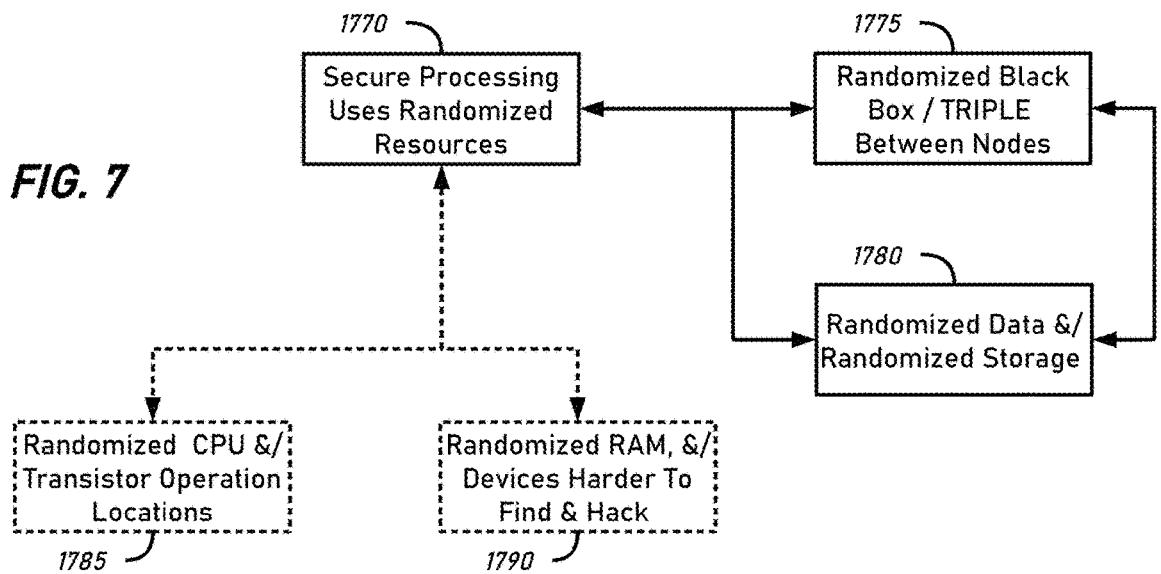
FIG. 7 is block flow system diagram of aspects of the subject technologies.

FIG. 7 is a block diagram showing aspects of secure processing using randomized resources 1770. Where data may be passed around using a black box such as TRIPLE between nodes 1775 in a system. So that intruders in the systems either side cannot see into or past the TRIPLE interface, even though they might send commands through it to systems on the other side. Plus, the increased security for the data passing through via TRIPLE.

Furthermore, the use of randomized data, and/or randomized storage of data 1780 can add further security. Optionally, where signals intelligence and high end data is being protected, even use of RAM and devices can make them harder to find and hack or spy on 1790; optionally this can be taken further with multi-core processors. Then it can be taken down to one of the smallest processing units available, and randomly run within the transistors of a larger CPU, or across multiple CPU, or group processor units (GPU), and/or co-processors.

Signals Intelligence eavesdropping technologies and methods can be used to capture data leakage from electronically noisy systems. This noise has been studied and a whole signals-intelligence analytics technology has been created to enable it to be reverse engineered back to the data that created it. Thereby allowing sophisticated signals-intelligence (Sig-Int) eavesdroppers to duplicate the data being processed by an IT system such as a printer or computer, or network adapter card. Signals Intelligence, is also a problem for US defense and intelligence agencies.

Even with this Signals Intelligence and analytical spy tech including TEMPEST it may now be possible using these subject technologies to create computers that are capable to be operated and to use resources sufficiently randomly that they cannot easily be spied upon using signals intelligence and data leakage analytics.

Randomized processing, and randomized data handling when combined, may be used to provide more secure processing, and communications capabilities in the modern battle-space. This includes for example the randomization of processing and memory use, and of data flows within defense systems such as missiles, and missile defense systems, aircraft, tanks, spacecraft, ships and submarines etc.

These same randomized IT systems and network capabilities might also be useful for high value knowledge driven businesses. Such as research and development-based operations, and within data networks and storage for organizations such as defense contractors; and for high value targets like stock markets, banking and financial sectors. To help mitigate the many risks posed by nation state on state espionage, and industrial as well as non-state industrial espionage.

Figure 8:
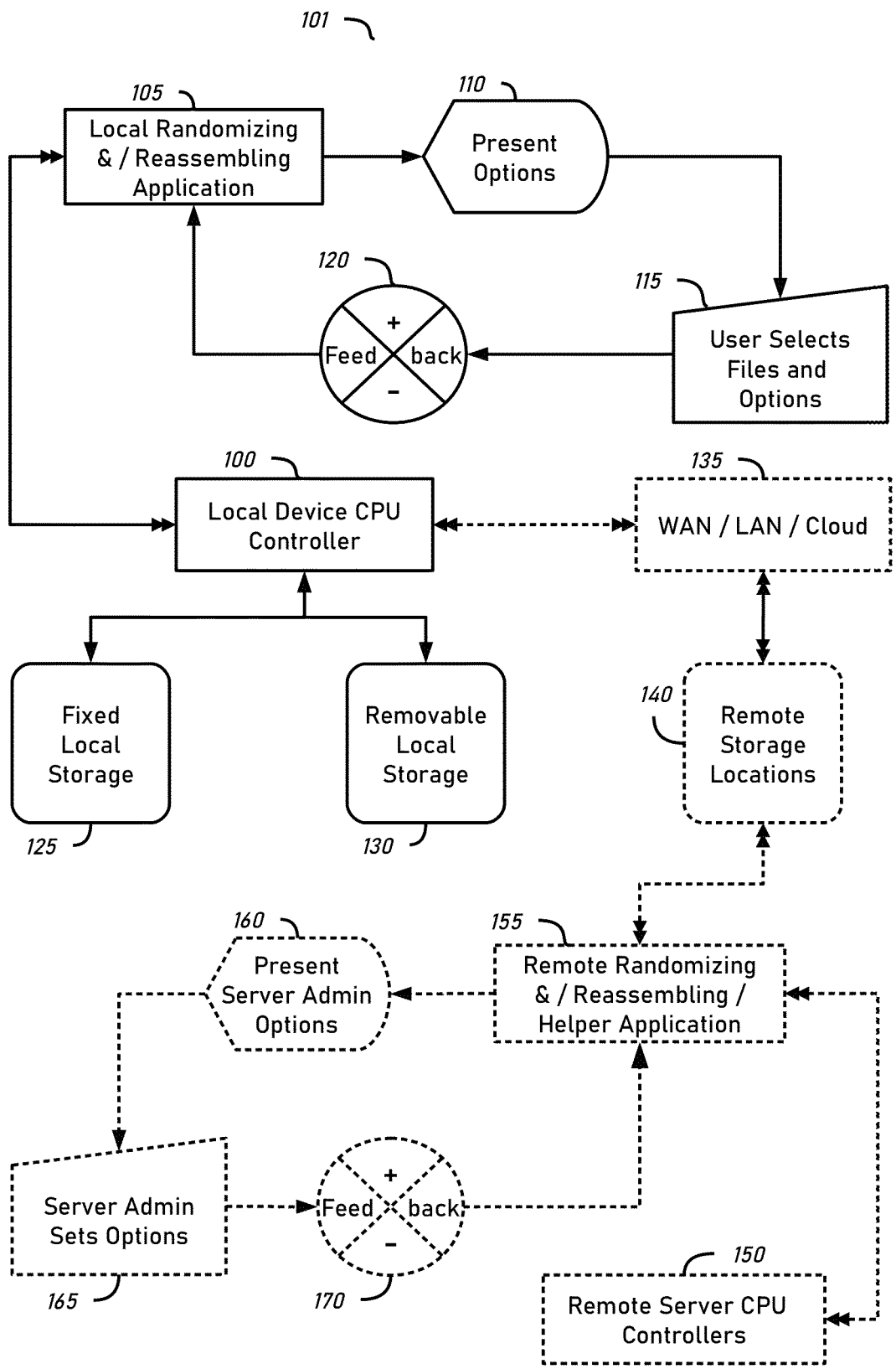
FIG. 8 is high level systems, options and process flow diagram expressed in block and flow format of randomization-based data security systems according to the subject technologies.

FIG. 8 shows that the system 101 though primarily comprised of local resources, may also include further resources and systems by operating with co-operating and enabling system resources over local area networks, wide area networks and/or the Cloud. So those parts of system 1 may be virtual. This reflects the options for the various ways the subject technologies can be used depending on the resources available. This is further explained in FIG. 9, that goes into more detail on the relative security of the various possibilities.

FIG. 8 has a local device central processor unit or controller 100; this runs the local randomizing and/or reassembling application (program) 105. This presents options 110, and the user selects files and options 115. These selections are fed back 120 to the local randomizing and/or reassembling application. So that the application can act upon selected files 115 in the alternate locations of fixed local storage 125; removable local storage 130.

The local device central processor unit controller 100, also may have the option to operate across a local area network (LAN), wide area network (WAN) or Cloud 135. So that it may also act upon selected files 115, in further alternative remote storage locations 140.

The remote storage locations 140, being under the management of a remote randomizing and/or reassembling helper application 155, running on remote server central processor unit controller(s) 150. In relation to which these operations are subject to the presentation of options to the server administrator 160. Noting that the server administrator 165 may be human or an artificial intelligence. The server administrator thus provides feedback to the remote randomizing and/or reassembling or helper application. This interacts with the remote storage locations to serve the needs of the local system—which communicates back and forth to support the local operations being performed on the files. So that a local user with good connectivity should have a seamless experience that varies very little as between the storage locations used.

This model of operation spans simple local hard drive operations all the way up to running multiple threads to multiple remote storage locations all of which possibilities are covered within this one flexible system. The system is capable to be so flexible due to the growing levels of inter-connectivity and compatibility that is increasingly becoming ever more available to users across devices and networks.

Looking to the future, it is envisaged that this system may also run on Internet of Things (IoT) devices, under the control of conventional algorithms and/or Artificial Intelligence (AI) and/or Machine Learning (ML) systems. Consequently, in later figures and in this descriptive section both Artificial Intelligence systems, including the Inventor's own subject technology Polymorphic Artificial Intelligence as well as Quantum computing architectures are also advanced over the prior art within these subject technologies. The main subject technology is furthermore intended to be capable of implementation in these evolving technologies as well as on machines conforming to the current state of the art.

This is further illustrated by the concept also described below for a data processing architecture that is based on eleven parallel dimensions; that could be used in computing systems based on String Theory. It is envisaged that considering the Inventor's contribution to the art, that there may arise systems and architectures within them that are customized to resemble the physical universe and help leverage increased computing power by so doing.

Figure 9:
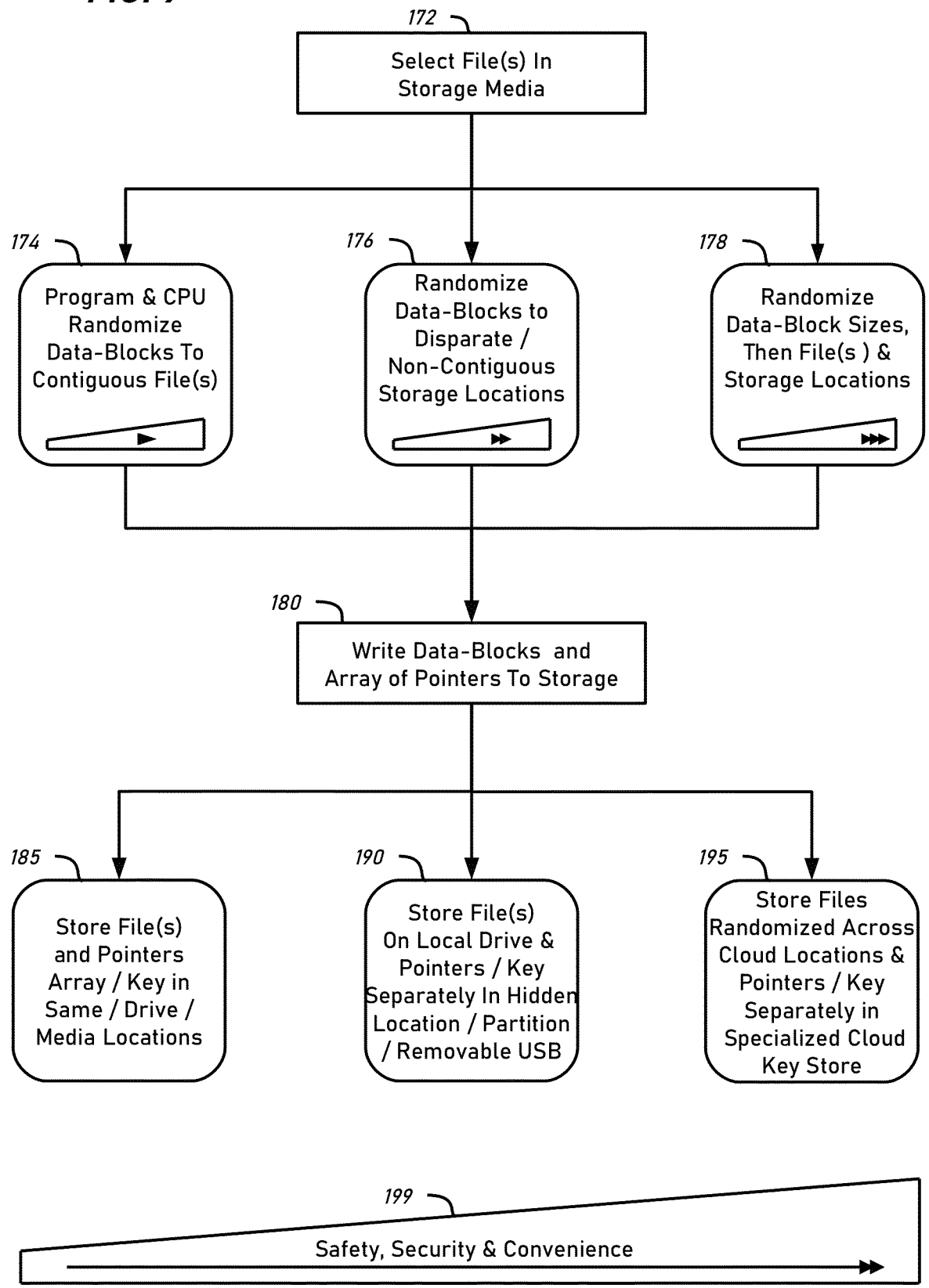
FIG. 9 is a cooperating local and remote systems diagram in block and flow format detailing randomization-based data security systems according to the subject technologies.

FIG. 9 goes into more detail than FIG. 8. The two figures are intended to be fully compatible with each other. FIG. 8 being a system block and flow diagram, and FIG. 9 is zoomed-in on the detail of possible implementations of the subject technologies; and their relative merits in securing data. The main alternative systems options, and implementation options are shown in a visual comparative format. The options to the left being relatively less secure than the options to the right of the figure, as indicated by the left to right security level slider gradient 199.

First the files for the program and CPU to operate on are selected 172, then either the alternate process to randomize data blocks to storage as contiguous files 174, or randomize data blocks to disparate non-contiguous storage locations 176, or randomize data block sizes, then randomize files, and storage locations 178.

Whichever alternate randomization options are chosen, the next operation the system performs is to write data blocks and an array of pointers to their locations in storage 180 is executed. This can be according to the alternatives to store both files and pointers array or key in the same drive or media location 185. This is the least secure option due to the risk of hackers being able to access both the key and its associated data. Then use the former to reconstruct the latter just by hacking the local drive or storage media.

A more secure alternative is to store only the file(s) on a local drive and store the pointers key separately either in a hidden location, which can be a hidden partition, or even a removable storage device such as USB or DVD etc. 190. Probably the most secure, and convenient alternative is to store files randomized across multiple cloud locations and store the pointers key separately into specialized cloud key store 195. This may be differently and independently operated than the cloud storage. For example, with the cloud storage provided by AWS and the key storage provided by Verisign or Microsoft. This can be both secure and seamless because multiple data threads can be run over modern networks without any perceptible loss in performance from the user perspective.

Looking at this diagram from left to right, the further to the right of the figure the more safe, secure and seamless and convenient the user experience may be 199. The options are also compatible with streaming data for communications and media. These aspects of the subject technologies are dealt with in more detail below.

Figure 10:
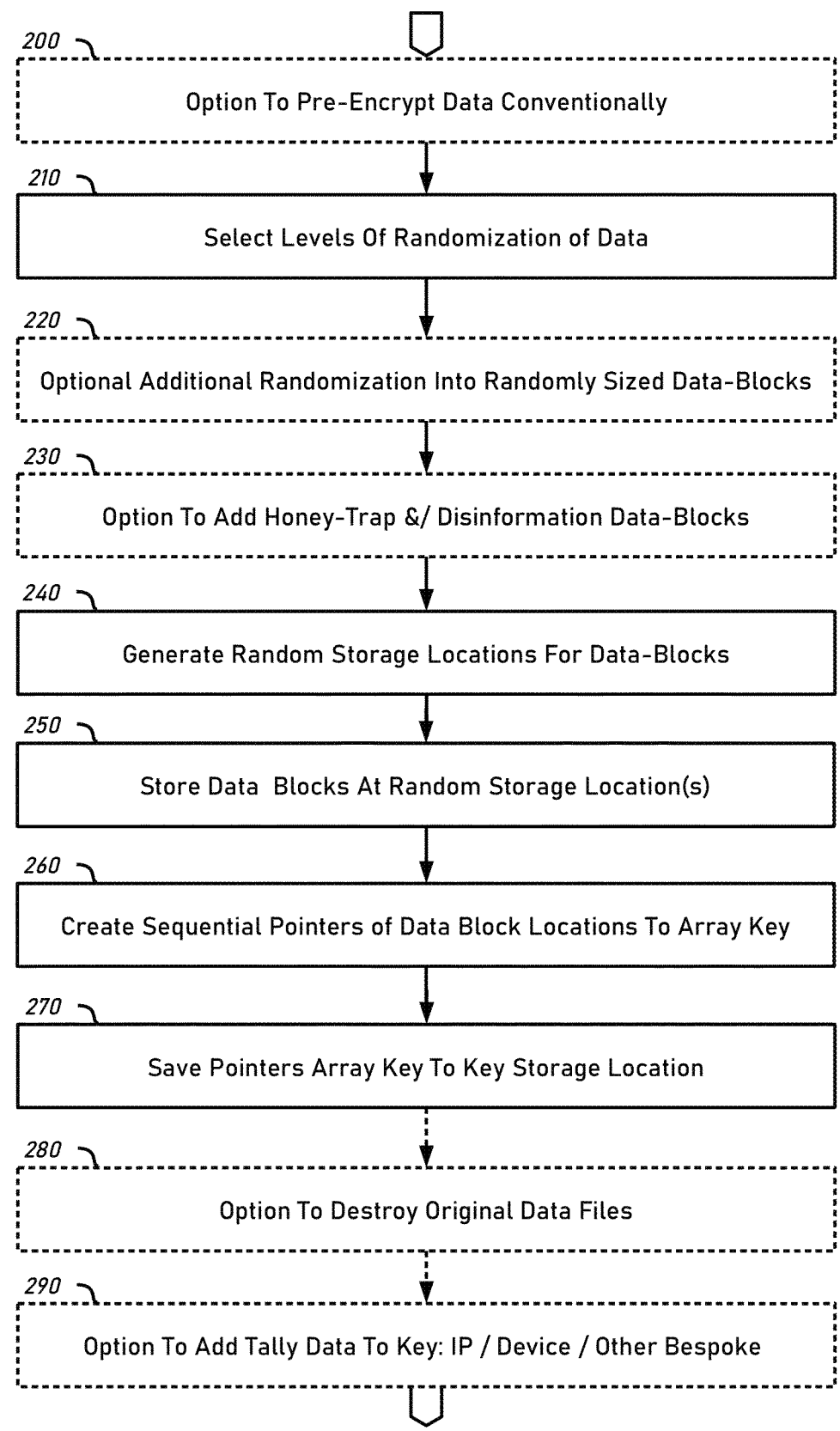
FIG. 10 is a block system flow diagram of aspects of the subject technology for the secure randomization and storage of data with optional elements shown in dashed line.

FIG. 10 shows in more detail the options to be offered by a system running a program according to the subject technologies on its central processor units and/or as may be preset, and the operations the system performs on the data. The first of which is the option to pre-encrypt data conventionally 200. Before applying the randomization. After which the levels of randomization of data are selected 210; and the option to increase randomness via the additional randomization into randomly sized data blocks 220.

Honey trap and/or disinformation data blocks can optionally be added 230. Then the system may generate random storage locations for the data blocks 240; and proceed to store the data at random storage locations 250; while creating the sequential pointers recording data block location to an array to provide a reassembly key 260. Then save the pointers array key to a key storage location. Once this is done then the option to destroy the original data files 280 arises. It makes sense to do this, and in some implementations this option might be a preset operation. So that users can't injure their own security by leaving an unprotected copy on the host machine.

The final option can be performed at other places in the processing and need not necessarily be last. But there may be reasons to do this last as it does not necessarily need to be randomized or encrypted. This is the option to add "Tally" data 290 or other bespoke data to the key. Tally data can include things such as the IP address of a device, or transaction data and details of previous logins etc. Tally data may be comprised of the relatively randomly occurring events in user transaction histories. They occur due to the inherent randomness in the minutia of our relatively chaotic lives, within the order we try to impose. These details of minutia events occur in a specific and unique order. But once logged these historic events can be as unique as fingerprints, and the details of which some users may be able to recall to varying degrees. As will be shown later, an example is provided where Tally data is added to a bank card. Furthermore, it should be noted that Tally data from a mobile phone when used as a payment enabling device is also envisaged.

A lot of the details of hardware that follow are capable of inclusion within a wide and growing variety of devices. Mostly the type of device is not included, because the subject technologies are not tied to any particular hardware configuration per se.

Figure 11:
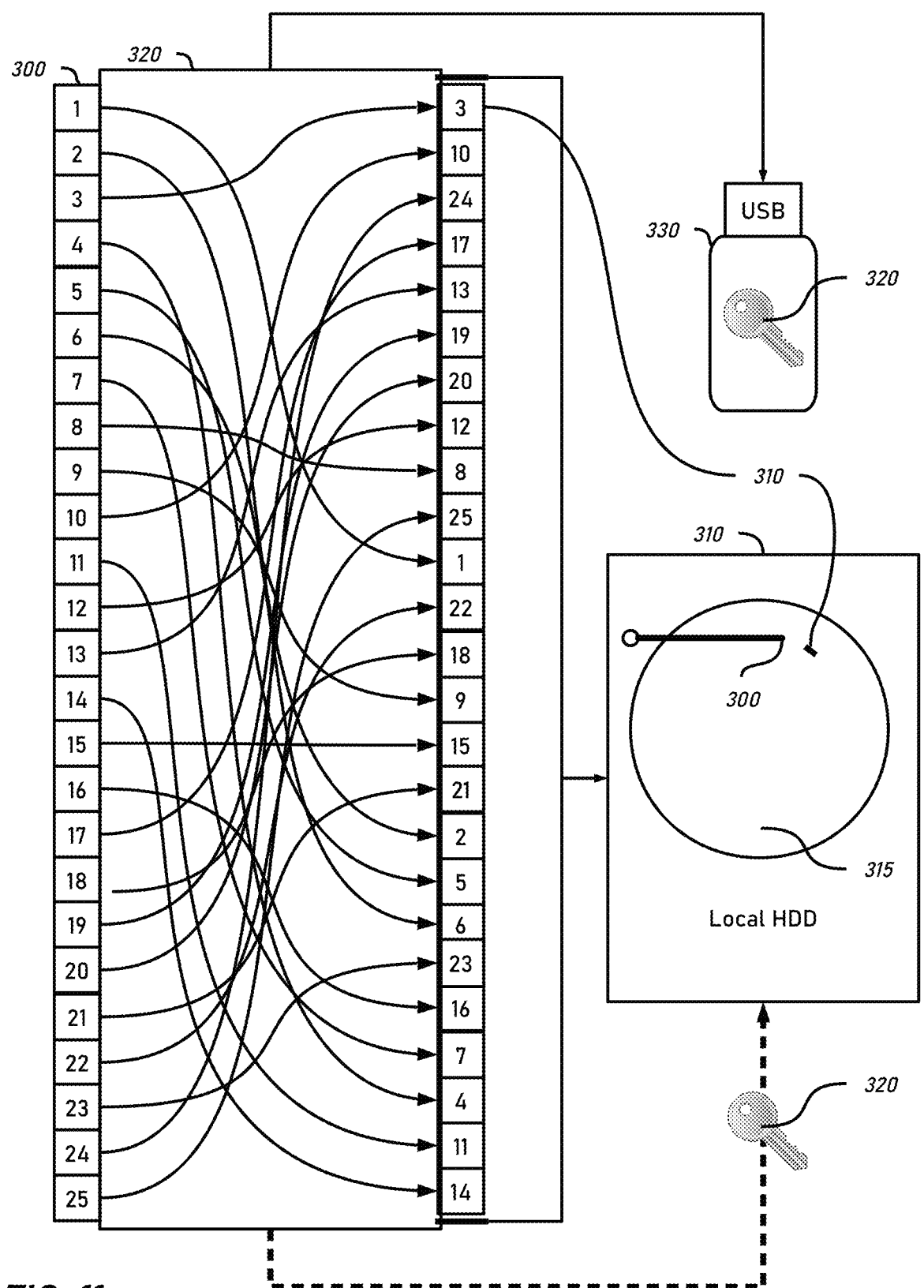
FIG. 11 is a schematic drawing of a file (left) being randomized according to an aspect of the subject technologies.

FIG. 11 shows a file 300 comprised of data blocks 1 through 25 which has been stored according to the pointers key 320 into a randomized form 310 that has been written by the read/write head 300 to a local hard disc drive 315. But where, although there is an available option to also write the pointers array key 320 also to the local hard disc shown in dashed line.

On this occasion the user has elected instead to store the pointers key to a removable USB drive 330. This is more secure because the USB drive can be removed from the system and used like a dongle. So that the computer can go online and even if hacked its data will be incapable of recovery so long as the USB key is not connected to the system. This makes the security of large amounts of data on a machine lockable and in a physical way that is very easy for users to see and to check and apply.

Furthermore, duplicate USB keys can be kept as a precaution in case of media failure or corruption. This is a very good, very secure and relatively basic implementation of a simple form of this aspect of these subject technologies.

As will be seen in subsequent figures much more complex and diverse implementations are possible. A valuable point to note about the pointers depicted as arrows. These are like wormholes from any one part of an information technology based system to another part of that system. They are a system of pointing to an addressable location within an information technology system. In these subject technologies they can point to physical locations or addresses, like a postal address and they can be used to point to virtualized locations, and/or relative locations or to mask locations rather like using a Post Office Box to provide an anonymous "black-box" addressing system.

These subject technologies use this simple systems architecture to achieve many things that the prior art is struggling to achieve, perhaps because humans like to see ordered systems. They have tried to order computer data processing architecture according to human sensibilities. Whereas, in these subject technologies' computers can work in ways that look messy to human eyes as does the tangle of pointers. But to the computer this is not the same, they have no concept of tidiness. These subject technologies ignore some human sensibilities and let computers work differently than humans may prefer. This makes them also likely to be highly compatible with Artificial Intelligence and Quantum computing.

Towards the end of this specification new architectures, and new ways of creating them for Artificial Intelligence, Quantum Bits or "Qbits", Quantum Computing and parallel dimensional computing are provided. One example architecture is shown implemented in eleven dimensions to leverage and/or support string theory based computations. These examples are all explained and form part of these wider subject technologies.

The Inventor believes some of these forms of these subject technologies should be much more economic to produce than the type of Qbits that organizations including Google are currently experimenting with in the prior-art. Hopefully, the vast applicability of these subject technologies explained in this specification will be readily understood by persons skilled in the art.

Figure 12:
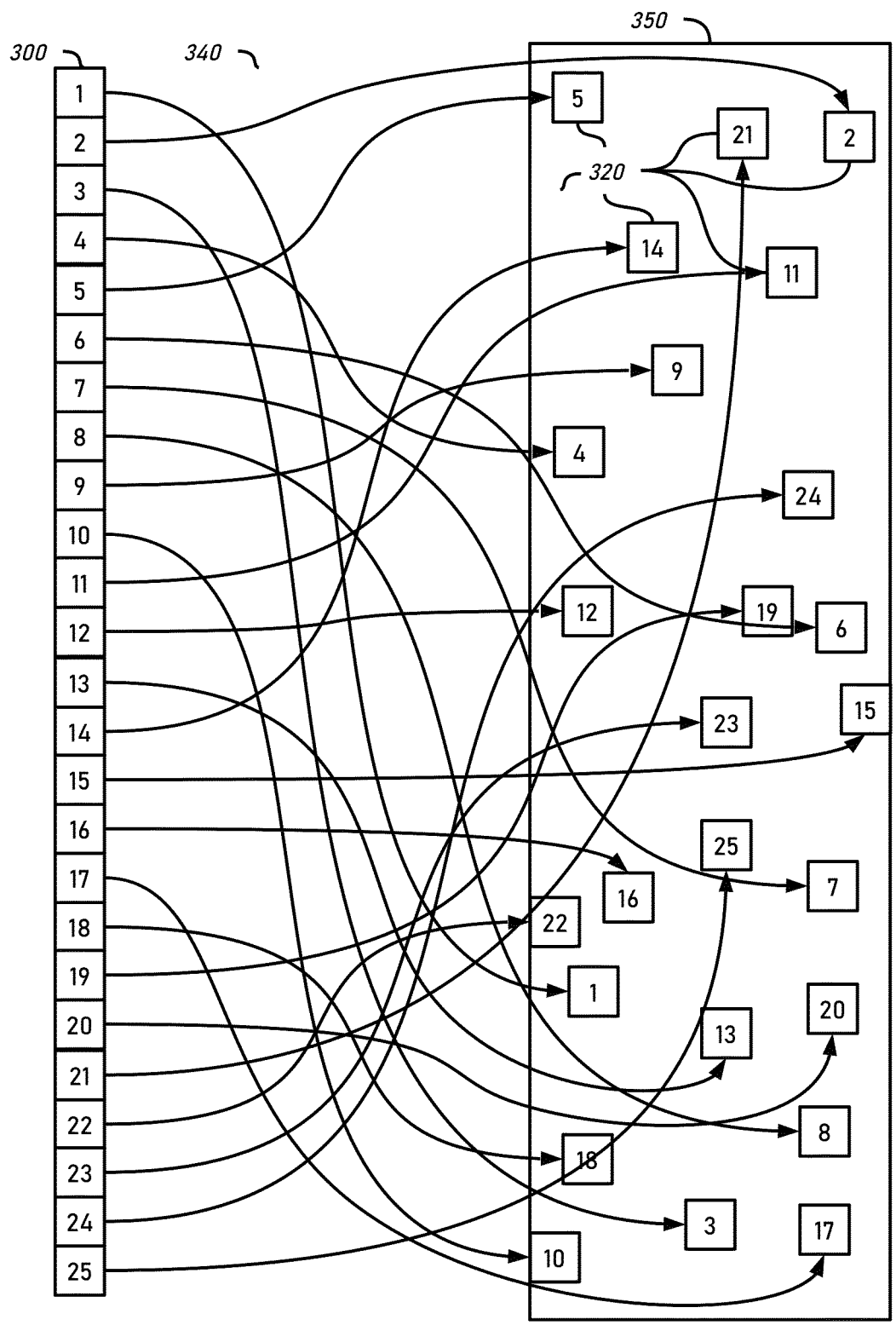
FIG. 12 is a schematic drawing of a file separated into data blocks being randomly stored according to an aspect of the subject technologies.

FIG. 12 shows a file 300 comprised of data blocks 1 through 25 which has been stored according to the pointers key 340, to randomized locations 312 within the available space in a storage device or drive 350. This could be on hardware configured as in the previous figure, or it could be different. That detail is not shown, because the main purpose of this figure is to show that using the pointers key, the same or similar file can be randomly dispersed to any available space. This differs from the previous figure also because in the previous figure the data blocks were randomly shuffled but still written as a contiguous file. Whereas in this example the storage locations are randomized into locations that can have spaces in between them. This is not inherently more secure, when only one file is randomized into available space. But where multiple files are randomized into the same overall available space, then they each make the other more secure because there is no way to identify any data block as belonging to any file.

So that the randomization into a common storage space can be used to provide more security for all the files randomly stored on a storage device such as a hard disk drive partition, or USB drive, or even a cloud storage location. So, the gaps between when filled with other randomized files increases the security of all the files, the more files stored this way in a partition or drive the more secure they all are. It conforms to the old axiom that "there is strength in numbers" which really works and is true in these subject technologies. The more files and data that are randomized into a given storage space, the safer they all become.

Nevertheless, the pointers array key is no less efficient at retrieving files that are co-mingled randomly into a storage space such as a hard disc partition or USB. So that there is no fall in performance of data read access speeds even as the drive approaches being filled to capacity. Data write speeds may suffer modestly increased overheads when seeking an available random location. Especially, as the storage approaches being full to capacity. When data blocks may be allowed to overflow from one random location to another location to accommodate a data-block that is too large to fit into it's randomly allocated space. The heuristics of a random data block write and overflow algorithm capable to fill a drive to capacity are explained further below in relation to FIG. 15 and FIG. 16.

Figure 13:
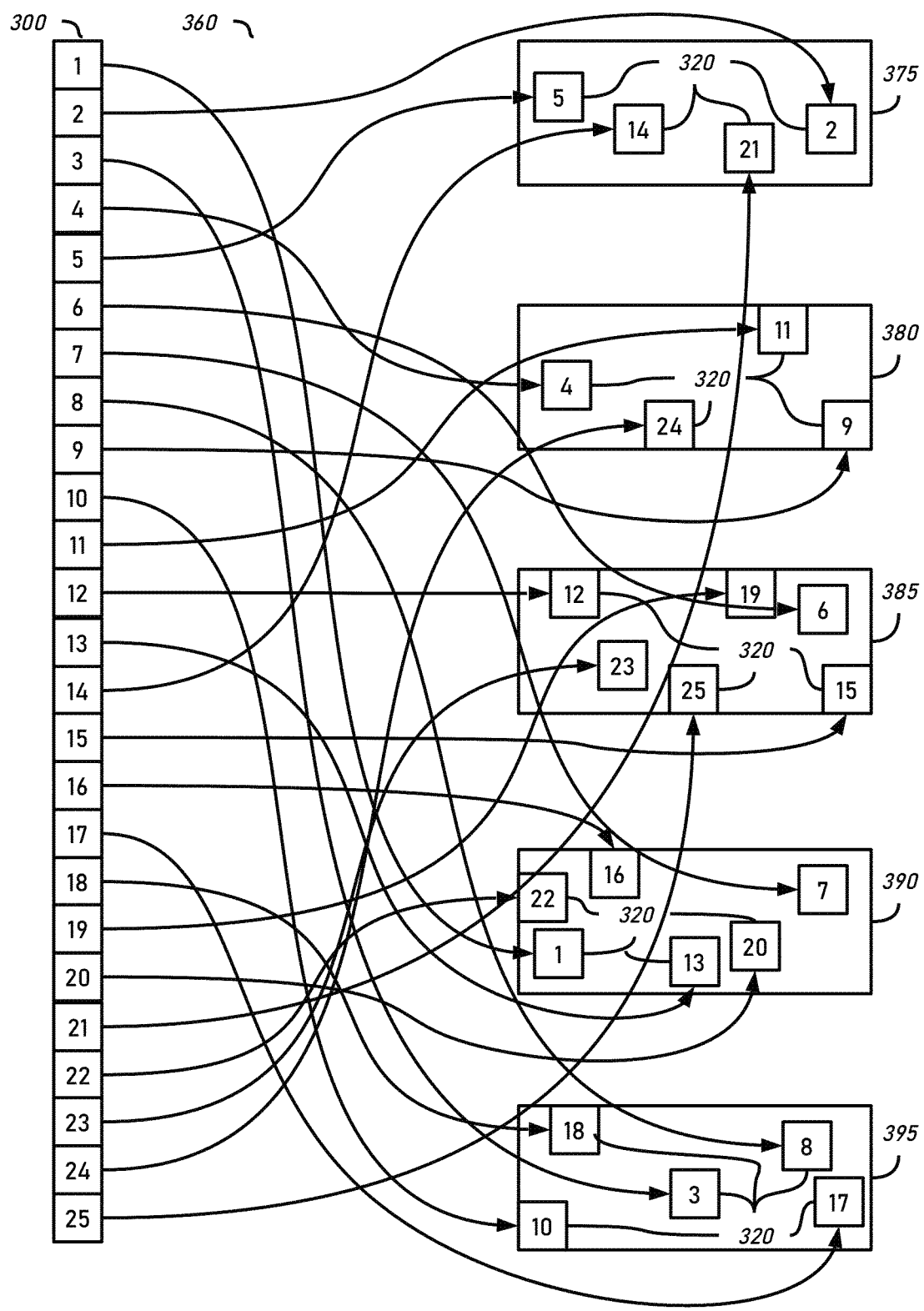
FIG. 13 is a schematic drawing of a file separated into data blocks and stored randomly to multiple parallel storage locations, according to an aspect of the subject technologies.

FIG. 13 shows an even more secure configuration for data storage. In this case the file data blocks 300 numbered 1 through 25, is randomly stored according to the pointers 350 into random locations 314 within five parallel storage locations 375, 380, 385, 390, and 395. These five parallel storage locations may be five partitions or devices attached to one system, or they could be the hard drives of five servers within a cloud data center, or they could be randomly located within five hard drives, of five servers, at five different geographic locations from within thousands of data centers spread randomly around the USA or spread randomly around the world. Yet still the pointers keys have no calculation overheads and the ability to retrieve and reassemble the data blocks depends mainly on network access speeds and the speeds of data access at the data centers rather than computing power. This is the most secure example of randomized storage of the file so far illustrated.

The pointers key can also be kept at a specialist key holder organization to ensure that even the physical data holder cannot reconstruct the data held in his/her storage facilities into the file. At this level when deployed in the cloud probably DARPA, the Department of Defense and NSA (including the US Navy, USAF, USMC, US Army and US Space Force) as well as the CIA and FBI's experts will all be able to see that this may be the most secure data protection system ever envisaged; and that if correctly implemented it could be impervious to attempts to steal and reconstruct files. Beyond any previously known system of encryption. But that's still not as secure as the system overall can be made, as will be further illustrated in subsequent figures and descriptions.

Figure 14:
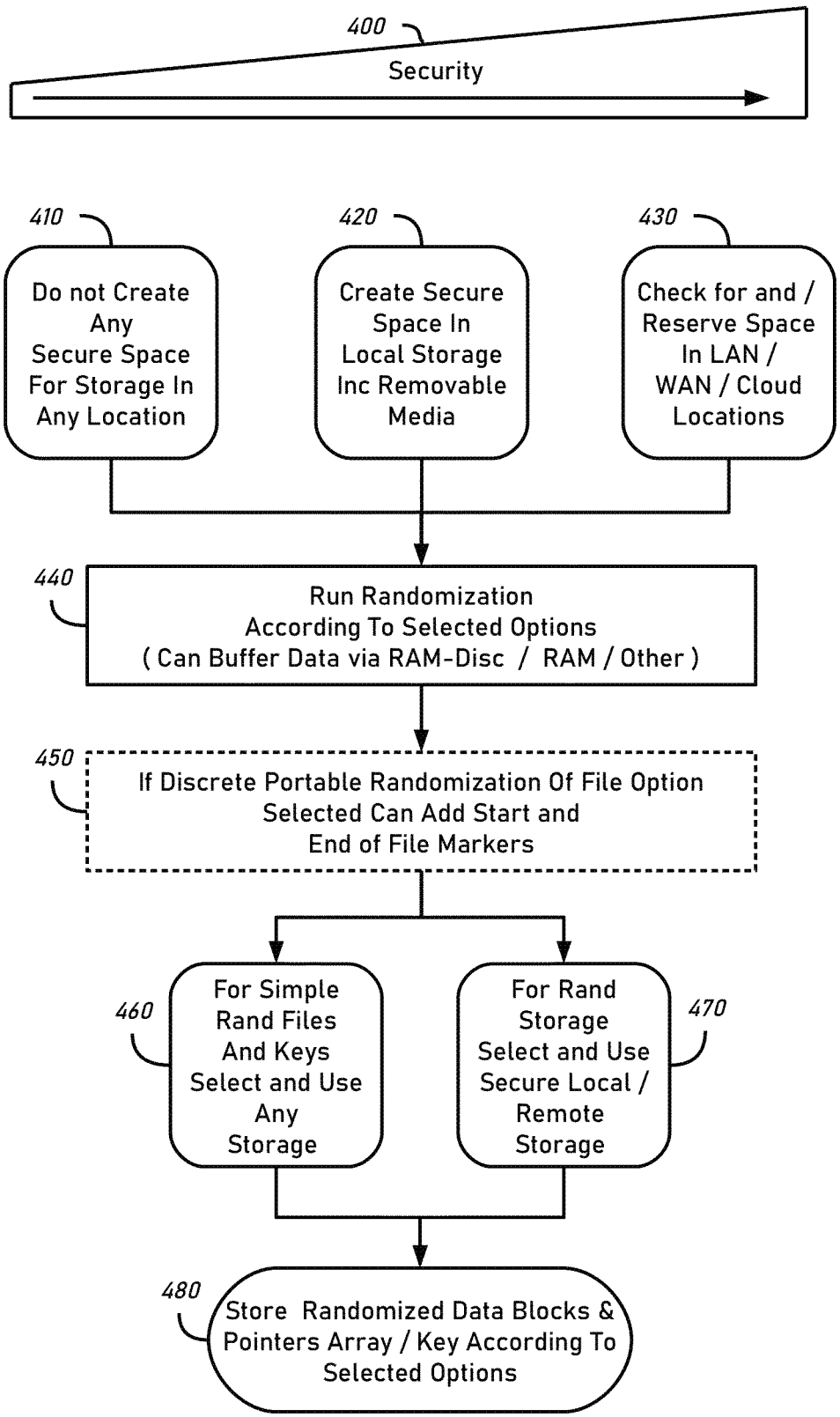
FIG. 14 is block and flow diagram of choices and alternative implementations or run mode operations for a data randomization-based data security system according to the subject technologies.

FIG. 14 deals with a situation where there may be compatibility issues between an implementation of the subject technologies and the operating system, and or the disk management system. Say for example it is perfectly possible to randomize a file into the available space on a hard drive of a computer that already has files stored on it according to the rules of its operating system. There is not going to be any problem writing a contiguous randomized file and reading it from such a system in any event. But issues could arise where for example the data-blocks from a file are randomized in and among the preexisting data. Again, there is no problem if each data block is capable of being moved around by the disk management system so long as the pointers key is updated accordingly.

However, there is a risk of data loss if a disk management system were to move data blocks without updating the pointers key. There are some fixes that can be applied, for example such disc optimization functions could be disabled. Another is to add a terminate and stay resident program capable to stay running in the background, and to update the pointers keys to include any movement of affected data when using a local drive, or to create an updated pointers key. So that previous data-block locations can be updated to point to the new locations at the next opportunity. The pointers key may be updated in real time or in two stages. This doesn't matter per se as long as no attempt to use the affected data-blocks is made until this has been done. Another simpler solution is the scenario to which FIG. 7 relates. Where a secure space, partition or separate drive is reserved for randomized storage.

FIG. 14 looks at a less optimal commercial outcome, or a time between this application and full market penetration of the subject technologies; and explains how a version of the subject technologies may be safely used with an otherwise incompatible disc management system. Because it is the case that the subject technologies are capable to be implemented without such cooperation and standardization.

Furthermore, it may well be the case that organizations such as the US military may not be willing to wait for Microsoft and Linux developers and data center operators to catch-up. Defense systems that handle sensitive data don't have to wait for the bigger players in the tech sector to begin to benefit from these subject technologies. If they use their own bespoke operating systems for data handling and addressing; then they will probably be able to apply the subject technologies as suits them best. If they need a short-term fix the details of FIG. 14 may help such potential early adopters to get these technologies into service sooner. On the systems they have, as they are now.

The alternatives are arranged from left to right with the most secure options being the ones on the right and the slider 400 visually signals this fact. Alternative process 410 is to not create any secure space or reserved space for randomized data suitable for storage in any locations at all. This can work but with caveats. Firstly, a randomized file can be written contiguously and be dealt with just like a conventional file. No problem. Secondly, data blocks can be created and randomly stored to regular disc space locations. The only issue being the need to update the pointers key if the disc management systems move any data blocks or files. The randomization software can stay running and watching in the background to create a pointer update file capable to update the pointers key at the next available opportunity. This is also no problem.

Alternative process 420 is to create a bespoke secure space on local storage, this may typically be an HDD or SSD, but which may also be a removable media such as a USB connected flash drive, or SSD, or even HDD. The good things about this is that partitions and drives can be hidden, and they can be hidden or access to them prevented unless it is by compatible software. The downside of using a bespoke secure space within any storage is that it may provide an identifiable location in which a hacker may know or be able to infer that there is likely to be sensitive information. Security may be improved by keeping the pointers-key on a separate media which could be a USB stick or a blue tooth accessible device local area network or wide area network. A USB stick, or mobile phone with a Blue Tooth link can be used like a data access dongle in such configurations. These possibilities are set to continue to increase.

Alternative process 430 checks for and/or reserves then uses compatible storage space on local area networks, and/or wide area networks, and/or the Cloud in cooperation with a compatible version of the subject technologies and/or a compatible helper application. This may be the way that the technology is able to grow into the available space in the Cloud from where it may be able to displace other storage paradigms, as there is likely to be little or no extra cost, for this improved security.

Process step 440 is that whichever higher-level option was selected to run the randomization application, according to selected options. Noting that the system can buffer data via a random-access memory disc, or via random access memory or other short-term transitory solutions. Furthermore, there is for discrete portable randomized files an option that may be selected to add start, and end of file markers 450. So that the first alternative is for simple randomized files and key to select and use any storage 460; or the second alternative for randomized storage to select and use secure local and/or remote storage 470. With the process terminating in the storage of data and keys according to selected options 480.

FIG. 15 is an algorithm module for use within the storage allocation and data writing operations; the logic is expressed in the form of a block and flow systems diagram. The diagram and its decision-making algorithm, with read and write functions that are capable of implementation may be coded in a desired programming language.

FIG. 16 is similar. Together these two modules provide the capability for the identification of random storage as being available, and for writing into it the randomly allocated data-blocks. FIG. 15 addresses the situation thus: to check if a random storage location is available 500; then if available write the data-block to that storage location 530; or if it is not available or less than the minimum usable size, then generate another random storage location 510 and then loop the process back up to step 500 to check if the random storage location is available, and so on. Noting that a feedback loop to the process can provide information as to which locations are used and which are rejected, and store used locations in pointers 520. This looping data write process runs on to process the next data block into randomized storage 540 as many times as is needed, until all the file's data blocks have been randomized into new random storage locations, creating the pointers key by feedback 520 to the main application 590 according to the subject technologies.

FIG. 16 is similar to the previous figure, but it also has greater ability to cope with data blocks that have sizes that are randomized between minima and maxima; as well as being randomized to disparate random storage locations; and it can also be used in a situation where a drive is getting quite full. Where the spaces available are smaller than the data block for example. This is achieved by allowing the data blocks to overflow from one location to another available location. To achieve this a continuation pointer 565 may be placed at the end of the first fraction of the data block and which points to the start location of the next available overflow location 569.

An alternative approach is to truncate the data block; and write the remainder to a space with its own pointer key, in the main pointer key. The choice as between the two approaches may depend on whether the pointers key is allowed to grow, or the data blocks are allowed to grow in size to accommodate the additional pointers.

Having explained the process alternatives in the abstract, the structure of the exemplary features of FIG. 16 are firstly that it is running as a processing module under the main application 590. The first process step for this module is to check to see if the random storage location is large enough for the next data block 550. Then decide if the data needs less than, or an equivalent amount of storage to the available contiguous storage, then write the data 555. But if the data block needs more than the available contiguous storage, then write data to the available space, and allow overflow 560 to a secondary location. By adding a continuation pointer 565 at the end of the primary location that points to the start of the next available location 569; or alternatively add an equivalent pointer into the pointers key that points to the start of the secondary location 569. Then write the remaining data to complete the data block 570. With the pointers key to the location(s) used being fed back to the main application 575. Thereby enabling data to be randomized into all available space in a storage location, drive or partition.

This overflow aspect of this algorithm may also be usefully adapted, to compress files to remove, or fill-up slack spaces. This may also be used to ameliorate drive fragmentation, without reducing the randomness of the storage allocations. Indeed it may improve the randomness within continuously used storage, and allow it to be filled to capacity. This may be helpful because the more randomized data there is stored in a given space, the more it can help to protect each other. There being strength in numbers (of files) as previously explained in this context.

Having described and explained the reduction to randomized data stored according to the subject technologies, this specification next addresses the retrieval and reconstruction of the data using the pointers key. This operation may be implemented in a modular way under the control of the main application.

Figure 17:
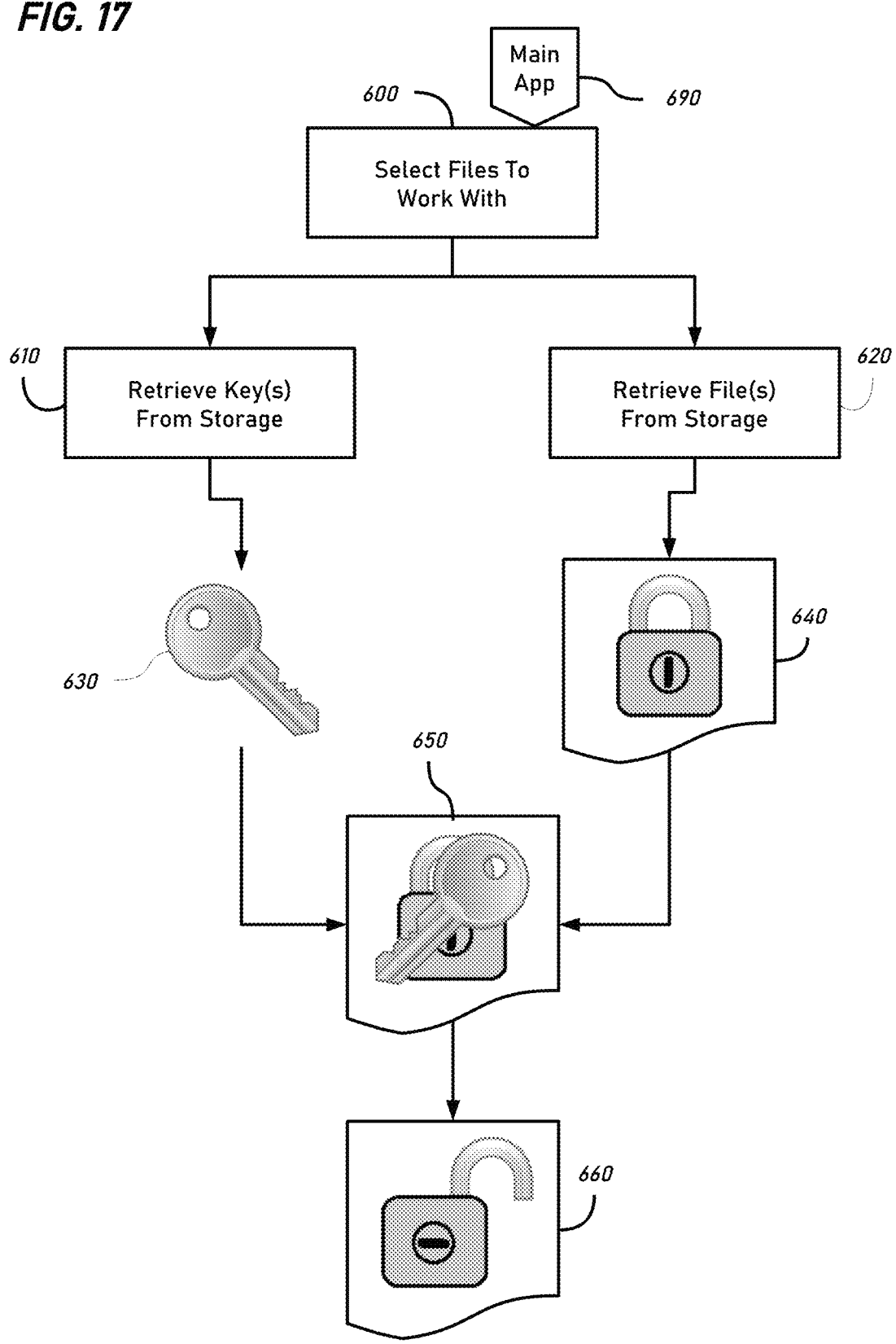
FIG. 17 is a block and flow system diagram of the recombination a randomized file according to an aspect of the subject technologies.

FIG. 17 shows the operations running within a main application 690; where the user selects files to work with 600. This causes the system to retrieve the pointers key to storage locations from key storage 610. The detail of where this key storage is, whether it is a local USB drive, or a distant cloud key storage location is not shown. So that the common elements across many implementations of the subject technologies can be shown more clearly by not obscuring the basics with those details.

The pointers key is used to interrogate the storage locations of the locked file 640 to which it points so that the data-blocks those locations contain may be retrieved and reassembled back into the order of the original file 650 by recreating the sequence in accord with the sequence of the pointers key to provide a reconstructed open file to work with 660.

Figure 18:
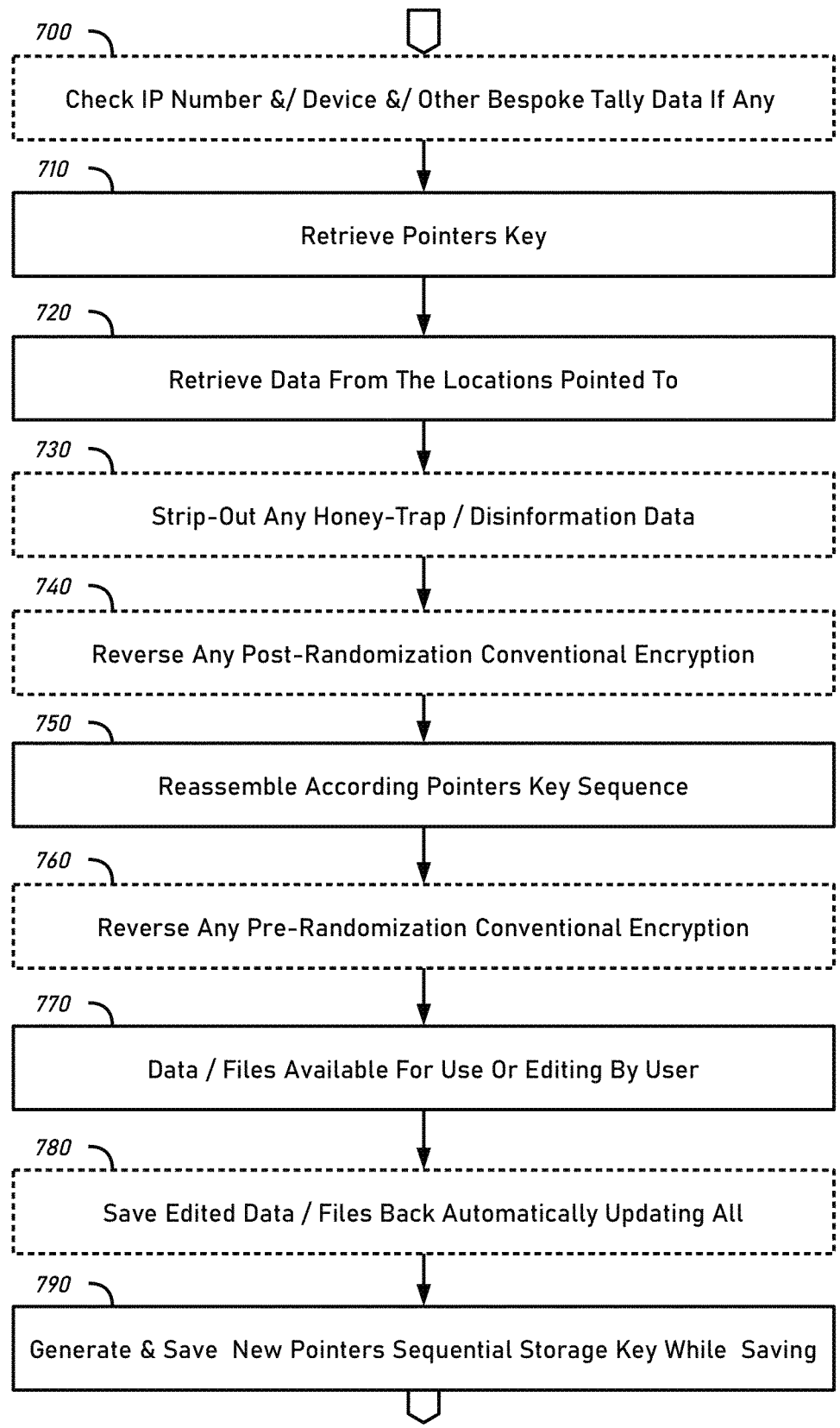
FIG. 18 is a block system and flow diagram of aspects of the subject technology for retrieval and reassembly of randomized data according to an aspect of the subject technologies.

FIG. 18 describes some more complex data security examples where pure randomization can optionally be integrated with other aspects of the subject technologies including the use of Tally data, optional honey trap data, and the subterfuge of using a conventional encryption on the files to be protected in addition to randomization. The last being useful, for concealing the true nature of the logical randomization of the data. To further bamboozle and befuddle would be hackers, and crackers.

FIG. 18 is essentially the reverse of the process and steps including the hybrid aspects of the subject technologies shown as being used to protect data in FIG. 10. In FIG. 11 the first optional processing step may be to check the IP address and/or device and/or other bespoke Tally data if any are available 700. The pointers key is retrieved 710, then using the pointers, data is retrieved from the locations pointed to 720. If any optional honey trap or disinformation data was included in among the stored data this may be stripped-out 730; and if there was any post randomization conventional encryption as may be useful in the case of a contiguously stored but internally randomized file, then this conventional encryption can be reversed according to whatever its rules are (not shown) 740. So that the randomized data can then be reassembled back into its original form by the process step of reassembling the data according to the pointers key sequence 750. The further optional step to then reverse any pre-randomization conventional encryption 760 can be executed, where applicable. So that the reconstructed data is finally restored to its original file pure of any encryption whatsoever, and the data and/or its files are made available by the application for use or editing by the user 770.

Users may be provided the optional function to save edited data and/or files back and updating all 780 probably according to their preset or other default options (not shown but likely to be like the process illustrated in FIG. 10 again). The final process step being to generate and save a new pointers sequential storage key as the data is re-saved 790, according to the subject technologies. In subsequent figures just as the detail of the operations of FIG. 10 were expanded upon subsequently, this specification now similarly expands upon these operations in the figures that follow.

Figure 19:
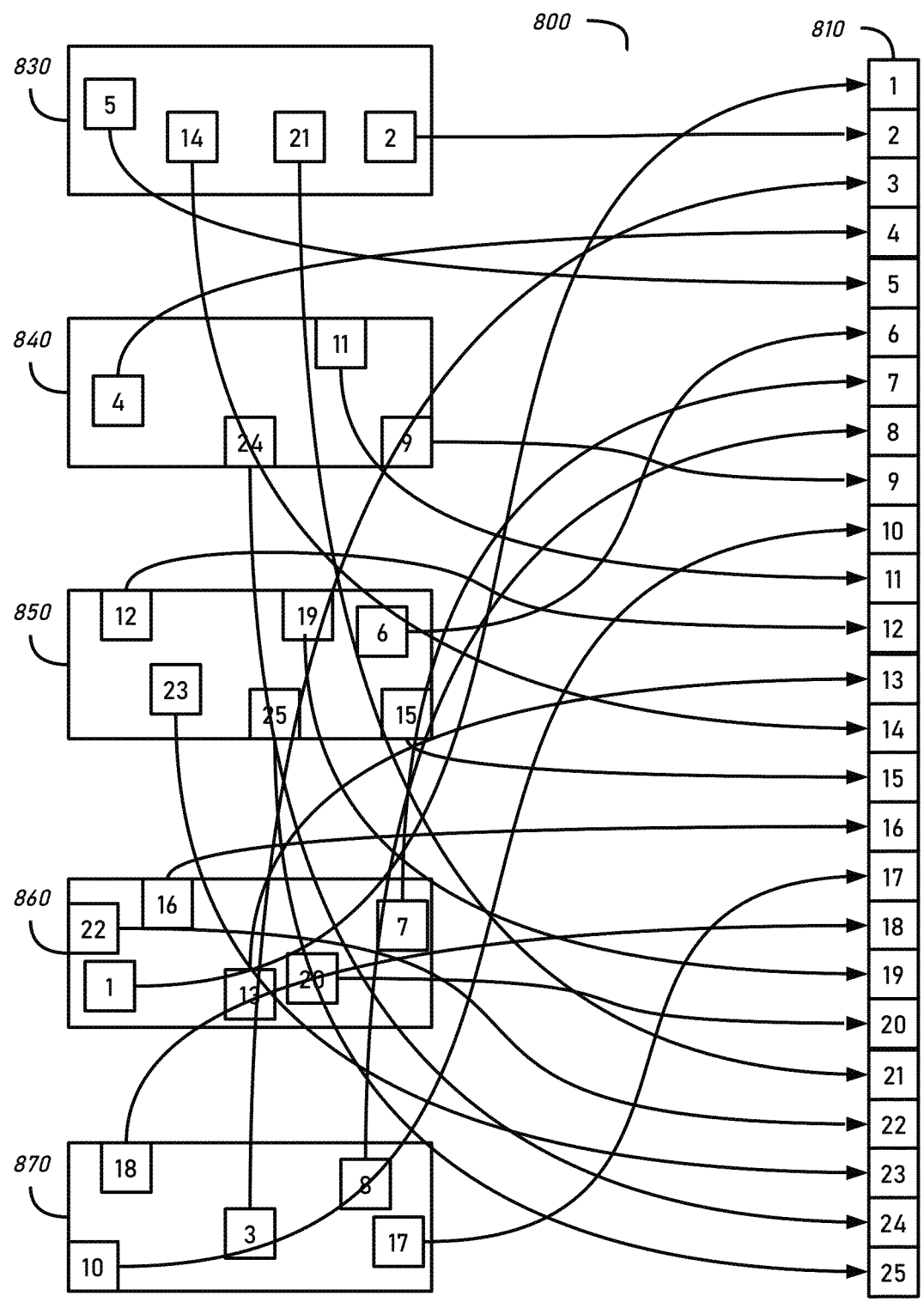
FIG. 19 shows randomized data (left) being de-randomized and retrieved from parallel storage locations according to an aspect of the subject technologies.

FIG. 19 shows at the hardware level randomized data blocks 1-25 like that of FIG. 18, being retrieved from five disparate storage locations 830 containing data blocks 5, 14, 21, and 2, 840 containing data blocks 4, 24, 11, and 9 etc., with locations 850, 860 and 870 containing the rest of the data blocks that were randomly stored within those locations. The pointers key 800 is used by the main application running on a system according to these subject technologies, which operates on them to reassemble them back into their original form into the file 810 on the right of the figure.

Pointers may connect to data at great distances or locally to a local machine the physical distances of which are virtualized here. Pointers not only have the benefit of being uncomplicated to use, there is no math or calculation overhead to doing so, they are what they are. They do not consume processor resources the same way that conventional cryptography does as it crunches its way through the math, nor do they require processing power to determine recovery locations in data access operations as some hashing functions may.

Figure 20:
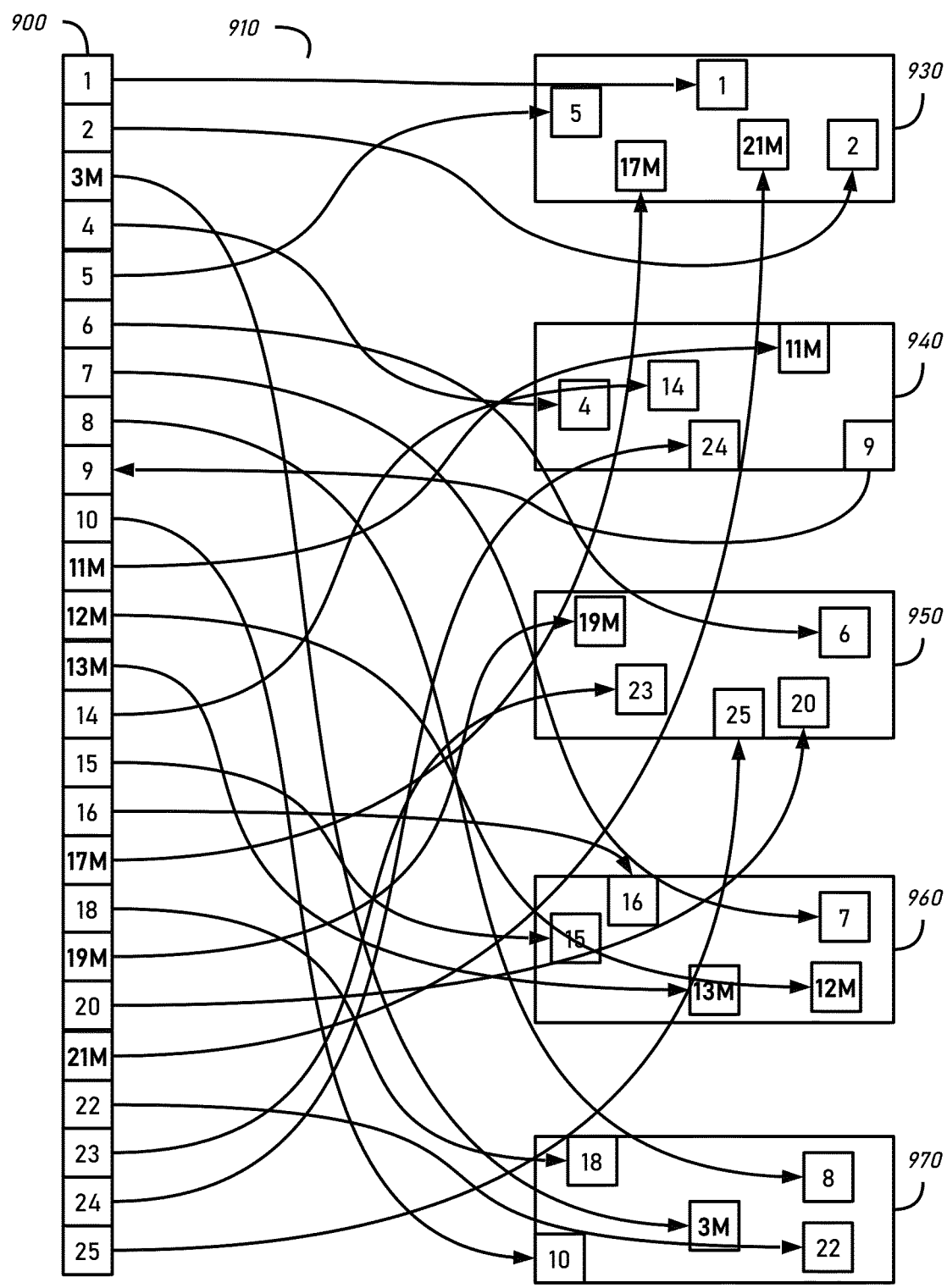
FIG. 20 shows a file that has been modified by work then re-separated into new data blocks written randomly to multiple parallel storage locations, according to an aspect of the subject technologies.

FIG. 20 shows the same file 810 comprised of data blocks 1-25 that was recovered from randomized storage in FIG. 19, and as explained in FIG. 18, except that this file 900 has been worked on so that data blocks 3M 11M 12M 13M 17M 19M and 21M have all been modified. The modified file is again randomly distributed to five storage locations 930, 940, 950, 960 and 970. These may be separate server hard drives, in separate data centers within the cloud architecture which cloud could have hundreds or even thousands of data centers in America or world-wide. The pointers key may be stored also in a cloud location or locally or to removable media. The options are endless. Sot that with this figure it has been demonstrated how data is randomized, stored, retrieved, then stored again according to the randomizing subject technologies.

All security technologies have weak points, and one such weak point is where a local copy of a file can remain assembled in the device where it has been worked on or where it has been stored. Software exists that can recover deleted files, and data recovery experts and forensic scientists can even recover magnetic impressions of data that has been overwritten. The Department of Defense has specified ten overwrites as a standard for the secure destruction of magnetic data on hard disk drives. But it is likely that even this is not fully effective against the very best laboratories as may be used by spy agencies.

Ideally, once data is randomized into disparate storage locations within the cloud, arguably it should not be reassembled into a local copy on a local hard drive if it is highly secret. Rather it should be ideally be worked on across the cloud architecture. Furthermore it may be held locally, but only in random access memory (RAM) so as not to leave any copies of any of part of it, on a local hard disc drive (HDD) which often occurs due to the operating system buffering to a part of the HDD that has been reserved for buffering to work like a RAM-disc; or page file.

Keeping the data entirely in real RAM is much more practical than it used to be because the cost of RAM has fallen, and its stability and size have increased. This trend will likely continue, along with improvements in processors. However, where a virtual RAM-disc or disc-based page file is used, then the data it contained although transient in nature may nevertheless leave a trace copy of itself that also ideally needs to be securely deleted. Especially where security needs are high such as in the intelligence community and the military and defense contracting organizations like Lockheed Martin, Raytheon, and Boeing etc.

In data security, whether locally or remotely in the cloud there is a need for secure deletion of files including any RAM-disc or page file data. Using these subject technologies, it may be possible to exceed current DoD specifications.

Figure 21:
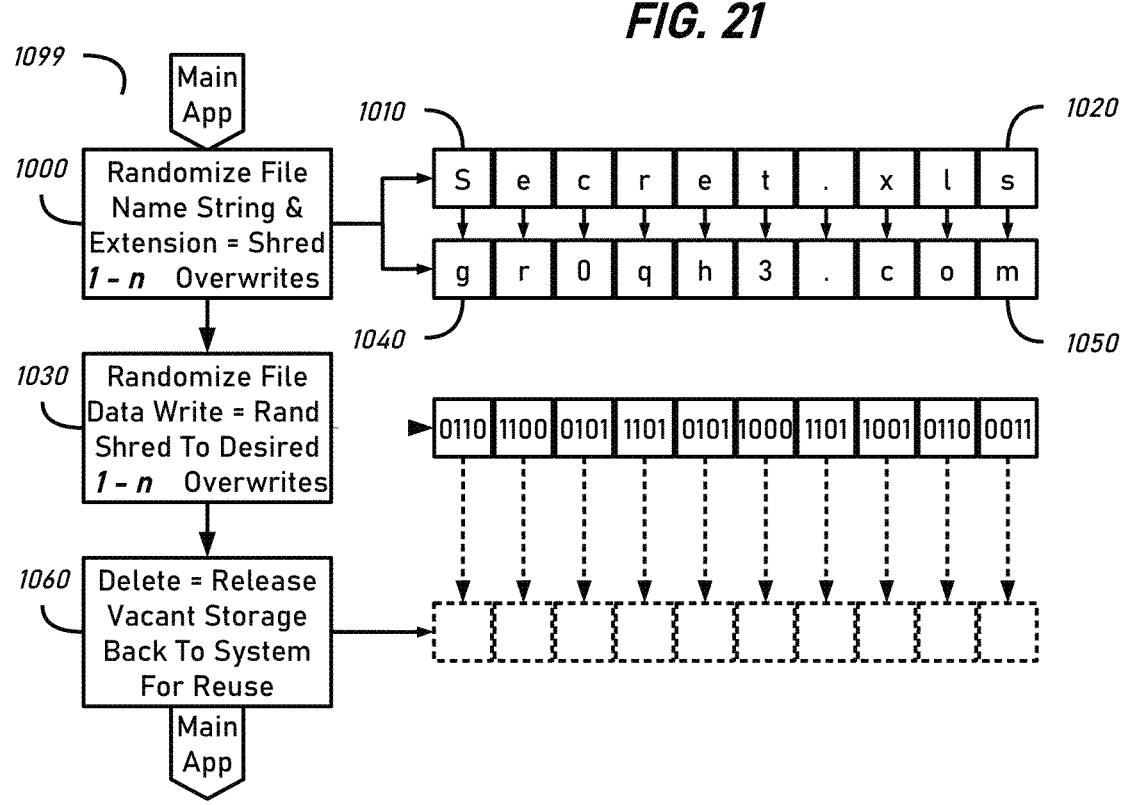
FIG. 21 is schematic plus a logic module in block and flow system diagram form, performing a data randomization secure data deletion operation according to an aspect of the subject technologies.

FIG. 21 provides a secure deletion process 1099, capable of operations as a module running under the main application of these subject technologies on a local or remote machine, or both. The module or sub-program for the secure deletion of files on local storage 1099, is running on a machine under a main application. Randomized data in cloud storage is much less of a risk. Provided that is it stored in randomized locations. Then all that is really needed in most cases may be to securely delete it—is the secure deletion of the pointers key file; and release back to the system of the storage allocations to which it pointed. So that in the following description, it is helpful to include an array of pointers or key file in the types of files that this module or sub-program can delete.

The first operation 1000 is to randomize the file name string 1010 and extension 1020, which shreds these attributes, and to do it as many times as required.

The next process step 1030 is for the randomized overwriting with random data "1-n" from one time to "n" times, of the data stored at the file locations to which the resulting name string 1040 and extension 1050 relates. Noting that the Department of Defense's specification for the deletion of data is ten overwrites, noting also that in these subject technologies, this is not simple repeated deletions with the zero character or value.

Rather this is randomized overwriting of the physical data according to these subject technologies. So that it should be more difficult to distinguish the underlying data from every level. Because probably the data will be overwritten in a binary system on average around about fifty percent of the time with the same value that was there before. This comprises a more sophisticated method of random overwriting. Being probably harder to back engineer than simple repeated deletion and overwriting with a predictable value such as zero or one. Though not shown the security, and trade-craft disinformation factor can be further boosted by being overwritten with disinformation data that is comprehensible and not random. So that if a really clever forensics team or AI algorithm does find a pattern hidden in one layer of recovered deleted data, it could be an extract from the collected works of William Shakespeare, or intercepted FSB communications data files, or maybe even the Kamasutra. So as to put a distraction data pattern in there. Maybe even to write in some plausible disinformation between delete cycles.

After which shredding by overwriting, the next operation 1060 is to delete the data, and file name by releasing its now vacant storage locations back to the system(s) local and remote (if applicable) for re-use. Re-use and more overwriting with other files is in this context also a good and helpful thing.

Images can contain secret information of many forms and they can also be processed and stored according to the subject technologies. This is true for secret spy satellite photographs of adversaries' or allies' weapons systems, that it is desirable do not spread beyond the people who have a need to know their details. Other images can require protection for personal reasons.

Figure 22:
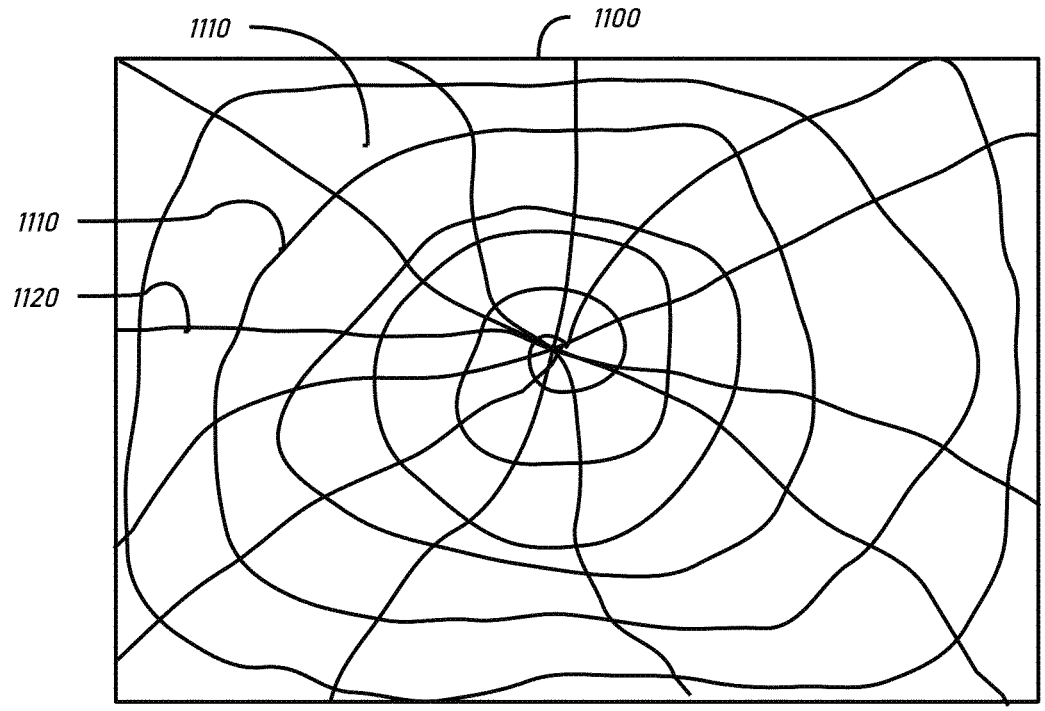
FIG. 22 is an image the data of which is broken by a cut pattern into data blocks according to an aspect of the subject technologies.

FIG. 22 is an image randomization 1100 that uses the pattern of a randomized spider's web comprised of a variable swirl 1110, and a variable pattern of spokes derived from patterns that are randomly varied within maxima and minima to cut or break up an image into data blocks 110. That are then capable to be randomly allocated into storage locations; and to produce also a pointers array key in accord with the subject technologies.

Figure 23:
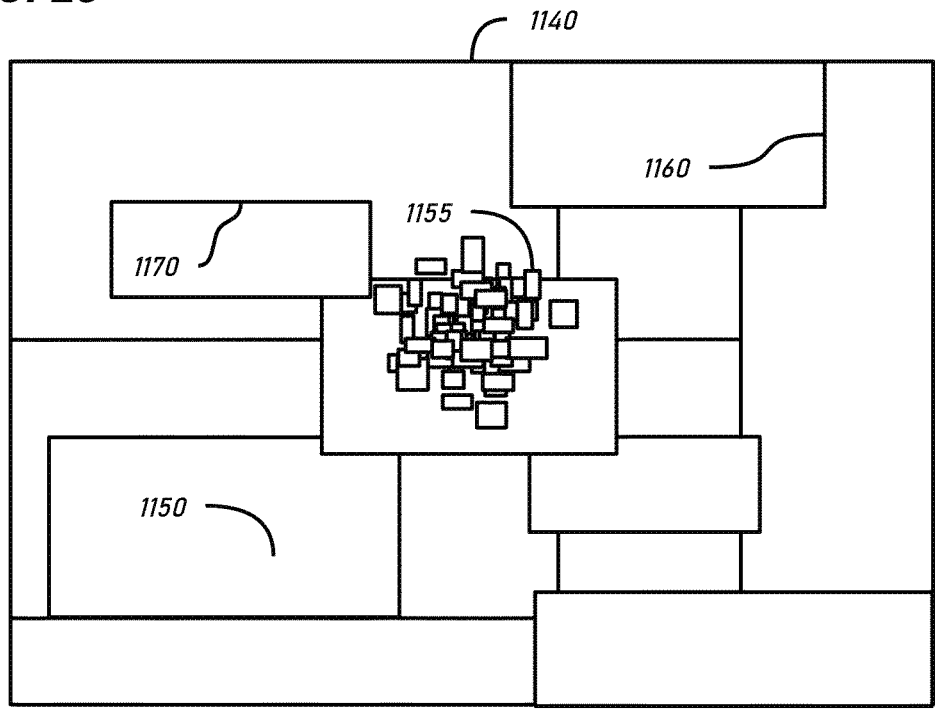
FIG. 23 is an image the data of which is broken by a cut pattern into data blocks according to and aspect of the subject technologies.

FIG. 23 is an image randomization 1140 that uses a pattern of vertical lines 1150 and horizontal lines 1170 to create a pattern of overlaid rectangles capable to divide the image into data blocks 1150 that are randomly sized between preset minima and maxima, and which minima and maxima can be varied or randomized within an identified zone of highest secrecy. To form smaller data blocks for random storage as needed 1155. The image being thus cut or broken up into larger data blocks 1150 and smaller data blocks 1155. That are then both capable to be randomly allocated into storage locations; and to produce also a pointers array key in accord with the subject technologies.

Figure 24:
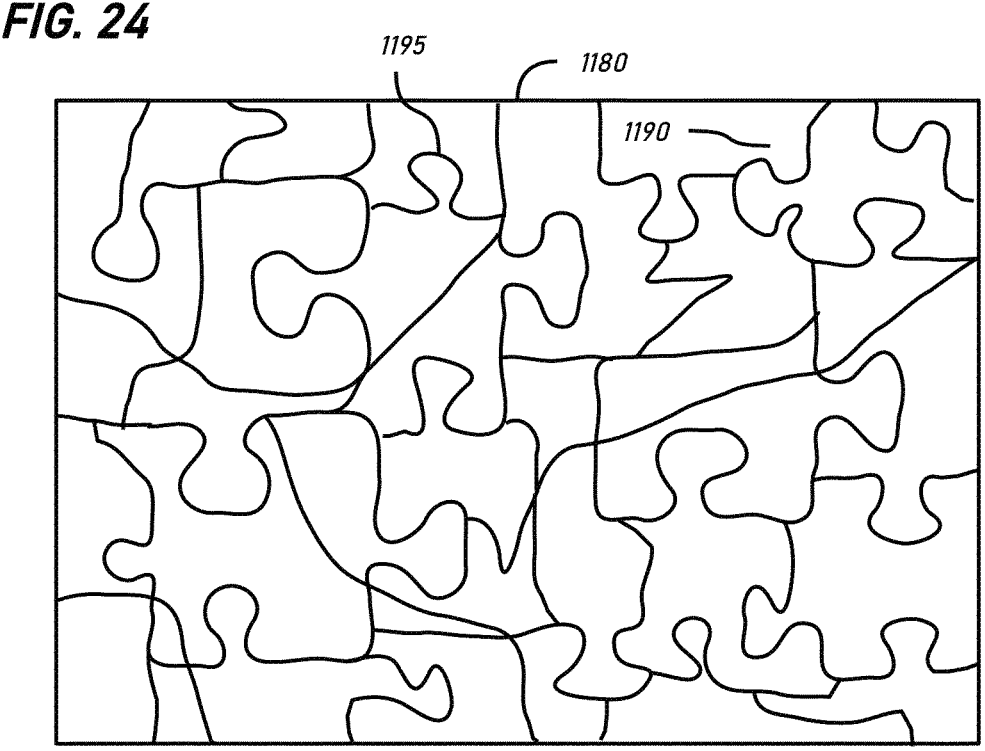
FIG. 24 is an image the data of which is broken by a cut pattern into data blocks according to and aspect of the subject technologies.

FIG. 24 is an image randomization 1180 that uses a jigsaw pattern randomized to produce slightly surreal contours 1195 to create a pattern capable to divide the image into data blocks 1190 that are randomly sized between preset minima and maxima, and which minima and maxima can be varied, and reduced within an identified zone of highest secrecy (not shown here). That are then in all their variable shapes and sizes capable to be randomly allocated into storage locations; and to produce also a pointers array key in accord with the subject technologies.

Once created these cut patterns can be used similarly on multiple images and they can be selected randomly from a selection of cut patterns. Or they can be created on the fly as bespoke cut patterns. Probably, users of mobile phones might like to design their own cut patterns by doodling them onto the screens of their devices. Next the systems block and flow diagram capable of doing these tasks is described.

Various components and blocks may be arranged differently (e.g., arranged in a different order, or partitioned in a different way) all without departing from the scope of the subject technology.

Figure 25:
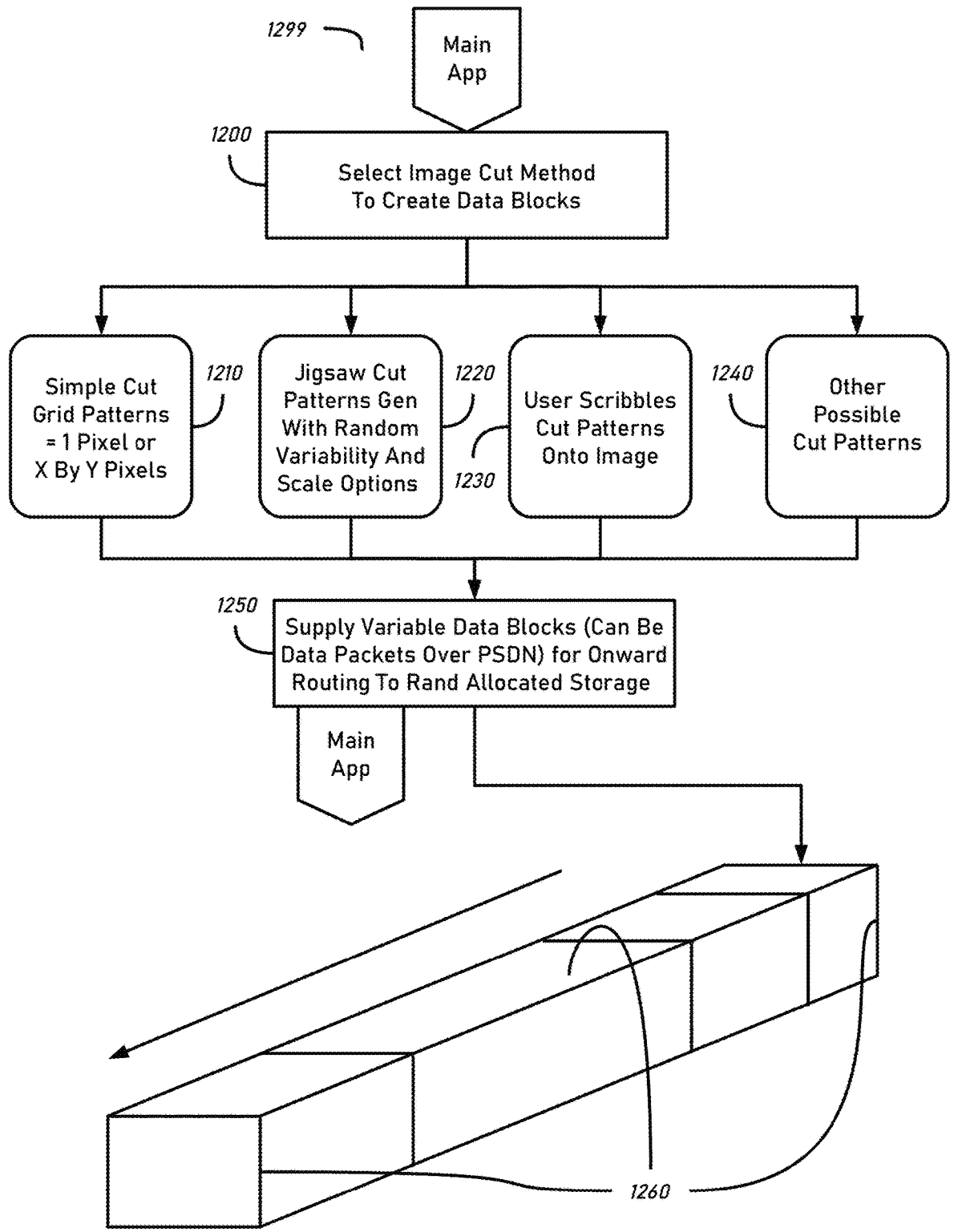
FIG. 25 is a mixed schematic block and flow system diagram of the creation of a stream of data blocks created from an image, according to an aspect of the subject technologies.

FIG. 25 is a modular operation or function 1299, running under a main application in accord with the subject technologies. Firstly, the image cut method is selected to create the data blocks 1200. After which comes one of the alternative process steps: 1210 provides simple cut grid patterns, which can be as small as one pixel, and variable within maxima and minima in the form of "X" pixels by "Y" pixels; 1220 provides jigsaw type cut patterns, generated with random variables and scale options; 1230 uses scribbled cut patterns provided by users and that are imposed onto the image; and 1240 is a catch all alternative option for any other suitable cut patterns that are possible, the full range of which is potentially infinite and not further expressed for that reason.

The next processing step is to supply these variably sized data blocks for randomized onward routing to their randomly allocated storage locations 1250. As visually drawn in perspective as the stream of data blocks of varying sizes 1260 is being output. These being provided to other parts of the main application (not shown) and/or to helper applications at their ultimate storage locations. As explained in the overview provided by system 101 of FIG. 8.

Figure 26:
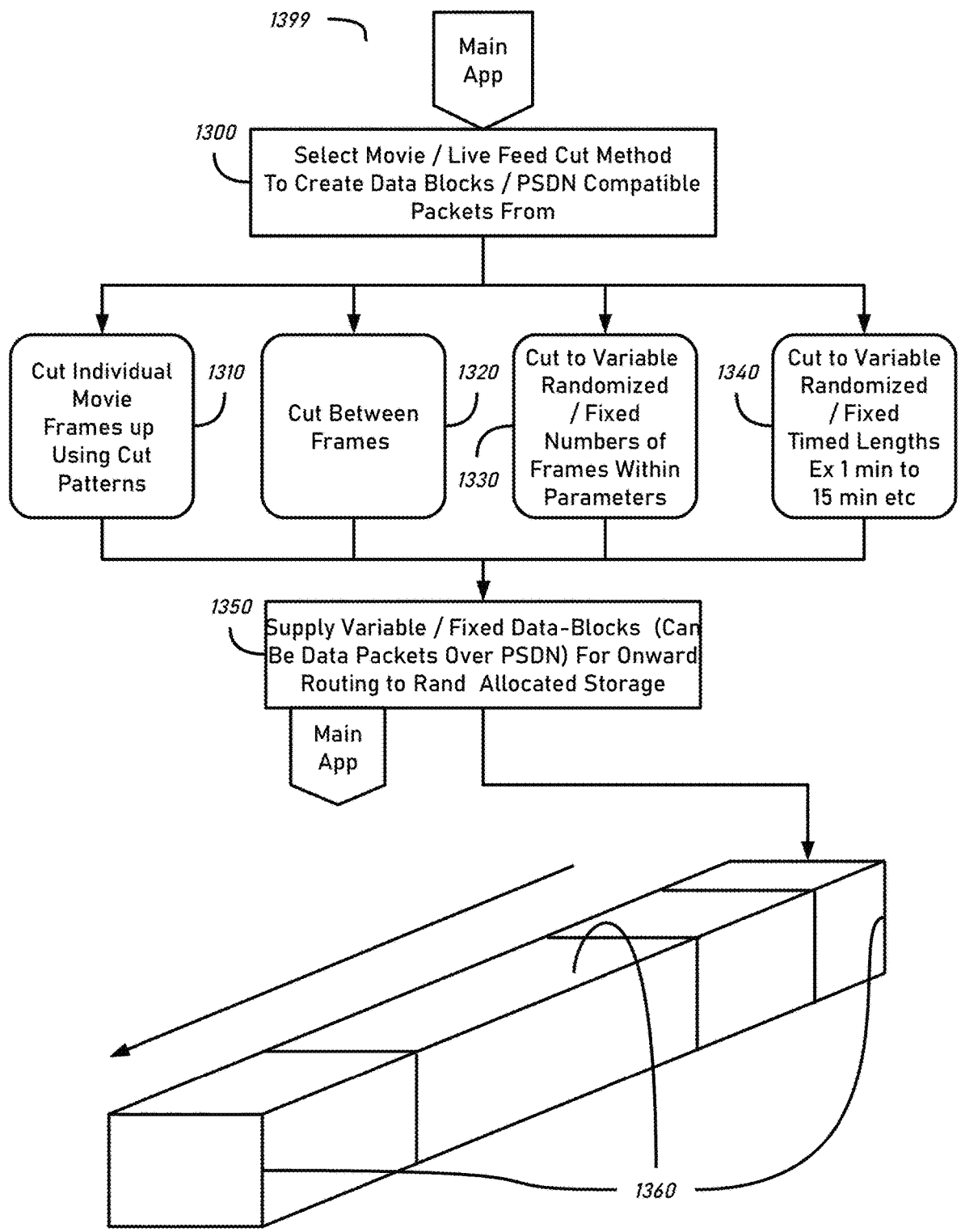
FIG. 26 is a mixed schematic and block and flow system diagram of the logic and creation of a stream of data blocks created from a succession of images comprising a motion picture, or visual data feed, according to an aspect of the subject technologies.

FIG. 26 is like the previous figure, except that it related to still images, and it relates to streaming media which includes a succession of images. This module or operation 1399 may be run within or called to run from within a main application.

The first step of which is to select the movie, or live feed cut method to create data blocks.

Then comes the alternative steps: 1310 to cut individual movie frames up using cut patterns which would be very secure; or 1320 to cut between frames; or 1330 cut to variable randomized or fixed numbers of frames within maximum and minimum parameters; or cut to variable randomized or fixed timed lengths, between minimum and maximum parameters, such as a 1 minute minimum and a 15 minute maximum. Then to supply these variable or fixed data blocks for onward routing to randomly allocated storage 1350. So that the stream of data blocks of fixed or variable sizes 1360 is output as such and can then proceed to randomized storage according to the subject technologies.

FIG. 27 shows block systems and flow diagram aspects in the context of a schematic representation of the upload of randomized data blocks to randomized locations within the cloud, as a process or module operating on cloud infrastructure 1499. The stream of data blocks coming to the cloud 1470 is coming from another module or process running a process that may be like those of FIGS. 18 and 19 etc and others according to these subject technologies on a remote machine, over a network and arriving here as the data blocks 1470. These are being uploaded to randomized locations 1480, and 1490 and within the cloud infrastructure marked "x" in the cloud data centers 1430.

Pointers recording where each data block is stored, are sequentially stored in an array. The pointers and data being stored in real time within the process time frame snapshot 1450 are kept in sequence so that the key is the sequence of pointers 1410 as it corresponds to the locations of the data blocks that is uploaded to a separate cloud key storage location 1400, and that may be backed-up to, or mirrored in alternative storage 1420. To avoid loss of the pointers key in the event of a failure of the primary cloud storage; a similar alternative mirror or backup location is also shown for the cloud storage 1460. The curved arrows are used to show data paths to and from their storage locations marked "x" 1480, and 1490, and the creation and storage of the pointers to the locations marked "x" being recorded within a sequential array structure 1410, and its upload to and storage in a separate cloud key storage location 1400 as a key within that cloud is used to help readers to visualize the upload process, as well as calling out its specific components according to the numbering system.

The cloud storage locations that may each be data centers 1430 are shown as a receding line of four clouds, and it should be remembered that there could be hundreds or thousands of these. Though there is not enough space to show more than a few. The same as only a few data blocks are illustrated in a snapshot correlating to the time frame window 1450. This is because the illustration would be obscured by detail if more data blocks and pointers were shown passing over a wider time frame.

FIG. 28 shows block systems and flow diagram aspects in the context of a schematic representation of the download of randomized data blocks from randomized locations within the cloud, as a process or module operating on cloud infrastructure 1599. This is essentially the same component parts of infrastructure as in the previous figure showing process 1499 which was the upload that preceded this download, and reassembly of the data blocks operating rather like a zipper as the pointers are applied to call down and zip back together the data blocks 1442 into a reconstructed copy of the original file or data stream 1475. This is a very important aspect of the subject technologies. Because it may form the basis for defense cloud data protection; as well as for civilian streaming media applications where intellectual property rights are being protected, and monetized. As such it may be one of the more commercially important aspects of the subject technologies.

The downloading and recombination operation 1599 works by downloading the pointers key 1410 from the cloud key storage 1400, or from the alternative mirror or backup key storage 1420; then reading sequentially through the pointers key to identify the storage locations of the data blocks at locations marked "x" within the cloud data centers 1430, identified here in this snapshot as data block 42 which tallies with pointer 42 and is called out as item 1490, and data block 43 which tallies with pointer 43 and is called out as item 1480; or if problems are encountered these can be downloaded from the alternative other or mirror or backup data storage 1460. Whereupon, these are recombined 1442 or zipped back into a copy of the original file or data stream 1475. This same process is enlarged-upon in the next figure in the context of data streaming.

FIG. 29 shows an operation or process module 1588, running under a main application that may be a smart phone, smart TV, Tablet or PC. It could even be running on the defense version of the Internet and relate to classified material being shared between the senior defense staff on the East and West Coasts, as well as officers in the field—as part of a classified teleconference. Wherein, a data block stream from either satellite and/or antenna and/or dongle and/or a wide area network (such as the Internet) and/or telephone line and/or other data or communications channel 1500 provides to the device(s) upon which this module 1588 is running. The data is in the form of blocks of media data 1510 that is 2.96 minutes' worth of randomized data stream; 1520 that is 9.82 minutes' worth of randomized data stream; and 1530 that is 3.45 minutes' worth of randomized data stream. All of which may travel different routes over networks from disparate randomized storage locations. Though that level of detail is illustrated in previous figures but not shown here for the sake of clarity.

What enables the stream of randomized data blocks to be downloaded from their randomized storage locations is the data block randomization keys from satellite and/or antenna and/or dongle and/or the Internet (or similar wide area network) and/or telephone line and/or other communications channel 1505. These data randomization keys may be comprised of arrays each corresponding to a randomized data object and which keys are 1515, 1525, and 1535 provide pointers to the download address or storage location of each of the respective data blocks in the same order 1510, 1520, and 1530.

Furthermore, their one to one relationship as well as being used in sequence to call down the data blocks for reassembly, may contain additional complexity not shown here where the frames of movies are randomized by cut patterns and/or randomized out of chronological order, and these changes may also be recorded in arrays of pointers. Nested levels of pointers may be carried within the keys as parallel arrays, nested arrays or even an array of database files.

However, this figure of process 1588 has the purpose of illustrating mainly that a data streaming service can be run using the subject technologies, to provide previously unattainable levels of security; and that from the user device perspective as two data streams or threads running concurrently one for the keys and one for the data blocks needs to run, provided the bandwidth to read ahead of the images being viewed is present. With the result that users can enjoy performance at the level they are used to and expect, without any appreciable loss of convenience as between the more secure subject technologies and the prior-art.

FIG. 30, is a general purpose artificial intelligence system 2199, that has a program 2110 that controls the system while running on the resources provided by one or more CPU/GPU 2100, and in working memory 2113; as well as storage that may be capable to load (or boot up) the program, and automatically saves learning 2115, from the training and/or seed data 2165, and experiences the new data 2142 from sensors 2140 and other inputs 2105 such as user tweaking of feedback 2150 from these sources as is gained during operation of the system 2199.

This system has some conventional algorithms 2120 such as basic input/output system ("BIOS"), and may have others capable to do standard computation and system tasks that do not require artificial intelligence. These algorithms can be likened to the autonomic nervous systems of animals, that are hard wired by instinct preloaded from birth like breathing, walking and swimming are in some species. Which is a good way to understand these supporting and enabling conventional algorithms. Until the creation of artificial intelligence and machine learning, the conventional algorithms had already become very advanced, and can be made capable to pursue goals 2130. For example, expert systems using relational databases and programmed to excel at a specific task were already capable to defeat humans at Chess. So that the power and sophistication of already available conventional algorithms should not be ignored or discarded because of the promise of AI.

In these subject technologies there is much use of feedback, and in the context of programming conventional algorithms, it is highly likely that developments in AI and/or ML, can be reduced back to a more efficient conventional algorithm once the logic of the AI and ML solution to a specific problem is understood. So that these methods of making systems are likely to feed-back into generally improving computation technologies.

The alternate process step to use AI comprised of neural networks 2160 is present in this system. To make it capable to use AI for those tasks to which it is best suited or desired. In the art progress was stuck for many years. Until the computing power to make deeper neural networks with more layers of neurons became practical. Assisted further by other techniques for feedback used for recursion and adjustment of the weightings given to neurons 2170 have also boosted the utility of AI and/or ML in the prior-art. So that it is now rapidly proliferating into devices.

These subject technologies provide an advance over the prior art, in alternative process 2170 by Polymorphic AI ("PAI"), that is capable to evolve to suit processing needs via input and/or feedback 2175. Which process is reminiscent of the growth of biological brains, and of neuroplasticity, which is the human brain's ability to rewire itself based on experience and after injury.

The alternate process 2175 and all the PAI aspects of this system are shown in dashed line, as optional elements. Alternate process 2185 allows the system to create and destroy neurons (nodes) within a neural network, which may be accomplished by the manipulation and use of pointers to connect processing capacity and memory from which to make a neuron; and to connect neurons to each other, and to system resources. Alternate process step 2180 is capable to and does create and destroy dendrites (connections) between neurons; and between neurons and system resources also via removing pointers.

The next process step from these last two combined is the capability to allocate and/or release resources of RAM and CPU/GPU resources for the creation and destruction of neurons 2195. Furthermore, where a Polymorphic Neuron is created, or an existing neuron is Polymorphically boosted as a hybrid, it may have resources added to it, such as parallel dendrites and/or extra bandwidth to allow more polymorphic connectivity 2190.

Figure 31:
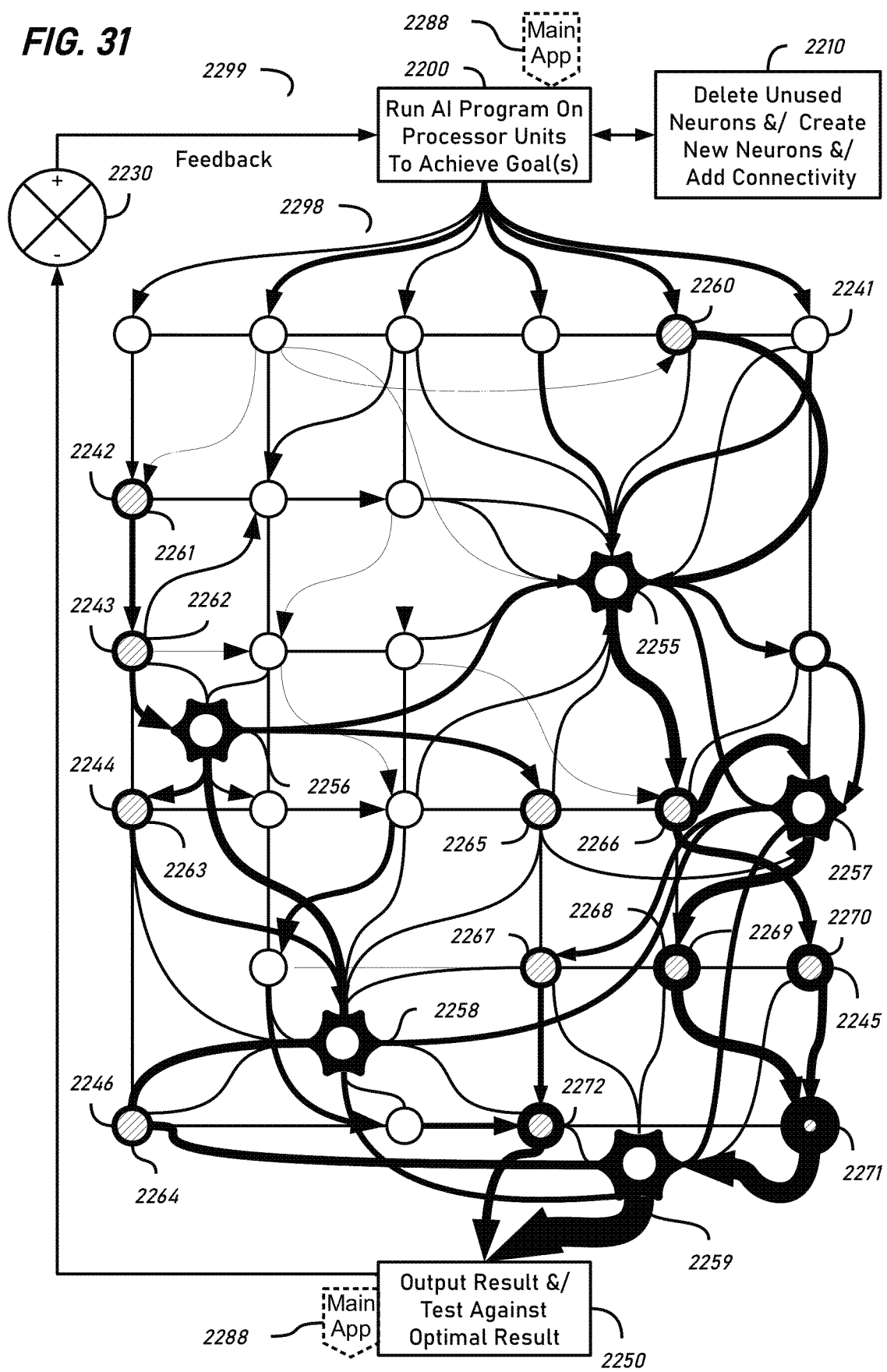
FIG. 31 is a mixed schematic and block flow system diagram of a neural network according to aspects of the subject technologies.
Figure 32:
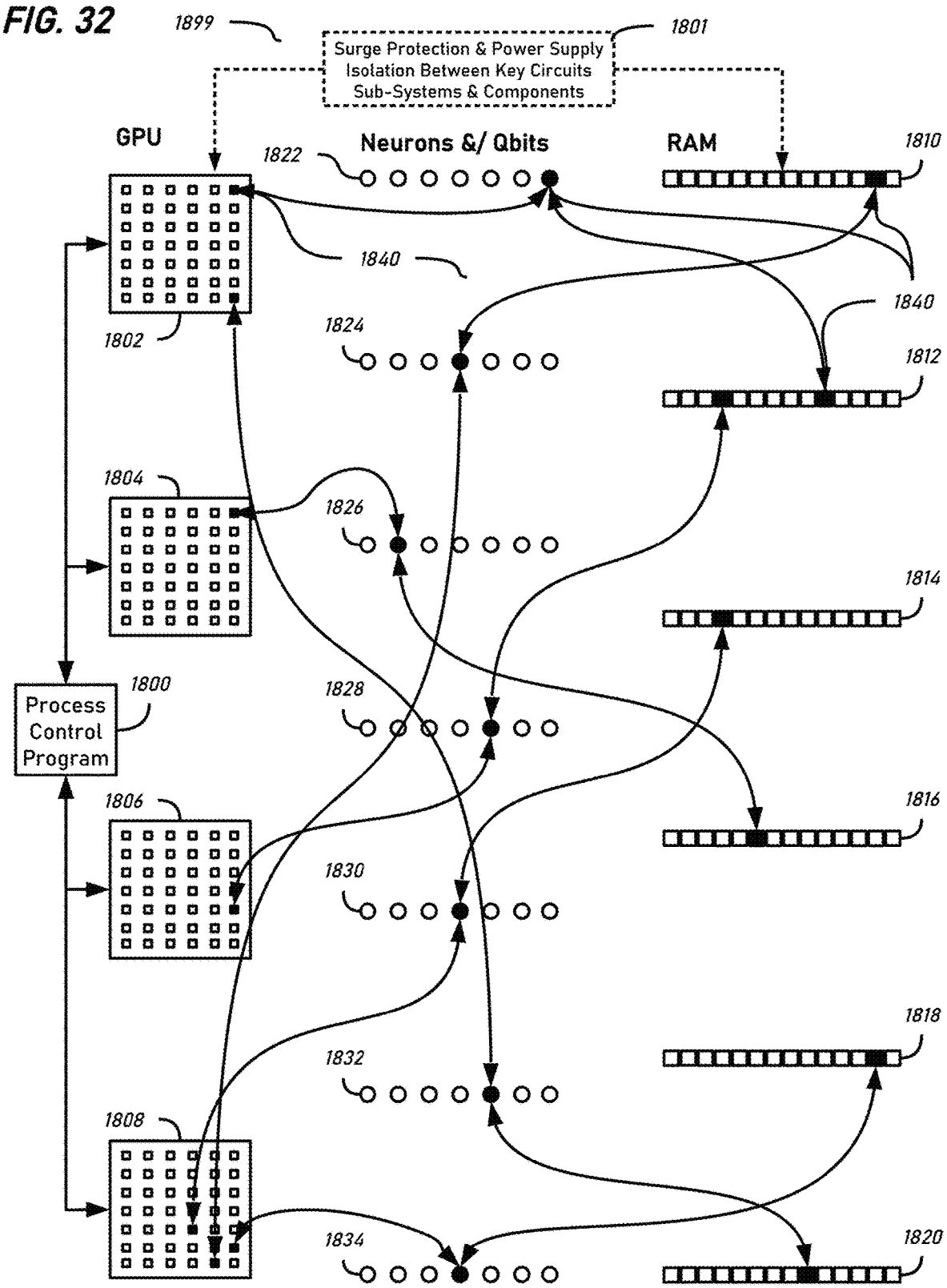
FIG. 32 is mixed schematic and block flow system diagram of the creation of a neurons and/or quantum-bits in accord with aspects of the subject technologies.

How this may be accomplished, vis a vis hardware and even randomized for improved security on systems the military might need, is further explained in the descriptive materials relating to the system 1899 shown in FIG. 32; and the system 2299 of FIG. 31; which includes a conventional starter neural network that has been run, and as it learned it evolved to become optimized; according to a system such as 2199.

The PAI program adds complexity where more is needed and gets out of its own way by simplifying itself where possible. This in turn enables the more efficient use of the resources of the system, so that bit for bit of computing power, PAI may be capable to use available resources more efficiently. Thereby to provide either smarter AI for the same resources, or cheaper AI that needs less resources for a given level of intelligence. Noting that the details of a structure of virtual neurons and dendrites comprising a neural network, may also be stored for later recreation.

FIG. 31 shows the result of modifications to a conventional neural network, used as a starter or seed network, to kick-start a neural network for further optimization via a Polymorphic AI algorithm based program. PAI based or optimized neural networks may be started in various ways, this is just one possible starting position. It also helps to illustrate the current state of the art of an older neural network based on weightings. Which may have been allowed to run and to self-optimize within the constraints of static neural networks. From which data it was then possible by looking at the weightings to see that some neuron combinations were never used or were under used.

Further investigation may then reveal that the unused parts of the conventional neural networks tracked back to logical impossibilities. So that they constituted a total waste of resources, that would probably never be used. Also, where under-used neurons appeared—it became clear that there were parts of the network where parts of an entire layer were effectively redundant, and only acted as communications conduits rather than performing useful work.

The PAI neural network application therefore began to try out informed guesses to see where the neurons could be removed 2210. This tracks to a real-world biological process called "pruning" that occurs in the brains of human teenagers where they lose skills, knowledge and capabilities that they don't use sufficiently often. Because the algorithm can experiment with deletions, then run test data it is possible to see what if any difference pruning a neuron or dendrite connection makes; and where the results are undesirable the neuron may be reinstated. Because backups of these neural networks can be stored, it is possible to pursue a line of changes and to abandon those changes and to return to a previous iteration that worked better. This rollback changes feature is a valuable part of the system 2199 in the previous FIG. 30. Though that level of detail of the system is not shown here, because here we are mainly concerned with the neural network results of such an evolved PAI system. As well as pruning back a neural network the PAI system may create new irregular neurons wherever they may be helpful. Little used parts of the network may be simplified by the removal of part of a layer of neurons, and this may be replaced in part by an irregular polymorphic neuron.

Another process that occurs in human brains in old age, when the brain has lost so many neurons that they are becoming scarce and cannot be replaced—the brain resorts to another technique. In which the aged human brain boosts the number of connections or dendrites between the remaining neurons. By adding pointers to increase connectivity between neurons PAI may be caused to boost the dendrite like connections between neurons similarly. Which capability is another polymorphic characteristic of these subject technologies.

With electronic neurons, the pointers connect the neuron's CPU/GPU resource to its working memory and to long term storage data on the inside of the virtual neuron, and to other neurons on the outside of the neuron. Their connections to each other can also facilitate alternate less directly connecting routes to system resources, and some neurons may learn to act as proxies in order to patch over damage within a neural network.

Ideally neurons that are ripe for re-purpose will be the underutilized ones that possess an underutilized path to resources. The PAI program may be equipped with modules containing algorithms capable to handle all these functions, that may enable the neural network to be polymorphically optimized.

Indeed, by the setting of parameters, similar neural networks may be switchable between pre-stored and optimized configurations depending on operating conditions. Capable to permit rapid morphing between different versions of the same neural networks. The ability to save versions of the PAI's neural network to storage before optimizing for another condition, may be used to add a whole new switchable PAI mode to PAI systems.

For example when the sensors of a self-driving car detect rainfall. This may then trigger the PAI to switch to a version of itself that is optimized for wet weather driving conditions. So that it reduces speed, and allows longer breaking distances etc. Similarly a smart missile may detect a missile defense system ahead and switch to a PAI version that is optimized for stealth, and maneuverability via performing "jinking" maneuvers while in the danger zone. So that the polymorphic ability to modify the neural network between pre-stored configurations as conditions change, may be a cheap way to get essentially multiple A personalities, into one physical system. Serving to boost the overall utility of that system.

Indeed we may all eventually first get an artificial intelligence persona App, that helps with some task like driving our car, or managing our television viewing. We might let the same persona manage our appointments—like a personal assistant, and let them manage our routine purchases of food and disposables from stores. During which process, those artificial intelligence personalities or personae may become special and or emotionally bonded for us, and even bonded with us, in a form of symbiosis. Maybe like a beloved pet, or maybe like a family member, or vital brain augmentation or vital organ.

So that we may chose to save them and not lose their experience with each technology upgrade. Probably they will become upgradeable to the latest artificial intelligence technologies, and be able to bring their experience (data sets and wisdom) with them. As these technologies improve over time these innocuous members of our families may evolve thanks to polymorphic artificial intelligence. So as to become like loved pets, cherished friends and family members. Which or whom it may become unconscionable to delete, and which may eventually even achieve sentience. So much so—that they may stay with families long-term and even way beyond their original users; and in a dim distant future that may be run by artificial intelligences—they might even become our legal guardians, and control our carers and plans.

Imagine for the present time being a worker drone system may be optimized for various different tasks, by calling different personae from storage into working memory to run. So that there are many levels of polymorphism that may be applied due to the ability to rapidly copy and store the data that creates the neural networks in a succession of pre-optimized versions.

Pre-optimized versions once perfected may then be copied and mass produced into a large number of clone systems. They may be allowed to continue to poly-morph to their specific role, in a running-in process. Lessons learned from such running-in may be fed back to manufacturers and shared to other clones where it may be helpful.

These subject technologies may include polymorphic neurons, dendrites, as well as forming virtual synapses, and above that be provided the ability to morph between different versions of a neural network. That may be pre-optimized according to specific parameters so as to allow the overall level of intelligence delivered to users to be higher, or a set level of intelligence to be provided at a reduced cost. For only the cost of adding the poly-morphing capabilities of these subject technologies.

Furthermore, randomly morphed neural networks may boost security, from signals intelligence eavesdropping. In addition to which, polymorphic capabilities can be used to repair or patch a damaged neural network.

This ability may be useful to provide also an ability for self repair for damaged PAI systems, that may be of particular interest and utility for use in war fighting systems. That may be enabled to overcome damage by polymorphic re-routing using pointers to form new dendrite connections and boost the bandwidth of the remaining neurons so they can still work together and access the resources they need.

Similarly, though not shown in the drawings, neural networks may be polymorphically connected to other neural networks, and neural networks can be nested within other neural networks, perhaps to perform specific functions. Just as they may be nested into the structure of an algorithm that is essentially not an AI system other than it calls up A modules that work like modules of code, and observe the parameter passing conventions applicable within that system.

The power of the polymorphic approach is to connect any neuron or compatible component to any other within a system, with as little as one direct connection implemented via pointers acting like dendrites in biological brains. The Inventor looks forward to seeing what the industry does with PAI, especially for self-healing systems. That may cope with a bullet damaging a GPU or memory module, by adding connectivity to the remaining resources. Much the same way as human brains add connectivity to the renaming neurons in old age, to help offset the loss of neurons.

Any weightings that the neurons of system 2299 may have or may have had when configured as a conventional neural network are not shown. Rather the minimally expressed system 2299 is about the polymorphic aspects of the subject technologies. The PAI program runs on processor units to achieve goals 2200. It deletes unused, and maybe also underused neurons and/or creates needed neurons and/or adjusts the connectivity of neurons 2210.

Information flows into the neural network from the program and into the first layer of the neural network 2241, from where as the neurons process it and route it on it flows through to the last layer of the neural network 2246. When this network was a conventional neural network, the processing would flow through every level. But the pruning part of poly-morphing this neural network has deleted three neurons of the second layer 2242, and two neurons of the third layer 2243. But then appears to have replaced them all with just one new irregular polymorphic neuron. Which has become super connected with additional dendrites thereby boosting its bandwidth, and thus improved access to resources such as processing power and memory. So that it has become a super neuron. Like a person with leadership capabilities, it enjoys more access to resources and has a bigger role in the system than the conventional neurons.

Then above the fourth layer of neurons 2244 on the left side, the algorithm has created another super neuron in between layers, and without any deletions of surrounding neurons. Thereby adding a new layer comprised of one super neuron, also with some super connectivity.

The fourth level of the neural network 2244 has however lost one neuron on the right side, which it appears the system regretted and then replaced with a super neuron, with super connectivity in much the same place. In the sixth layer of neurons 2245 one neuron has been deleted on the left side and another neuron deleted in the center. There is a new super connected, super neuron interposed below the sixth layer 2245 and above the seventh layer of neurons 2246.

Almost finally, there are two neurons deleted one left and one right from the seventh layer of neurons 2246; and there is a super neuron below the seventh layer of neurons, which is also super connected and through which most of all final outcomes flow. Another noteworthy fact is that some of the original neurons have survived, and a few have even thrived to become master neurons with extra connectivity and access to resources flowing from that 2260, 2261, 2262, 2263, 2264, 2265, 2267, 2268, 2269, 2270, and 2272. Indeed 2271 is an exceptionally important super-neuron much like those created polymorphically even though it began as a standard weighted neuron.

This neural network processes information and the results are output and/or tested against an optimal result 2250. The difference between the results obtained and the optimal result is fed back to the controlling program, as the basis for further adjustments to the neural network 2298.

There is additional information in the detail, which is that the connectivity or bandwidth of neurons is represented by the lines that connect them. The thicker the lines the more bandwidth and traffic. It makes sense to add bandwidth and connectivity where needed. What is not shown here is the weightings that conventional AI attributes to neurons. This is for the sake of clarity. But one can infer the most connected neurons would correlate to a significant degree with the ones with the highest weightings if these were shown.

If an analogy is needed then conventional AI tries to treat all nodes equally, but in practice due to weightings some neurons become more important than others. They all have the same access to resources and the system does not favor them with more connectivity or access to resources no matter how busy or unused they may become.

The result is a wasteful miss-allocation of resources with unused, or underused neurons potentially taking up resources they don't merit. Whereas PAI is intended to behave more like a biological brain, with neuroplasticity, pruning (deletion) of unused and/or underused neurons, and the release and reallocation of their resources back to the system. That may then use them to boost the power of the system by using those resources to create new neurons and dendrites and insert these into the neural network where they are most needed.

The Inventor believes that both approaches have their merits, but that probably PAI may win-out over conventional AI due to improved efficiency and better economics. To be gained by more efficiently allocating and adjusting allocations of resources. If so PAI may become a very important technology, and a driver for the technology sector of the economy.

Having dealt with the randomization of data storage, networks and streaming data (above); the figures that follow relate mainly to systems' architectures that have been programmed to operate their CPU, GPU and RAM in a randomized way, which can be unique on any machine boot-up and operating system boot-up. So that the neurons of functionally identical neural networks can be recreated but wherein their addressing pointers are randomly organized anew at every boot-up.

So that it's no longer possible by listening to the same transistor from boot-up to boot-up, to know that it reliably operates on a specific process or type of information in a predictable or consistent way. This aspect of PAI and the randomization of the physical locations of resources anew at boot-time or upon a reset operation, may be used to provide systems more resistant to Signals-intelligence, based on their electromagnetic signal leakage characteristics. Because these may vary between systems that have the ability to randomize their physical resource use to implement the same system. It is hoped that Signals-Intelligence experts within the US military and/or DARPA are able to understand the significance of this capability. As against Signals-Intelligence, and for self repairing systems.

The polymorphic aspect of these subject technologies may also be capable to be adapted to provide not only neural networks, but also Quantum computing capabilities. They may be made compatible with the Inventor's own architectures, constructs and methods for the creation of neural networks capable of implementing his PAI, and conventional AI as well as machine learning. They also may be made compatible with the types of Quantum bits and Quantum computing architecture in the state of the art. Such as those being developed by Google. They are intended equally to be compatible with the Inventor's own architectures and methods for creating the quantum bits (Qbits), meaning based data structures and/or probability-based computing of these subject technologies.

So that those aspects of these subject technologies may be of universal applicability to the state of the art, in all these fast-evolving and related information processing technologies. And because of the way these subject technologies may work using pointers, these processes may all be capable of being randomized, to help frustrate Signals-Intelligence.

So that there are two themes to those aspects of the subject technologies, that are to provide more efficient, and economic hardware and software systems and applications, that can be implemented as conventional Quantum computing, Artificial Intelligence, and/or Machine Learning; as well as the Inventor's own subject technologies for those modes of computation. Which may be implemented in hybrid form for the purpose of improved overall capabilities, as well as—for the purpose of improving security by randomization.

FIG. 32 is a snapshot of a neural network for an artificial intelligence 1899; wherein there are four CPU/GPU 1802, 1804, 1806 and 1808 that are randomly creating seven layers of neurons 1822, 1824, 1826, 1828, 1830, 1832 and 1834, in combination with six parallel randomly accessible memory cards, the storage locations of which are implemented and accessed by randomized pointers between the location in which the neuron is being processed within a CPU/GPU, and the neuron and the memory locations to create and operate neurons which relate to each neuron and its learning. The active, pointed to locations being shown in black as such. All of which processors, memory and neurons are being run under the process control program 1800. This is how a hardware randomized neural network may be configured according to these subject technologies to provide, for example an AI system for missile defense, that may be resistant to being compromised by signals intelligence.

The random virtualization of processor and memory for computing need not necessarily carry higher power or time overheads than other conventionally organized systems. This system looks like a tangled web of pointers to a human if we try to show more than this snapshot. But this type of structure is not necessarily any more difficult to understand to a computer that may use few if any of the relational concepts humans use to comprehend structures and data. This architecture of system 1899 may also be used to create another aspect of these subject technologies that is described above (in the context of system 2199 of FIG. 30) which the Inventor has coined Polymorphic AI (PAI).

PAI, may become very important eventually, especially for military applications where part of an AI system might need to rapidly fix itself, to compensate for a lost or damaged CPU, transistor or memory block.

This system includes the optional hardware for surge protection and isolation of power supplies to subsystems and components 1801. The purpose of which may be to help to confine damage from a bullet that may damage a processor, power supply, memory module or other component. So as to prevent short-circuiting and destructive power-flows within a damaged system. To provide the opportunity for the damaged system to survive the damage without damaging itself further, and then to use its polymorphic capabilities to adjust to provide a still working system. Wherein the remaining resources are reconfigured, in order to restore functionality. Rather like a human brain can recover from a serious injury. Indeed some humans have recovered remarkably well after losing most of one hemisphere of their brain. The Inventor has a friend who has only just over half her brain—after a water-skiing crash. Who is still smarter than most people.

AI at first began using relatively shallow neural networks just a few layers of neurons deep, the success of which was limited. Then as computing power allowed deep AI with deeper and deeper layers of neurons. Recursive adjustments, and readjustments of neuron weightings (or counters) are already adding more utility and accuracy in the prior-art.

But where PAI differs, is that where there's a quicker better route not represented by an easy path through the neural network it can create a dendrite-like connection using pointers to jump over neurons that are just in the way, and it can create a polymorphic neuron, and connect it using dendrites based on pointers for a specific purpose; and that can then connect from any point to any point, within the neural network or even to addressable resources outside of it. Also using pointers that can work like wormholes to allow processing to flow from point to point within the architecture where the logic can be simplified, or the efficiency improved. Working to stop the AI getting in its own way and to allow it to build more connectivity and/or bandwidth, where it is merited.

So that we may expect PAI to look more like a road network or a real biological neural network in a biological brain. That accesses resources with different specialisms across a biological brain. Save that it is devoid of physical structure in its networked form. There is only processor units, memory and the tangle of pointers from the human perspective. This configuration may provide the flexibility ability to delete underused and redundant neurons and dendrites. To allow the release of the resources of the deleted dendrites and neurons back to the system for re-purposing.

This ability to destroy and create neurons and dendrites to prune shape and test neural networks enables the polymorphism to free up under used resources, for re-purposing. So that a well run-in PAI should consume less resources and may run faster than an equivalent conventional neural network, that is based on weightings.

For military applications where a system might be hit with a bullet that damages a GPU or memory module or power supply to one system part, that has some redundancy capabilities—a PAI system may be able to isolate the damaged module, and adapt to continue to function by polymorphic reconfiguration to the available resources. The ability to use hardware differently may also be helpful to the military and systems handling sensitive information, because eavesdroppers using Signals-Intelligence analytics may not be able to make sense of the changing ways in which the system may morph its processing among available resources.

However, before delving further into PAI, this specification next describes these subject technologies as they may impact Quantum computing, Quantum bits (often called "Qubits" or "Qbits"), the actual architecture of which may be similarly implemented according to these subject technologies. These subject technologies may provide a capability boost to Quantum computing as they may provide to AI, and thus lower the cost of making Qbits, and systems based on them. Qbits are often described as being like the one shown in FIG. 34, that has three possible states: "1" according to 1900 or "0" according to 1910 or "?" according to 1920.

Whereas the binary systems of modern electronic computers use binary logic. This works on transistors that are set to either a conducting or not conducting state. Like billions of tiny up or down 0/1 switches. These technologies have been increasing in computing power by getting smaller and more efficient for many years now. Some believe that the theoretical level of miniaturization will eventually limit this progress. But perhaps as people might once have feared humanity running out of flint, it could be that we will find a new different technological paradigm and that progress will continue.

The eminent physicist Feynman commented famously that "nobody understands quantum mechanics". He may be right, but there are now people who fervently believe that quantum computing might be able to solve the problems that humans and the best computers still cannot crack. So, here's just enough a little theory that may help explain. The spin, and waveform of a photon or electron passing through a slits type experiment may be modeled.

The Inventor postulates that it is as though the center of gravity of the waveform and its energy is the particle whose position impacts an energy barrier such as a screen. But that the waveform of the particle is what passes through everything else. So, it is an amorphous waveform; until challenged unequivocally by an energy barrier. At which point the waveform being active across all the dimensions of spacetime (however many there are) is resolved down to a common point.

That's very interesting, but how can we make a quantum computer? What would a quantum computer do? Might it reduce particle waveforms to point events correctly? And even if we could make it do that what use would it be?

The Inventor believes there is no more magic in basing computers on Quantum Mechanics than there would be in basing them on Newtonian Mechanics per se. Why not create bits that can mimic gears and levers for example . . . . Actually, that was achieved by The Data Engine designed by Sir Charles Babbage a very long time ago.

The answer the Inventor finally came to is that what is probably needed is a computing system that can operate in terms of probabilities, and can carry on a computation with multiple unknowns. So as to keep testing the data to discover and even to guess the unknowns. This sounds rather like artificial intelligence, and it also sounds rather like human intelligence. Where we correctly guess—and test—via insight into a problem. After which we may be able to test our hypotheses and conjecture against real world and/or experimental data. We can keep trying until we finally get the results that fit or discredit the theory.

Figure 33:
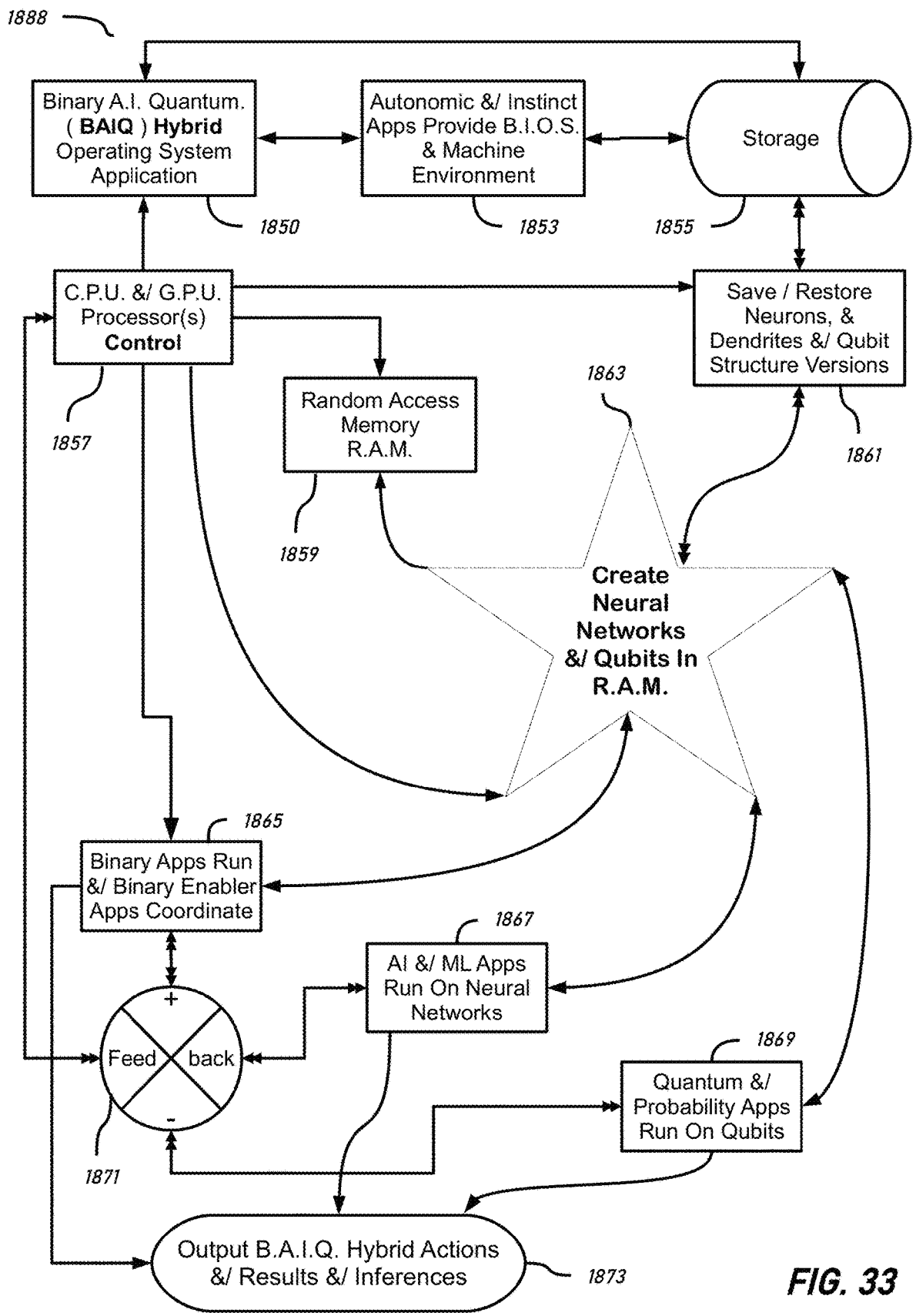
FIG. 33 is mixed schematic and block flow system diagram of a hybrid computer system having binary, artificial intelligence, and quantum sub-systems in accord with an aspect of the subject technologies.

FIG. 33 is a hybrid Binary—Artificial Intelligence—Quantum (BAIQ) computing system 1888, the main elements of which are shown in block and systems flow diagram form. It may use these subject technologies to create neural networks and Qbits. Users may define their neural networks for the system to create, and users may define the number and types of Qbits to create to run a particular application; or applications may come with their neural network and Qbits pre-designed and defined for creation at boot up. But that level of detail is not shown here. This is just a baseline example system, that may be adapted to many applications.

It may for example be used for finding prime numbers; it could be used to mine for crypto-currencies such as Bitcoin more efficiently than conventional systems; it may be used for missile defense for the speed at which it may identify targets intuitively; and it may be used to track targets and to fire weapons at them. Physicists may use it to try to resolve the glitches between the Quantum Universe in the Standard Model vis a vis Relativity; to help us to achieve a new physics theory that better describes the Universe. Capable to zoom in and out from the macro-to-micro perspective and back. The things that may be done with it, will depend on the algorithms that are created for and run on this baseline BAIQ hybrid system 1888.

The Inventor's simplified Qbits, and cascading Qbits and variants of these are described in the materials relating to later figures; no distinction is made here in system 1888 between those subject technologies for the architecture of Qbits and the Qbits in the state-of-the-art. Such as those being created and used by Google. System 1888 may use any or all of them. However, it will be apparent to those of skill in the art of computer system architecture that these subject technology Qbits are likely to be considerably cheaper than those in the current state-of-the-art.

Similarly, system 1888 may include the Inventor's own Polymorphic Artificial Intelligence, as it is explained above. To create more efficient neural networks than the neural networks in the current state-of-the-art. System 1888 may use either or both forms of neurons, and neural networks for machine learning and/or artificial intelligence operations. Because PAI can be used to prune redundancies and/or under utilized resources from neural networks it may provide a more efficient A capability. Needing fewer system resources, including reduced electrical power consumption.

It is hoped that system 1888 and variants of it will become the standard system used and that its BAIQ hybrid operating system, will become as widely used as Windows, Android, Apple's operating system and Linux are now.

Due to the architecture of these subject technologies. Such systems may be capable of also randomizing their creation of neurons and Qbits as between available system resources of RAM and Processor hardware when the BAIQ hybrid machine uses these subject technologies. Resources may be more difficult to fully randomize with the Qbits and neural networks in the state of the art. But nevertheless, some degree of randomization may still be achievable even using the state-of-the-art neural networks and/or Qbits. Eventually mobile phones, tablets and personal computers may be running these subject technologies on a BAIQ operating system. We could be looking here at the fundamental engine of the next generation of computing devices, and not just at atom-smashing super computers.

This is because the quest for ever increasing computing power, and forces like Moore's Law may persist even as the theoretical level of miniaturization is reached. The progress coming more from new ways of operating those systems such as BAIQ hybrids. The key to which is to understand, that some problems are very well solved by Binary systems, others lend themselves better to AI and Quantum computing systems. The BAIQ hybrid may be programmed to select and to use whichever tool, or combination of tools is best for a given task.

Turning now to the detail of system 1888, the BIAQ hybrid operating system 1850, cooperates with the system resources through the Basic Input Output System (BIOS) 1853. This provides the baseline environment in which the operating system runs, and operates the physical system. Including allowing the operating system to load from storage 1855. The BIOS and the firmware in the circuitry of the machine are analogous to the autonomic nervous system. They don't really vary but are hard-wired into the machine. Though BIOS code may be kept in non-volatile RAM or flash memory, and amenable to updates from the manufacturer over time. IT users have become used to buying hardware systems and having them undergo software upgrades, and bug fixes—throughout the lives of systems and devices.

This system shares those basics with the state-of-the-art, it thus may be capable within the constraints of the hardware to have firmware upgrades. Most device users will be familiar with operating systems such as Apple, Windows, Linux and Android. Depending on licensing arrangements that may eventually be made, system 1888 and its BAIQ hybridization may become incorporated into those operating systems. BAIQ hybrid systems could be the future for most computers. In a future where our devices may also develop a persona and in time form their own personalities, and work with us, and evolve with us like trusted friends.

The CPU and/or Group Processing Units (GPU) Processors 1857 control the operating system 1850. The boot-up process may cause the operating system 1850 to load from storage, and this to be facilitated by the BIOS and autonomic/automatic machine environment 1853. The CPU/GPU may then be caused to load and run the binary applications software 1865, and these binary helper and enabler applications coordinate through feedback 1871 from the A and/ML applications 1867 to allow them to run; similarly the CPU/GPU may then be caused to run the Quantum and/or Probability based algorithms to run on the machine's Qbits 1869, and which process may also feedback and communicate 1871. Noting that the arrows used on these various feedback loops is that they allow the Binary helper applications 1865, the A applications 1867, and Quantum applications 1869 to run on the operating system 1857 in these multi-way feedback processes 1871, as these may all run in parallel together. This may be achieved by a shared protocol governing parameter and data passing, as between the Binary, AI and Quantum modules of system 1888.

Once all the binary helper applications 1865 have coordinated the boot-up and begin to run the A algorithms 1867, and Quantum algorithms then the system is operational and may provide a BAIQ hybrid computer system suitable for many diverse tasks. The neural networks 1863 to be used by the system may then be created by the CPU/GPU 1857 and RAM 1859. Similarly, if the Inventor's own Qbits are used these may also be created by the CPU/GPU 1857 and RAM 1859.

Where bespoke hardware-based Qbits like those in the state-of-the-art as used by Google are included within this system. They may be compatible with this system, and may be used instead of, or in combination with the virtual architecture based Qbits of these subject technologies.

The BAIQ hybrid system once fully booted-up with its neural networks and Qbits created 1863, is ready to roll. Now the system is capable to perform desired computations as operators wish to run on system 1888 according to these subject technologies; and to output the BAIQ hybrid's actions and/or results, and/or inferences.

The loading of user specific software is not specifically considered in this exposition of the general-purpose machine 1888 provided in this example; nor is the selection of user options for running user's applications, as these are not relevant to this general-purpose hybrid system. In system 1888, the curved lines are used to denote novel and/or unusual processes of this hybrid system, that are unlikely to be found elsewhere. Which is why the creation of neural networks and Qbits in CPU/GPU and RAM 1863, is represented by a non-standard symbol in the form of a five-pointed star. This is to help direct attention to the heart of this aspect of the subject technologies. The neurons, dendrites and/or Qbit structure versions in an iteration of system 1888 as created 1863 may be saved to storage 1855 for later re-use 1867, so that they may also be restored 1861 to recreate neural networks and Qbits 1863 in CPU/GPU 1857 and RAM 1859.

If we are looking to model the Universe and to reconcile quantum mechanics with relativity, then maybe building a new quantum architecture could be useful. Google certainly believes it is worthwhile, and so does the Inventor. But maybe not for quite the same reasons. Say for a hypothetical example that there's an absolute position in all the dimensions of space time (we think in terms of up, down, across and time as four dimensions, but string theory suggests there may be sub-dimensions and possibly eleven of those). The Inventor has his own unfinished theory of matter which may reconcile some problems eventually. But for now, it matters not. Because if we want to describe a point event like a particle as it may exist in between four to "n" dimensions we might need to describe its state in n dimensions to fully describe it. So, we may need an analogue mechanism that can describe down to Plank's constant. How would we do this? How would it help us to calculate more mundane things than the locations of the elements of the wave functions of particles in the n-dimensions?

Figure 34:
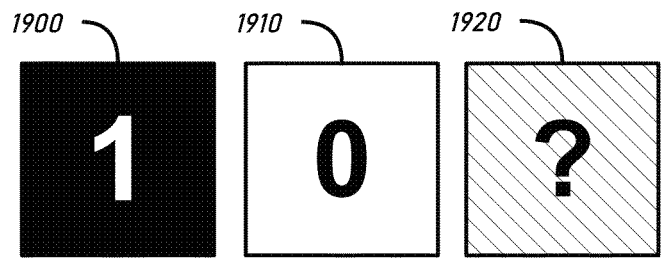
FIG. 34 is a simple schematic diagram of a quantum bit in accord with an aspect of the subject technologies.

Well the choices of zero, or one, or don't know are all that FIG. 34 gives us which may be good enough to ride over some unknown variables but not others. So, the Inventor pondered how to create a system that can run calculations theoretical physicists could use right down to resolution according to Plank's constant in n-dimensions. And what he came up with is a "Scalar Cascading Qbit" architecture that can be implemented more than one way. One such implementation is shown in FIGS. 35 through 38.

Figure 35:
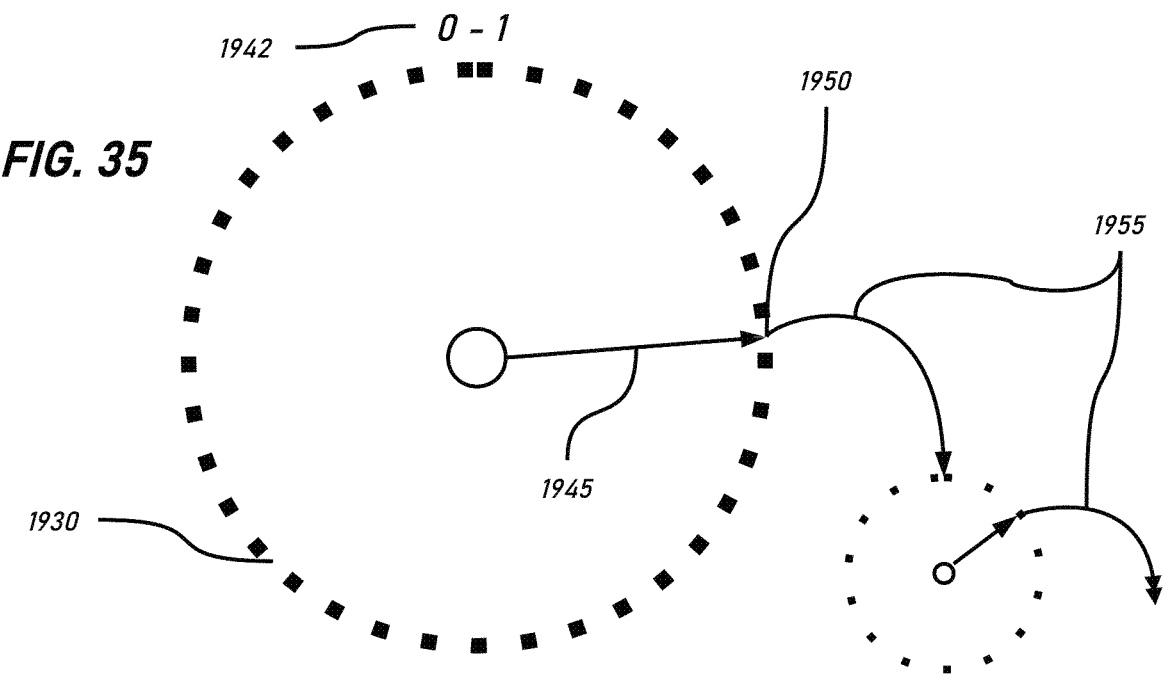
FIG. 35 is a schematic diagram of a quantum architecture implemented in accord with an aspect of the subject technologies.

FIG. 35 shows a circular scale like a clock that can show all the values from zero to one (divided into one hundred possible values). This may be implemented as a Qbit which can produce any value between zero and one; then if the pointer fits neither of any of the one hundred values either side of it perfectly, then another pointer to the same 0 to 1 scale of one hundred can be produced to try to resolve the pointer to an absolute position on the scale; and this process of cascading down into the detail all the way down to Plank's constant may be achieved by iterations of the same process. To achieve something close to an analogue result using binary or other number base system tools to resolve the remainder values to an analogue. Perhaps, in a true Quantum system we should try copy nature and resolve only those variables that we are forced by observation to resolve, and put up with probabilistic approximations where possible. So that the Inventor believes true Quantum systems should cope with ambiguity and ride over it. So as to avoid wasting resources on otiose over-calculations and expensive hardware. Many things that get labeled as Quantum computing, might be more accurately understood as Probability Based Computing (PBC). Because quantum mechanics is really a way of explaining the physical interactions of particles. When designing computers to work on other problems why not base them on the statistical models that apply to that field, rather than reinterpret it into something that nobody understands? Why for example run relativity computations on a Quantum computing system? Being the paradigm question.

In computing terms, it may be more efficient to create one array of values that are 0.00, 0.01, 0.02, 0.03 etc. . . . to 0.99 then 1 and use this one array as a scale that never changes, and to iterate only the part of the function that creates a pointer to the scale. Say if the pointer value is going to be 0.31415926; at the first pass we'd get a value that was greater than thirty one, and less than thirty two; so we would cascade into another pointer where we would get a value above 41 and below 42; so we would again cascade to another pointer value greater than 15 but less than 16 and so on. At any point we can check to see if the answer is good enough to let the rest of the computation run, or whether it needs to reiterate the cascading process to get to all the way down to Plank's constant. When this technique of using the Scalar Cascading Qbits to get closer to an absolute value is used in combination with an intuitive AI program, a "good-enough" result may be achieved. Resolved to a one hundredth, without wasting resources cascading down to more detailed computations may suffice. These are some of the benefits the Inventor believes will make these converging aspects of his own technologies and progress in the art generally worthwhile.

Now if one wanted to do so there are mechanical systems and probably a compass like device could be used to provide a physical pointer for a Qbit based system like the ones created by Google. But the Inventor has taken a different path and created an architecture where these constructs can be rolled out flat and implemented in cyberspace as an array of values of any scale. Though these examples use values between zero and one, and the pointer can be a pointer to that scale from which the answers are read, and provided for onward use by whatever algorithm is running.

The specific call-outs of FIG. 35, have the probabilities represented as a fraction between true and false or zero 1942, as a circular scale 1930, and pointer 1945, where the pointer points to the value or probability 1950, and where the value falls between the precise match to values on the scale 1930, then the processor running the computation under the control of a program is caused to cascade the computing process through another iteration to produce another Qbit representation 1955, until an absolute value, or resolution that is serviceable enough to be used by the program is achieved; or the process is truncated as a waste of resources, or in the case of physical world computations of scale that Plank's constant is reached.

Figure 36:
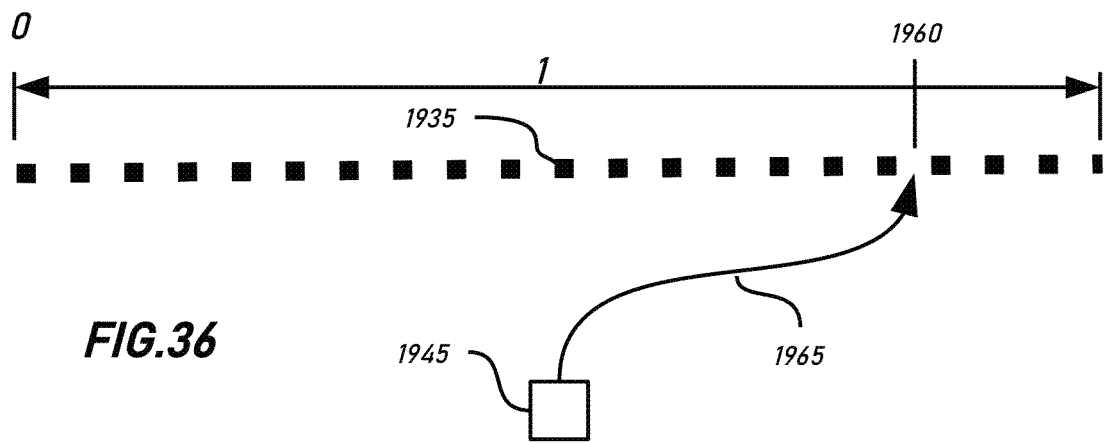
FIG. 36 is a schematic diagram of a quantum architecture implemented in accord with an aspect of the subject technologies.
Figure 37:
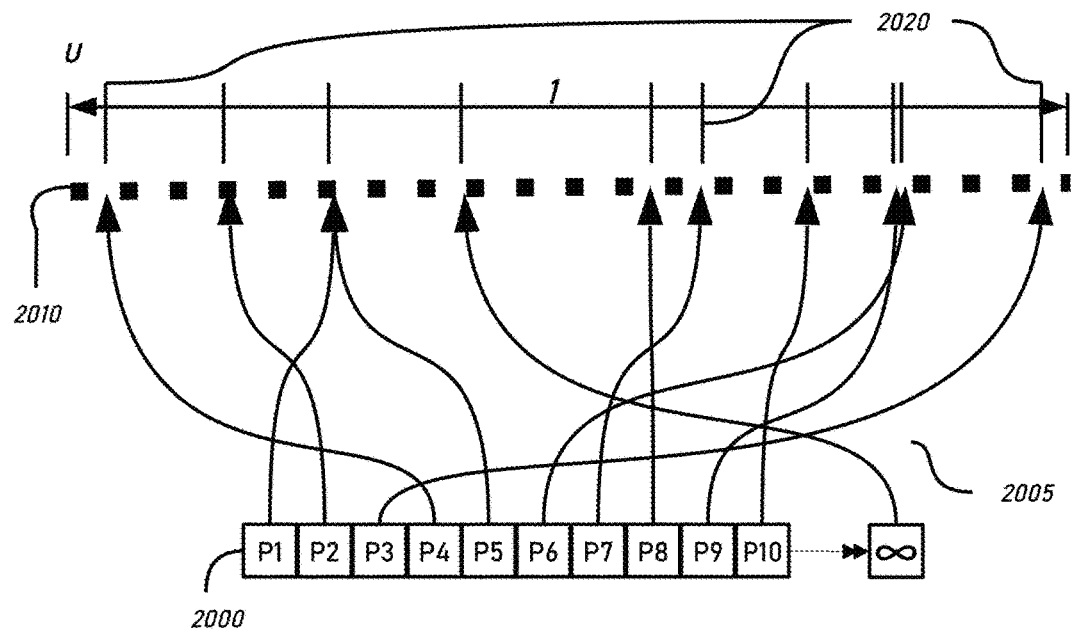
FIG. 37 is a schematic diagram of a quantum architecture implemented in accord with an aspect of the subject technologies.

FIG. 36 is a technically identical representation of the Qbit array of FIG. 35 but rolled out flat 1935, where the pointer 1965 identifies the value of the Qbit 1960. The pointer is in fact a data object that may be stored in a computer memory block 1945.

Although the Qbit of FIG. 35 can be virtualized from a compass like form to a flat array with a pointer; alternatively, the pointer may itself be the value that would be read from the scale if the physical scale existed. Either approach may perform the same function. But it need not exist in cyberspace to have a value consistent with the metaphor. Suffice it to say that in this aspect the Inventor has sought to visualize and to virtualize the concept of Qbits, in a comprehensible manner. Then to implement them using algorithms and constructs that do not necessarily require physical Qbits. But that can leverage the power of Quantum Computing and/or PBC by creating virtual Qbits from: a program running on a CPU/GPU system and creating the data structures thereof and/or to produce values or pointers to values that equate to probabilities of between zero and one within computer memory. So that a virtualized quantum computer may thus have almost limitless numbers of Qbits. This, however, does not mean that this aspect of the subject technologies may only be implemented by programs running on CPU/GPU and in memory of known designs.

These structures may be un-virtualized back into physical artifacts constructed with the same techniques and materials as used in conventional silicone-based processors and memory modules. Except that these may be custom designed to run as parallel Qbits and where needed as cascading Qbits rather than as binary systems. The physical details of which may vary enormously. A very practical point that goes back to the basic FIG. 34 Qbit, where the only value that can be obtained is "?" not known, this is like some variables in real life. Sometimes we simply don't have enough information to know what we just can't know, not even to infer a probability. AI can help us to make better guesses, and similarly Quantum computing and/or PBC can help us to ascribe a statistical weighting or probability to our outcomes that are uncertain. But we may still be left with an unknown "?" for some variables.

The greatest strength of computing in general, in binary logic, and/or any base logic, and/or A and/or Qauntum computing and/or PBC is the ability of computers to repeat a task many times very quickly and to try out various variables and to experiment with data at speeds that humans cannot match, and where boredom and frustration never occur.

The Inventor believes that by the convergence of all these aspects of these subject technologies that computation technologies may soon produce intelligence that matches; and then exceeds general purpose human intelligence. The key to which, is being able to use a variety of techniques to work around unknown variables, in ways not that different than humans do. But at increased speed and without getting bored or frustrated into failure.

FIG. 36 may be interpreted as or the equivalent to in alternative software manipulations of resources or as hardware, of a serviceable combination and construction as an array of pointers or values on a scale of 0 to n, which has in fact pointers represented as P1, P2, P3, P4, P5, P6, P7, P8, P9, P10 to P∞ (infinity). This is because pointing to a value, or between two values requires no computation per se can be efficient and can be a step along the way to a more complete resolution of a given value or probability. In some cases, a computation may be able to infer that a variable lies between two values, but not more than that without further information or further computation. So that in the architecture represented, a variable may be expressed as between a lower and upper value. In which case, a pointer to the lower value or the value itself will suffice to resolve the available digits. Then if necessary, to perform further computation to resolve subsequent digits that are above it in absolute terms. It matters not which way these conventions are set. But in this specification, the usual upwards conventions may be assumed, and that their alternates are within the contemplation of the Inventor and intended to be included even where not expressly stated. The pointers 2000, may point to or hold values according to the scale 2010 expressing probabilities of an event or variable 2020, in an architecture capable of expression of pointers to values or probabilities within a range in parallel, or in sequence, or in cascading use as needed 2005 by the computations of the wider computation system.

Figure 38:
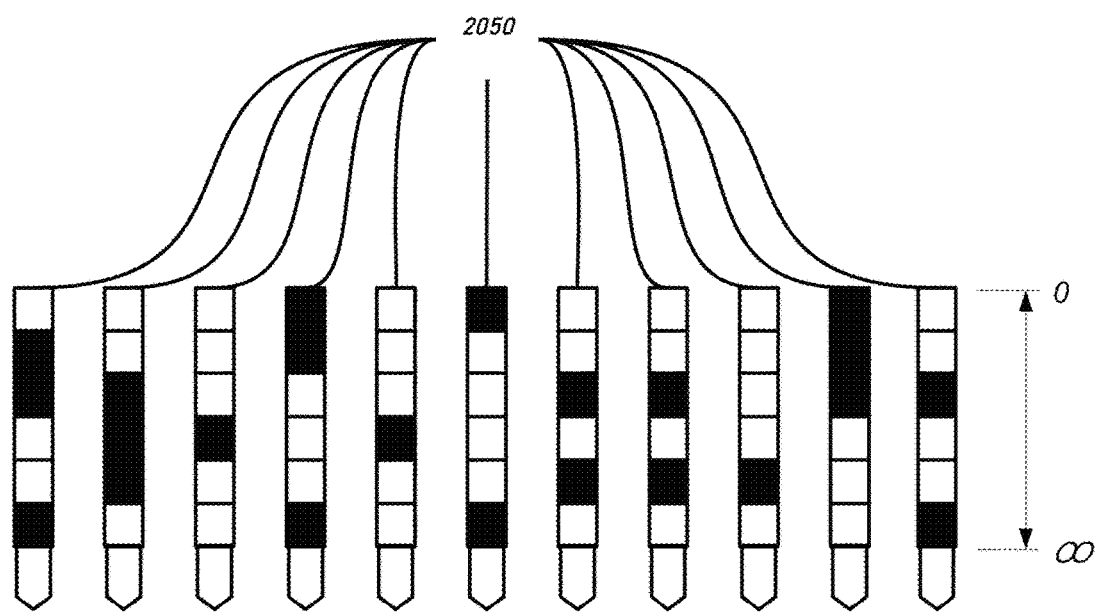
FIG. 38 is a schematic diagram of an eleven-dimensional architecture implemented in accord with an aspect of the subject technologies.

FIG. 38 shows eleven parallel arrays, that may be arrays of pointers to values, or contain variables, or probabilities, according to applicable aspects of the subject technologies 2050. These arrays being capable of being also comprised of records or data constructs capable of containing information that may be scalable to the capabilities of the computer.

This illustration is provided with eleven arrays to represent for example purposes of an eleven-dimension reality compatible with string theory. The Inventor's own unfinished matter theory includes more than four dimensions and sub-dimensions, or levels of complexity. But regardless of who is right or what theories prevail, using these methods and architectures they may be virtualized for computational purposes.

Though it will take some amazing graphics to express them on a screen that most people could comprehend. The way the Inventor imagines it is like a spread sheet with eleven values that tell all that is knowable about a point in spacetime and its energy state, as shown by eleven values on a spread sheet. Wherein quantum entangled particles share most but not all their values in most but not all of their spread sheet cells. Where the particle waveform is one waveform. But where some of its energy is displaced over some dimensions. Because, the Inventor postulates that there may be some of these sub-dimensions where there is no spacetime per se. So that all the spooky effects at distance that so perturbed Einstein may have an explanation, that in sub-dimensions where there is no distance, what Einstein feared is not happening. Which if correct may be a lack of spacetime in some sub-dimensions. Suffice to say that spacetime may be more complex and detailed in structure than is apparent at the macro level. That's a theory few would oppose!

If string theorists are right, then we might begin to think about string theory computing by starting with an eleven-dimensional set of parallel arrays for every point in the Universe. This is also relevant to the level of detail the Universe seems to want to provide. Could it really be waiting for us to look before deciding to use the power to create the details? This is a huge concept that may be one of the most useful quantum concepts. And may explain why the Universe appears not to bother calculating the fine details unless anyone is checking which may force the Universe to decide as to whether something is there or not, and where with precision it is etc. In the absence of which, maybe the Universe saves resources by not bothering to check? This not bothering to check extraneous details is maybe an aspect of computation where Quantum computing may be able to speed up processing. It may even be the key to using it correctly.

Figure 39:
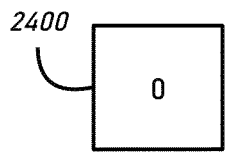
FIG. 39 is a schematic diagram of various possible two-bit systems implemented as simple quantum or meaningful architectures in accord with aspects of the subject technologies.
Figure 39:
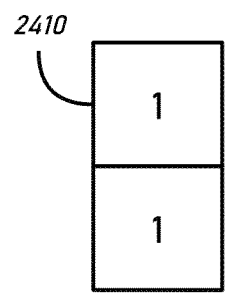
Figure 39:
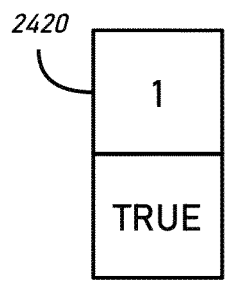
Figure 39:
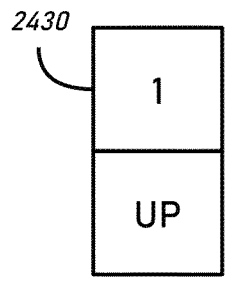
Figure 39:
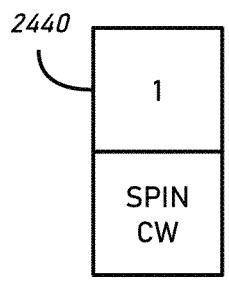

FIG. 39 relates to what can be done with two bits, along the path to true Qbits, short of the real thing. That may provide a good enough solution for a cheap Two-Bit Qbit in some cases, provided that an appropriate meaning is attributed to the data object. A bit can hold the values zero or one 2800. However, the options for Two-Bits are more interesting. The binary permutations of binary base Two-Bits 2410 are (1,1), (0,1), (0,0) and (1,0) because two multiplied by two equals four, we get four possible outcomes. We may interpret (1,1) as a true positive or yes; (0,1) as a true negative or no, and then we have room to use (0,0) as a false negative or yes or we could ascribe a Qbit value of don't know, or more likely not, or more likely no, with no having a probability of fifty percent or above; (1,0) on the other hand may be ascribed a Qbit value of don't know, or more likely yes than not, or more likely yes, with yes having a probability of fifty percent or above. So that from just Two-Bits can be made a basic Qbit, that is the most cost-effective way to represent some logical conditions. Which it would be economic madness to represent using Google's current version of Qbits with. So that in a system that uses unresolvable Qbits, as a valuable resource these variables may be usefully off loaded to the Inventor's ultra-cheap Two-Bits, and/or variants of them, with more conventional bits to add more detail if necessary. As explained above the Inventor's true Qbits are already a much more efficient way to work with Qbits. The problems in the art may stem from an incomprehension of all things quantum. Who knows?

Further Two-Bit logical meanings can be very well expressed 2420, where (1, true) is a true positive; where (0, true) is a true negative; (0, false) is a false negative; and (1, false) a false positive result. The key of the Inventor's rationale is to ascribe a meaning like a protocol to the data held, and to use this technique in computations to represent more complex data that can be used in a probability based system such as a Quantum computer, so that it may be thus adequately described. Thereby avoiding in some cases the need to use the most expensive form of Qbits (like the Google ones) that require more resources to represent them, except where they are necessary. Or as some may say by dumbing-down the Qbit to a more economic tool, that we can all afford to use. Which is to be able to use a protocol of meaning to be attributed to a minimal amount of data storage and processing resources; so as to make the use of that resource able to represent more data than the sum of its parts.

This means using the structure of data to add meaning to that data, which though virtualized may have large scale advantages when used to reduce computing resource needs relative to user utility. If anyone is thinking why bother at this point, remember that computing takes electricity, that has to be generated and is part of our Carbon footprint. More efficient computing where data is used in more meaningful ways by more intelligent systems is a very good thing. Even though processor power goes ever upwards, as does bandwidth, so too it seems that demand emerges to use up this progress.

Furthermore, as we use ever more technology in our lives the efficiency of that technology matters even more, as its cost is like negative income for most consumers. For particle physicists striving for the most efficient way to represent quarks, the Two-Bit 2430 can provide for (1, up) as an Up Quark, and (0, up) for no Up Quark, (0, down) for no Down Quark, and (1, down) for a Down Quark! So that simple structures can be used to represent the quantum states of sub-atomic particles no less. This attribution of meaning to data in such protocols is as revolutionary as shorthand note taking once was to secretarial work. Because using just Two-Bits there are opportunities to represent things that might otherwise need Google's very expensive Qubits.

Previously programmers and information technologists reduced everything to binary representation. Whereas this approach may use a simple logical states to represent much more, like a pointer to the bigger truth, and the handling of uncertainty, some logical states and unknowable variables. These subject technologies may thus allow compression of computing and the results it produces, and thus may reduce its demand on resources. Which may help mitigate the impact of human activities on the environment. The Two-Bit 2440 may also help with (1, clockwise) assuming a given frame of reference of course, may be attributed the meaning yes there is a particle detected with a clockwise spin direction (0, clockwise) may be attributed the meaning that no particle was detected with a clockwise spin, (0, counter clockwise) that no particle was detected with a counter clockwise spin, and finally (1, counter clockwise) that a particle was detected with counter clockwise spin. These examples are just a few plucked from the many possible uses of simple cheap Two-Bits and meaningful protocols. That's really the essence of true Quantum computing and/or PBC, which is that particles and or their wave-forms in flux can be in any or all possible quantum states.

We could extend to a three-bit Qbit, or four-bit Qbit structure etc. The Inventor is adding valuable meaning not as data values, but by a combination of data values, and the attribution of meanings such as probabilities to them data via data structures. That may be capable to represent some quantum states or probabilities. The Two-Bit Qbit, and similar data structures may improve the meaning capable to be expressed, and may even be used to substitute for the much more expensive physical Qbits in the state of the art, when they are used to represent relatively simple data and probabilities.

Finding ways to represent quantum states may be a challenge in the development of probabilistic systems. That the Inventor believes can be met by creating simple data structures, along with protocols for ascribing meanings to them and/or using pointers from them to a scale, by cascading or iterating this process etc., down into the detail only to be done as an when it is possible and necessary. Just like the real Universe appears to do, only if we audit reality does the Universe bother to expend the resources needed to be specific. Which is grist to the mill for those who believe that reality as we know it is a simulation.

Figure 40:
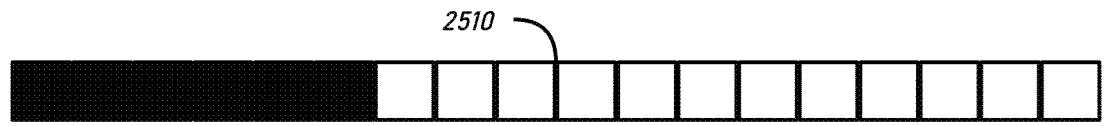
FIG. 40 is a schematic diagram of data stored in parallel locations in accord with an aspect of the subject technologies.
Figure 40:
Figure 40:
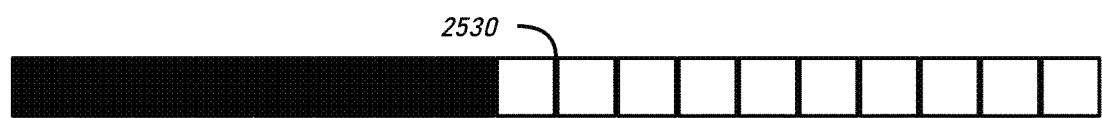

FIG. 40, shows a representation of randomized data being stored to the parallel locations which may be local, or separated by distance or any possible combination of locations 2510, 2520, and 2530 that have been virtualized; where the storage is allocated logically from end to end.

Figure 41:
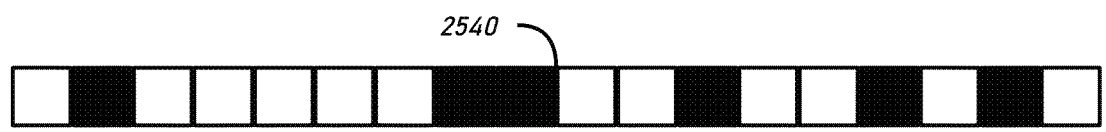
FIG. 41 is a schematic diagram of data stored in parallel locations in accord with an aspect of the subject technologies.
Figure 41:
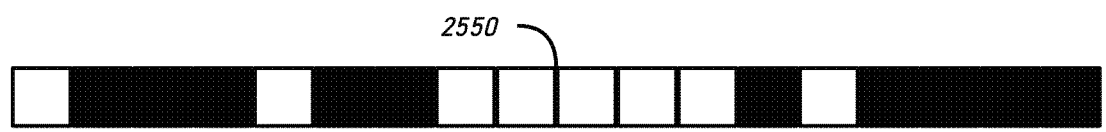
Figure 41:
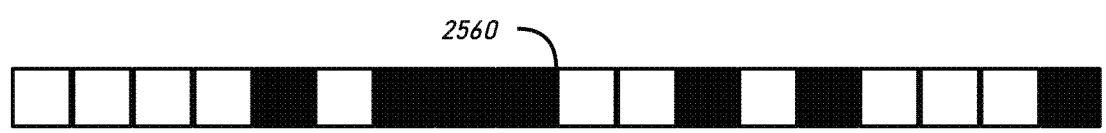

FIG. 41, shows a representation of randomized data being randomly stored to the parallel locations which may be local, or separated by distance or any possible combination of locations 2540, 2550, and 2560 that have been virtualized; where the storage is allocated contiguously from a starting point. This may be the exact same data as represented in the previous figure but with gaps in between. This is not more or less secure at this stage. But from here on if more randomized data is stored randomly into the remaining gaps, then the approach of randomizing storage as well as randomizing the file contents is shown to be more secure, because the effort to disentangle it will be greater than for contiguous storage of randomized files. This is demonstrating the strength in numbers point explained above.

Furthermore, it is noteworthy that files and data randomized into a storage space can be compressed to remove the excess spaces in between with no loss of security, because the randomization is preserved at the time compression takes place.

However, it will be understood by those skilled in the art that compression and other storage tweaking, or optimization operations may render randomized data irrecoverable if the pointers key is not updated accordingly. So that if these functions are not included with any version of the Inventor's subject technologies—then it may be unsafe to use software that is incompatible with these subject technologies. These subject technologies are not about per se nor do they include disk management, fragmentation, de-fragmentation or optimization.

Figure 42:
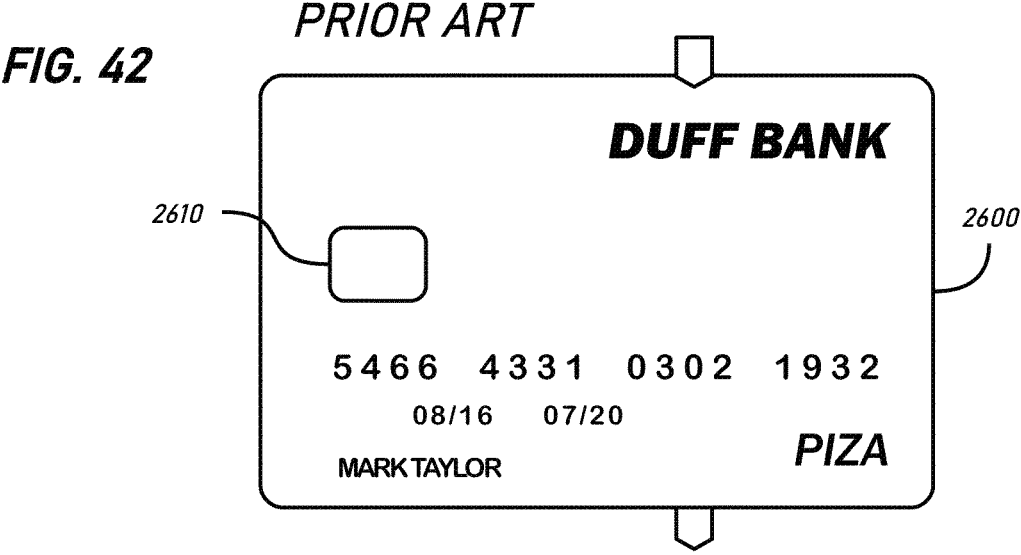
FIG. 42 is a drawing of a bank card according to the prior art.

FIG. 42 is the current state of the prior art, for a banking card 2600 with a trading name Duff Bank, which contains a silicon chip, transistor and memory system 2610.

Figure 43:
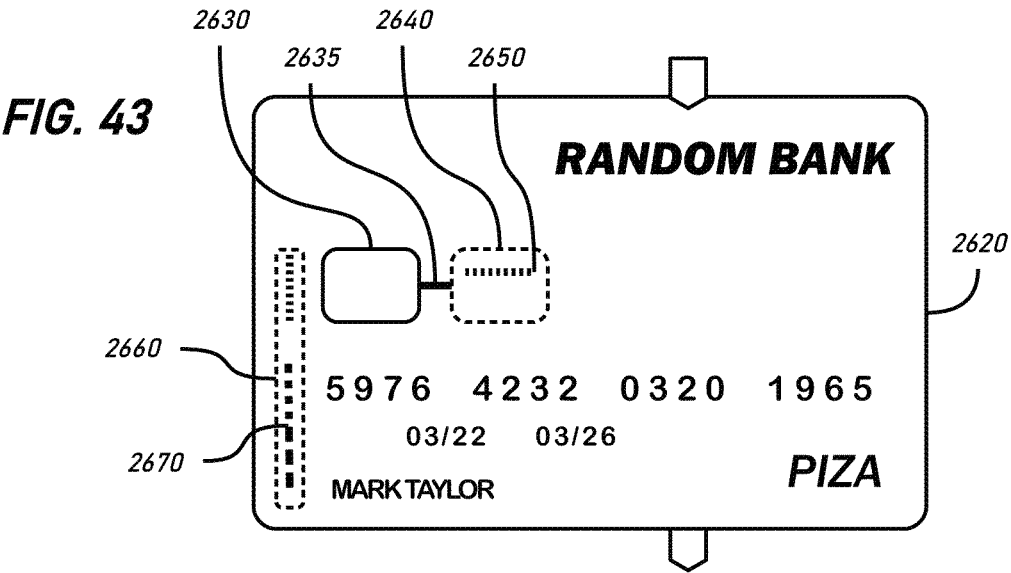
FIG. 43 is a drawing of a bank card according to aspects of the subject technologies.

FIG. 43 however is a banking card 2620 with a trading name of Random Bank which incorporates several aspects of the subject technologies. There is in addition to a chip transistor and memory system 2630, a connection 2635 comprising an interface capability with an additional memory device 2640, capable to store inter alia randomized and hence secure data, that may include tally data and/or any other helpful data 2650 in excess of what is used in the current state of the art. One or more of these, or any usable size and shape may be included on a banking card, though only this one example 2640 is shown. The additional memory is connected to the first chip to allow it to interface through it's contacts with existing chip and card readers.

Furthermore, there is a photon-based storage zone capability 2660, wherein light can be used to write and/or to read data, 2660 capable to store data that may be randomized secure data, that may include tally data and/or any other helpful data. This would require changing the current chip and card reading systems, and is thus probably less attractive than the additional memory module option 2640.

Tally data, in any case—however recorded and retrieved—may include data relating to user activities, usage patterns, bio-metric data, and/or any other helpful data. Helpful data may also include, historic shopping data and as well as serving the cause of security, may subject to applicable laws in a jurisdiction be used to trigger the presentation of information including to a user, via an interacting device or system. Such as a mobile phone or personal computer.

Furthermore, in jurisdictions where the use of banking cards has been substantially overtaken by the lack of infrastructure for banking card use, and where this is supplanted by using mobile phones to facilitate payment for transactions, then the capabilities may alternatively be delivered within and/or through such a device instead. And or for home-based users the applicable device may be a personal computer alone, and/or with a card reading capability, or equivalent Internet banking capability. That may furthermore be used to update a banking card linked to the account used to be updated, at the next possible opportunity. As well as networked services and records.

Figure 44:
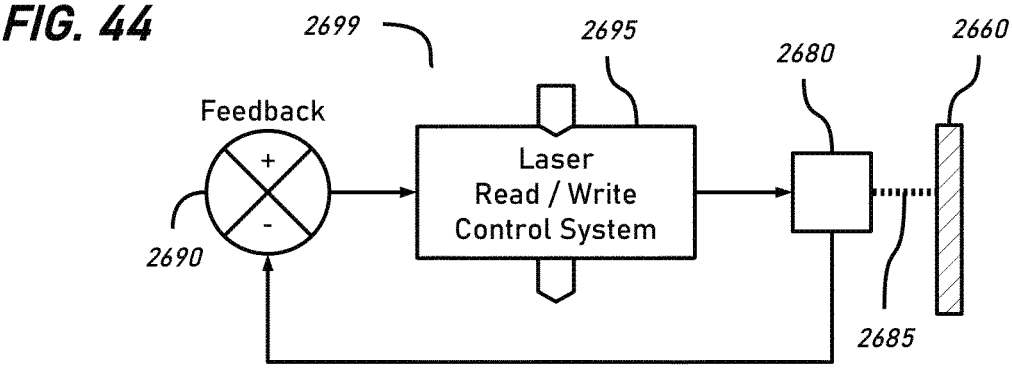
FIG. 44 is a mixed schematic and block flow system diagram of a data device used according to aspects of the subject technologies.

FIG. 44 is a laser read and/or write module 2699, under the control of a bigger system that is not shown. The local read/write control system 2695 of this device includes a feedback loop 2690 for reading back data and checking data has been correctly written. The feedback loop may also be used for set-up of alignment and adjustment of the device. The local control system 2695, controls the laser read/write head 2680, and the beams it produces 2686 for writing and reading data, to a photosensitive medium 2660 that is incorporated into a bank card; where it is used to store user data, which may include tally data, transaction and geographic information as well as the more usual bank account data. There is no reason why bank cards could not be optical storage media over large parts of their surfaces. However, because the ability to write large amounts of data to small spaces, in FIG. 39 the area used for this purpose 2660 is relatively modest.

CONCLUSIONS RAMIFICATIONS AND SCOPE

These subject technologies, if successful in proliferation into widespread use, may provide a revolution in information security. So that large-scale data theft becomes much less of a problem. Thereby saving society the resources needed to fight this crime. Better IT security may also help stem the tide of intellectual property theft. So that there is much to be gained for countries with knowledge and innovation driven economies, non-more so than the United States of America.

The insights gained from creating the randomized systems and architecture to support these, has already had a beneficial effect in allowing the similar new and improved neural networks that can behave more flexibly, than previous neural networks. Offering the prospect of more lifelike, and more optimized use of resources within Artificial Intelligence based computation.

This insight also helped with conceptualization of the cheap Two-Bit Qbits, or larger protocol basis of datastructure that may be used to convey meaning, and that low-cost approach to being able to handle the values yes, no, maybe, and maybe-not. More complex forms are also provided by the subject technologies as scalar Qbits, and cascading scalar Qbits. These may provide a much cheaper and even more efficient and easy to use Qbit architectures than in the state-of-the-art, as embodied in the Qbits that Google is creating and experimenting with; which are incredibly expensive. Maybe millions or even billions of times more expensive than those of these subject technologies.

These common themes in the subject technologies are pulled together in this specification by the hybrid Binary Artificial Intelligence Quantum Computing (BAIQ) system 1888. Using these subject technologies, logic and methods a BAIQ system is within our reach technologically. Binary parts of the system are the ones that enable the others, and these constructs and algorithms of these system features such as neurons, dendrites and Qbits may all be virtualized.

However, the system of GPU/CPU and RAM cards, of system 1899 shows an exemplary implementation of a randomizable configuration of processing power in the GPU, hooked-up to the RAM cards needed and which is being connected by dendrites. Which are pointers to the addresses of the active parts of the transistors in the GPU and RAM which are creating the neurons. Such a system may be capable of creating a great many neurons suitable for deep neural networks; these same resources can be used to create the scalar Qbits, and the low-cost Two-Bit, Three-Bit, and Four-Bit Qbits etc., and variants in between as in system 1899 of FIG. 32.

This ability to provide a system well suited to randomization of the use of resources offers the possibility to provide also a computer system, the electronic noise from which is difficult to predict, and difficult thus for Signals-Intelligence eavesdropper to accurately pinpoint, capture and interpret, even with analytical tools. The ability of polymorphic neural networks to create and destroy neurons and Qbits, also may permit these polymorphic subject technologies to be applied to defense systems. So that where for example a GPU is hit by a bullet, the remaining GPU can use their polymorphic abilities to continue to function by re-routing around the problem so long as there are still sufficient resources for the system to continue to run. Then polymorphic systems in general may offer a more resilient computing technology for the US defense establishment, and defense and offense systems.

TRIPLE may help consumers to enjoy more secure communications. They also offer a boost to military communications security. Their transient nature being time limited may suffice to make them uneconomic and difficult to crack during their period of transience. This security of real time communications may be very important in military and intelligence applications.

The ability to use a TRIPL to turn a CIA agent's speech to text, then TRIPLE it in an application, transmit the TRIPLE version over insecure networks back to base. Where the TRIPLE is decrypted by reversing its TRIPL encryption, then reducing it back to text has the additional advantage of protecting the agent's identity. Because speech may be synthetically recreated using a generic voice at either end. Indeed, the agent's own voice may be sampled and added back to the speech at base. Because modern voice technologies can recreate voices very accurately.

TRIPLE may also be of assistance in machine to machine and machine to human communications. Indeed the human to computer interfaces of the future may benefit from the use of such meaningful protocols in ways that are difficult to predict.

Temporal adjustment of orders for the military may aid the causes of protecting the secrecy and efficacy of orders, via "do by" times, and randomization of delivery of the blocks a data comprising a message. For reassembly and delivery by a priority based protocol that uses "do by" times. Furthermore, these systems and methods may also be helpful for flattening a bandwidth demand curve. Bandwidth constriction, and security problems in submarine applications may be mitigated for the US Navy.

Furthermore, in a war where the spectrum and the availability of space assets are severely constrained. These same systems and methods may also be used to make the best use of the surviving bandwidth. So that the entire US military would do well to adopt these systems and methods. To provide more robust capabilities to communicate vital orders in times of extreme warfare. That may be just enough to provide an invaluable winning edge.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A time randomizing interface protocol language encryption method, comprising:
   sending an invitation to communicate from a first device to a second device;
   in response to accepting the invitation, the first and second devices cooperating and generating a randomized language protocol from a data set array wherein the randomized language protocol comprises random object values and alphanumeric characters, and the randomized language protocol creates a unique language between the first device and the second device;
   assigning the random object values to the alphanumeric characters;
   generating an array of pointers in the data set array pointing from the assigned random object values to the alphanumeric characters;
   agreeing between the first device and the second device on the array of pointers pointing from the assigned random object values to the alphanumeric characters;
   receiving, from an input, a communication message at the first device;
   transforming the communication message into an encrypted message comprising the assigned random object values;
   transmitting the encrypted message to the second device;
   at the second device, looking up the pointers in the data set array in response to a receipt of the transmitted encrypted message;
   translating, using the randomized language protocol, the encrypted message into a decrypted version of the communication message;
   resetting at random time intervals, the assignment of the random object values to the alphanumeric characters and generating a different version of the randomized language protocol during communications between the first device and the second device.

2. The method of claim 1, further comprising:
   generating a pointer index value for each pointer pointing to an alphanumeric value; and
   during the step of translating the encrypted message, using the pointer index values to determine the alphanumeric values in the decrypted version of the communication message.

3. The method of claim 1, further comprising:
   receiving a request to reset the randomized language protocol from the first device to the second device or from the second device to the first device; and
   resetting the assignment of the random object values to the alphanumeric characters and generating the different version of the randomized language protocol in response to the request to reset the randomized protocol language.

4. The method of claim 1, wherein the communication message is speech-based and the method further comprises:
   converting the speech-based communication message into text; and
   transforming the text into the encrypted message comprising the assigned random object values.

5. The method of claim 1, wherein the pointers in the data set array are unique to a communication session between the first device and to the second device.

6. The method of claim 1, wherein the alphanumeric characters comprise a word, phrase, or sentence and the method further comprises:
   generating a pointer and/or index value for each pointer pointing to the word, phrase, or sentence; and
   during the step of translating the encrypted message, using the pointer index value and/or the unique pointer itself to determine the word, phrase, or sentence in the decrypted version of the communication message.

7. The method of claim 1, wherein the array of pointers pointing from the assigned random object values to the alphanumeric characters is stored in a cloud-based network accessed by the first device and the second device.

8. The method of claim 7, further comprising storing data blocks comprising portions of the seed data set array in random locations of the cloud-based network.

9. The method of claim 8, further comprising generating a pointer array comprising the random locations of the cloud-based network and the stored data blocks in the random locations.

10. The method of claim 9, further comprising:
    downloading the pointer array comprising the random locations of the cloud-based network and the stored data blocks in the random locations; and
    recombining stored data blocks from the seed data set array in response to the receipt of the transmitted encrypted message.

11. A computer program product for generating time randomizing interface protocol language encryption, the computer program product comprising:
    one or more non-transitory computer readable storage media, and program instructions collectively stored on the one or more non-transitory computer readable storage media, the program instructions comprising:
    sending an invitation to communicate from a first device to a second device;
    in response to accepting the invitation, the first and second devices cooperating and generating a randomized language protocol from a data set array wherein the randomized language protocol comprises random object values and alphanumeric characters, and the randomized language protocol creates a unique language known only between the first device and to the second device;
    assigning the random object values to the alphanumeric characters;
    generating an array of pointers in the data set array pointing from the assigned random object values to the alphanumeric characters;
    agreeing between the first device and the second device on the array of pointers pointing from the assigned random object values to the alphanumeric characters;
    receiving, from user input, a communication message at the first device;
    transforming the communication message into an encrypted message comprising the assigned random object values;
    transmitting the encrypted message to the second device;
    at the second device, looking up the pointers in the data set array in response to a receipt of the transmitted encrypted message;
    translating, using the randomized language protocol, the encrypted message into a decrypted version of the communication message;
    resetting at random time intervals, the assignment of the random object values to the alphanumeric characters and generating a different version of the randomized language protocol during communications between the first device and the second device.

12. The computer program product of claim 11, wherein the program instructions further comprise:

generating a pointer index value for each pointer pointing to an alphanumeric value or indexing through the array of pointers; and during the step of translating the encrypted message, using the pointers and/or their index values to determine the alphanumeric values in the decrypted version of the communication message.

13. The computer program product of claim 11, wherein the program instructions further comprise:

receiving a request to reset the randomized protocol language from the first device to the second device or from the second device to the first device; and resetting the assignment of random object values to alphanumeric characters and generating the different version of the randomized protocol language in response to the request to reset the randomized protocol language.

14. The computer program product of claim 11, wherein the communication message is speech-based and the program instructions further comprise:

converting the speech-based communication message into text; and transforming the text into the encrypted message comprising the assigned random object values.

15. The computer program product of claim 11, wherein the seed data set array and the randomized language protocol are unique to a communication session between the first device and to the second device.

16. The computer program product of claim 11, wherein the alphanumeric characters comprise a word, phrase, or sentence and the program instructions further comprise:

generating a pointer index value for each pointer and/or indexing through the pointers array and pointing to the word, phrase, or sentence; and during the step of translating the encrypted message, using the pointer index values and/or the pointers to determine the word, phrase, or sentence in the decrypted version of the communication message.

17. The computer program product of claim 11, wherein the array of pointers pointing from the assigned random object values to the alphanumeric characters is stored in a cloud-based network accessed by the first device and the second device.

18. The computer program product of claim 17, wherein the program instructions further comprise storing data blocks comprising portions of the seed data set array in random locations of the cloud-based network.

19. The computer program product of claim 18, wherein the program instructions further comprise generating a pointer array comprising the random locations of the cloud-based network and the stored data blocks in the random locations.

20. The computer program product of claim 19, wherein the program instructions further comprise:

downloading the pointer array comprising the random locations of the cloud-based network and the stored data blocks in the random locations; and recombining stored data blocks from the seed data set array in response to the receipt of the transmitted encrypted message.

\* \* \* \* \*